US010977636B2

(12) United States Patent
Modi

(10) Patent No.: US 10,977,636 B2
(45) Date of Patent: *Apr. 13, 2021

(54) WIRELESS DATA COMMUNICATION INTERFACE

(71) Applicant: Worldpay US, Inc., Atlanta, GA (US)

(72) Inventor: Nish Modi, Round Rock, TX (US)

(73) Assignee: Worldpay US, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,435

(22) Filed: Jun. 28, 2019

(65) Prior Publication Data

US 2019/0325413 A1 Oct. 24, 2019

Related U.S. Application Data

(63) Continuation of application No. 14/808,962, filed on Jul. 24, 2015, now Pat. No. 10,366,377.

(Continued)

(51) Int. Cl.
*G06Q 20/20* (2012.01)
*G06Q 20/02* (2012.01)
(Continued)

(52) U.S. Cl.
CPC ......... *G06Q 20/202* (2013.01); *G06Q 10/087* (2013.01); *G06Q 20/027* (2013.01); *G06Q 20/12* (2013.01); *G06Q 20/203* (2013.01); *G06Q 20/3226* (2013.01); *G06Q 20/401* (2013.01); *G06Q 20/405* (2013.01); *G06Q 30/0201* (2013.01); *G06Q 30/04* (2013.01); *G06Q 30/0601* (2013.01)

(58) Field of Classification Search
USPC ........................................................ 705/65
See application file for complete search history.

(56) References Cited

U.S. PATENT DOCUMENTS 8,229,473 B1 7/2012 De La Rue
2003/0014317 A1* 1/2003 Siegel .................. G06Q 10/087
705/22

(Continued)

OTHER PUBLICATIONS

International Search Report and Written Opinion from PCT/US2015/042090, dated Oct. 16, 2015, pp. 1-14.

*Primary Examiner* — Garcia Ade
(74) *Attorney, Agent, or Firm* — Bookoff McAndrews, PLLC

(57) ABSTRACT

In some embodiments, the rendering a financial transaction record in a second format includes converting a tokenized first item of financial transaction information to an account-specific item of financial transaction information using an account identifier associated with the tokenized first item in a registry stored in a secured account data vault. In some embodiments, the system includes a transaction execution module for transmitting in the second format the first item of financial transaction information for payment processing by the first external financial party, wherein the second format includes the financial transaction information using the account identifier associated with the tokenized first item in a registry stored in a secured account data vault, and transmitting in the third format the second item of financial transaction information for payment processing by the second external financial party.

18 Claims, 44 Drawing Sheets

Related U.S. Application Data

(60) Provisional application No. 62/081,329, filed on Nov. 18, 2014, provisional application No. 62/030,335, filed on Jul. 29, 2014, provisional application No. 62/028,933, filed on Jul. 25, 2014, provisional application No. 62/028,763, filed on Jul. 24, 2014.

(51) Int. Cl.
| | | |
|---|---|---|
| *G06Q 20/12* | (2012.01) | |
| *G06Q 10/08* | (2012.01) | |
| *G06Q 30/04* | (2012.01) | |
| *G06Q 30/06* | (2012.01) | |
| *G06Q 20/32* | (2012.01) | |
| *G06Q 20/40* | (2012.01) | |
| *G06Q 30/02* | (2012.01) | |

(56) References Cited

U.S. PATENT DOCUMENTS

| | | | |
|---|---|---|---|
| 2011/0028085 A1* | 2/2011 | Waung | H04W 88/04 455/7 |
| 2011/0208659 A1 | 8/2011 | Easterly et al. | |
| 2012/0290422 A1* | 11/2012 | Bhinder | G06Q 20/047 705/21 |
| 2013/0138516 A1* | 5/2013 | White | G06Q 20/425 705/16 |

\* cited by examiner

| Ticket # | Type | Payment | Time | Total | |
|---|---|---|---|---|---|
| 07/03/2014 | | | | | |
| #AM571 | SALE | CASH | 01:41PM | $9.73 | > |
| 06/16/2014 | | | | | |
| #A69EH | REFUND 417290470 | CARD 8774 | 04:39pm | ($20.56) | > |
| #A66R5 | SALE 417290470 | CARD 8774 | 11:21pm | ($20.56) | > |
| 06/04/2014 | | | | | |
| #A1U3M | REFUND 413385295 | CARD 8774 | 10:07pm | ($29.22) | > |
| #A1U34 | SALE 413385295 | CARD 8774 | 10:03pm | $29.22 | > |
| 06/03/2014 | | | | | |
| #A1VTK | REFUND 413042229 | CARD 9906 | 11:04pm | ($54.11) | > |
| #A1V0@ | SALE 413042229 | CARD 9906 | 10:54pm | $54.11 | > |
| 06/02/2014 | | | | | |
| #A1WNT | REFUND 412673894 | CARD 9906 | 01:01pm | ($21.64) | > |

Select Item to Review Ticket

| Total Sales | Card Sales | Cash Sales | Total Taxes | Total Refunds | Tax Refunds | Map |
|---|---|---|---|---|---|---|
| July 06, 2014 | | | | | | |
| $0.00 | $0.00 | $62.75 | $0.00 | $0.00 | $0.00 | |
| June 29 – July 05, 2014 | | | | | | |
| $9.73 | $0.00 | $0.00 | $0.74 | $0.00 | $0.00 | 📍 |
| June 22 – July 28, 2014 | | | | | | |
| $0.00 | $0.00 | $0.00 | $0.00 | $0.00 | $0.00 | |
| June 15 – July 21, 2014 | | | | | | |
| $20.56 | $20.56 | $0.00 | $1.57 | $20.56 | $1.57 | 📍 |
| June 08 – July 14, 2014 | | | | | | |
| $0.00 | $0.00 | $0.00 | $0.00 | $0.00 | $0.00 | |
| June 01 – July 07, 2014 | | | | | | |
| $104.97 | $104.97 | $0.00 | $8.00 | $104.97 | $8.00 | 📍 |
| May 25 – 31, 2014 | | | | | | |
| $91.95 | $0.00 | $19.47 | $7.01 | $57.35 | $4.37 | 📍 |
| May 18 – 24, 2014 | | | | | | |

*FIG. 28*

| | | | | | | |
|---|---|---|---|---|---|---|
| Total Sales | Card Sales | Cash Sales | Total Taxes | Total Refunds | Tax Refunds | Map |
| July, 2014 | | | | | | |
| $9.73 | $0.00 | $9.73 | $0.74 | $0.00 | $0.00 | ⊙ |
| June, 2014 | | | | | | |
| $125.53 | $125.53 | $0.00 | $9.57 | $125.53 | $9.57 | ⊙ |
| May, 2014 | | | | | | |
| $108.15 | $88.68 | $19.47 | $7.01 | $73.55 | $5.60 | ⊙ |
| April, 2014 | | | | | | |
| $5.14 | $0.00 | $5.14 | $0.39 | $0.00 | $0.00 | ⊙ |
| March, 2014 | | | | | | |
| $58.46 | $34.94 | $23.52 | $1.67 | $34.94 | $0.24 | ⊙ |
| February 01 – 28, 2014 | | | | | | |
| $3.52 | $3.52 | $0.00 | $0.27 | $0.00 | $0.00 | ⊙ |

FIG. 29

| | | | | | | |
|---|---|---|---|---|---|---|
| Total Sales | Card Sales | Cash Sales | Total Taxes | Total Refunds | Tax Refunds | Map |
| July – September, 2014 | | | | | | |
| $9.73 | $0.00 | $9.73 | $0.74 | $0.00 | $0.00 | ⊙ |
| April – June, 2014 | | | | | | |
| $238.82 | $214.21 | $24.61 | $16.97 | $199.08 | $15.17 | ⊙ |
| January – March, 2014 | | | | | | |
| $61.98 | $38.46 | $23.52 | $1.94 | $34.94 | $0.24 | ⊙ |

FIG. 30

| < | 📉 ═ | Type: | Day | Week | Month | Quarter | Year | | ⌂ North Austin |
|---|---|---|---|---|---|---|---|---|---|
| Total Sales | Card Sales | Cash Sales | | Total Taxes | | Total Refunds | | Tax Refunds | Map |
| 2014 | | | | | | | | | |
| $310.53 | $252.67 | $57.86 | | $19.65 | | $234.02 | | $15.41 | 📍 |

FIG. 31

| < Done | Inventory | | | ⌂ North Austin | Basic Tee | |
|---|---|---|---|---|---|---|
| Product | Quantity | Reorder Level | Reorder Quantity | Counted On | Stock at: North Austin | |
| 👕 Basic Tee | 14 | 5 | 10 | 06/02/14 ● | Quantity  − 14 + | ⟳ 06/02/14 |
| 🩳 Cargo Shorts | 30 | 10 | 10 | 06/02/14 | Pending Orders | 0 |
| 🏷 Dress Shirt | 6 | 5 | 5 | 06/02/14 | Reorder Level | 5 |
| 👚 Dri-Fit Knit | 22 | 0 | 0 | 06/02/14 | Reorder Quantity | 10 |
| ☝ Foam Finger | 31 | 10 | 10 | 06/02/14 | Price at Location | $17.99 |
| 🪑 Folding Chair | 12 | 0 | 0 | 06/02/14 | Tags | tags |
| 🏈 Football | 31 | 0 | 0 | 06/02/14 | ⊕ adjust  ⊕ order  ⊕ transfer | |
| 🎎 Garden Gnome | 15 | 0 | 0 | 06/02/14 | ⊗ | Choose Reason |
| 👕 Golf Polo | 3 | 0 | 0 | 06/02/14 | | Quantity: 0 |
| 👟 House Slippers | 14 | 0 | 0 | 06/02/14 | | |
| ✏ Ink Pen | 6 | 0 | 0 | 05/20/14 | | |
| 🔑 Key Chain | 13 | 0 | 0 | 06/02/14 | | |
| 👛 Leather Wallet | 3 | 5 | 10 | 06/02/14 | | |

WIRELESS DATA COMMUNICATION INTERFACE

CLAIMS TO PRIORITY

This patent application is a continuation of and claims the benefit of priority to U.S. application Ser. No. 14/808,962 filed on Jul. 24, 2015, which claims priority to U.S. Provisional Application No. 62/028,763, filed on Jul. 24, 2014, 62/028,933, filed on Jul. 25, 2014, 62/030,335 filed on Jul. 29, 2014, and 62/081,329 filed on Nov. 18, 2014, which are incorporated herein by reference in their entireties.

BACKGROUND

Description of the Related Art

Mobile commerce, colloquially known as wireless commerce or wireless payment, includes the buying and selling of products or services with payment facilitated over mobile or wireless electronic payment systems such as the Internet-connected cellular phones, tablets, and other wirelessly computer network-connected hardware. The amount of trade conducted electronically has grown rapidly with widespread Internet usage and has further increased with the proliferation of mobile computing devices capable of accessing the Internet. Such mobile computing devices include laptop computers, tablet computers, and handheld telephones.

Most wireless commerce still frequently involves fulfillment of an order through the acquisition of physical items by a purchaser who pays at the point of sale through a tangible payment credential backed by issuing financial institution. In the majority of transactions, the purchase transaction is slowed by the necessity of presenting a physical credential that is then manually converted to a representation as electronic signals (e.g., by scanning a credit card) at the point of sale for remote verification prior to transaction completion through the delivery of a physical package containing goods.

In today's environment, however, merchants encounter a bottleneck to transaction completion as the physical credential is converted to a representation as electronic signals (e.g., by scanning a credit card) at the point of sale, creating significant technology roadblocks in the journey to omnichannel commerce. These roadblocks, or friction points, can hamper a merchant's ability to deploy new sales channels; reach new and existing customers with relevant, effective promotions and offers; and ultimately expand their businesses. In other words, these friction points can prevent a business from operating smoothly and reaching its full potential.

These friction points include communication support to enable a payment service provider to process payments across multiple channels, some of which involve wireless transaction communication. Today, many merchants must rely on separate payments providers for their in-store, e-commerce, and mobile (wireless) sales, with significant manual interventions.

These friction points, especially with regard to inadequacies in wireless communication infrastructure in mobile (wireless) throttle the communication of information useful to sales in many channels of commerce.

SUMMARY

Some embodiments include a system for providing a wireless data communication interface. In some embodiments, the system includes one or more computers configured to implement by executing instructions on one or more processors a platform-agnostic wireless data communication system. In some embodiments, the system includes one or more receiving modules for receiving over a wireless data communication channel a tokenized first item of financial transaction information from a customer mobile device presenting a customer-facing interface, and receiving a second item of financial transaction information from a merchant-facing point-of-sale interface connected to the mobile device through the wireless data communication channel. In some embodiments, the system includes a point of sale server for rendering in a common internal format the first item of financial transaction information from the customer-facing interface, and rendering in the common internal format the second item of financial transaction information from the merchant-facing point-of-sale interface.

In some embodiments, the system includes a payment processing module for rendering in a second format the first item of financial transaction information for payment processing by a first external financial party. In some embodiments, the rendering in the second format comprises converting the tokenized first item of financial transaction information to an account-specific item of financial transaction information using an account identifier associated with the tokenized first item in a registry stored in a secured account data vault. In some embodiments, the system includes a payment processing module for rendering in a third format the second item of financial transaction information for payment processing by a second external financial party. In some embodiments, the system includes a transaction execution module for transmitting in the second format the first item of financial transaction information for payment processing by the first external financial party. In some embodiments, the second format includes the financial transaction information using the account identifier associated with the tokenized first item in a registry stored in a secured account data vault, and transmitting in the third format the second item of financial transaction information for payment processing by the second external financial party.

BRIEF DESCRIPTION OF THE DRAWINGS

FIG. 19 is a user interface for selecting for review a sales ticket for unified inventory and financial transaction management, according to some embodiments.

FIG. 20 is a user interface for reviewing a sales ticket for unified inventory and financial transaction management, according to some embodiments.

FIG. 21 is a user interface for selecting for review an item in a sales ticket for unified inventory and financial transaction management, according to some embodiments.

FIG. 28 is a user interface for reviewing an overview of transactions in a system for unified inventory and financial transaction management, according to some embodiments.

FIG. 29 is a user interface for reviewing an overview of transactions in a system for unified inventory and financial transaction management, according to some embodiments.

FIG. 30 is a user interface for reviewing an overview of transactions in a system for unified inventory and financial transaction management, according to some embodiments.

FIG. 31 is a user interface for reviewing an overview of transactions in a system for unified inventory and financial transaction management, according to some embodiments.

FIG. 32 is a user interface for reviewing an overview of inventory in a system for unified inventory and financial transaction management, according to some embodiments.

FIG. 34 is a user interface for recording a transaction in a system for unified inventory and financial transaction management, according to some embodiments.

FIG. 35 is a user interface for reporting a transaction in a system for unified inventory and financial transaction management, according to some embodiments.

Figure 1:
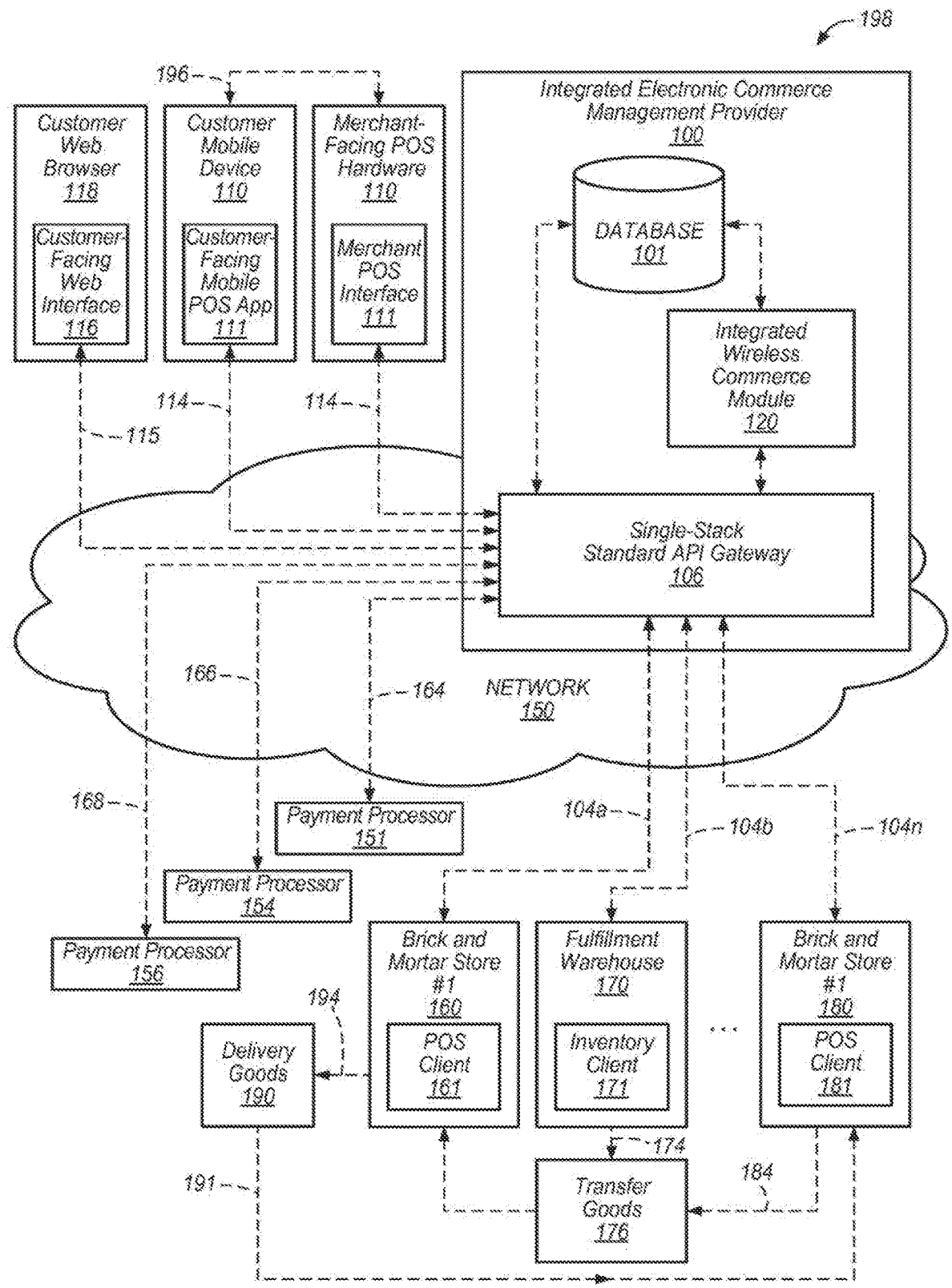
FIG. 1 depicts a distributed system that may implement a wireless data communication interface, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Brief Introduction to Wireless Data Communication Interfaces for Electronic Commerce Management Facilitating Omnichannel Commerce Some embodiments include a system for providing a wireless data communication interface. In some embodiments, the system includes one or more computers configured to implement by executing instructions on one or more processors a platform-agnostic wireless data communication system. In some embodiments, the system includes one or more receiving modules for receiving over a wireless data communication channel a tokenized first item of financial transaction information from a customer mobile device presenting a customer-facing interface, and receiving a second item of financial transaction information from a merchant-facing point-of-sale interface connected to the mobile device through the wireless data communication channel. In some embodiments, the system includes a point of sale server for rendering in a common internal format the first item of financial transaction information from the customer-facing interface, and rendering in the common internal format the second item of financial transaction information from the merchant-facing point-of-sale interface.

In some embodiments, the system includes a payment processing module for rendering in a second format the first item of financial transaction information for payment processing by a first external financial party. In some embodiments, the rendering in the second format includes converting the tokenized first item of financial transaction information to an account-specific item of financial transaction information using an account identifier associated with the tokenized first item in a registry stored in a secured account data vault. In some embodiments, the system includes a payment processing module for rendering in a third format the second item of financial transaction information for payment processing by a second external financial party. In some embodiments, the system includes a transaction execution module for transmitting in the second format the first item of financial transaction information for payment processing by the first external financial party, wherein the second format includes the financial transaction information using the account identifier associated with the tokenized first item in a registry stored in a secured account data vault, and transmitting in the third format the second item of financial transaction information for payment processing by the second external financial party.

In some embodiments, the system includes an authentication module for recognizing a customer mobile device located in an area defined within a geofence, identifying a customer associated with the customer mobile device based at least in part on a presence of an application executing on the customer mobile device, and issuing a session token to the application on the customer mobile device.

In some embodiments, the transmitting in the second format the first item of financial transaction information for payment processing by the first external financial party, includes transmitting in the second format the first item of financial transaction information for payment processing by the first external financial party such that the second format includes the financial transaction information using the account identifier associated with the tokenized first item in a registry stored in the secured account data vault without transmitting the financial transaction information using the account identifier associated with the tokenized first item in the registry stored in the secured account data vault to the merchant-facing point-of-sale interface.

In some embodiments, the receiving over a wireless data communication channel a tokenized first item of financial transaction information from a customer mobile device presenting a customer-facing interface further includes receiving over a Bluetooth low energy radio communication channel a tokenized first item of financial transaction information from a customer mobile device presenting a customer-facing interface. In some embodiments, the receiving a second item of financial transaction information from a merchant-facing point-of-sale interface connected to the mobile device through the wireless data communication channel further includes receiving over a broadband wireless network a second item of financial transaction information from a merchant-facing point-of-sale interface connected to the mobile device through the wireless data communication channel.

In some embodiments, the one or more receiving modules include a single stack application program interface residing on one of the one or more servers. In some embodiments, the transaction execution module is further configured for receiving on the one or more servers a transaction authorization confirmation from the first external financial party, and the point of sale server is further configured for transmitting to the customer-facing interface an indication of the transaction authorization confirmation. In some embodiments, the payment processing module includes a payment processing gateway for communicating with servers of external financial processors using encrypted links over a network.

Some embodiments include a method for providing a wireless data communication interface. In some embodiments, the method includes one or more computers executing instructions on one or more processors for a wireless data communication interface method. In some embodiments, the method includes one or more receiving modules receiving over a wireless data communication channel a tokenized first item of financial transaction information from a customer mobile device presenting a customer-facing interface. In some embodiments, the method includes one or more receiving modules receiving a second item of financial transaction information from a merchant-facing point-of-sale interface connected to the mobile device through the wireless data communication channel.

In some embodiments, the method includes a point of sale server rendering in a common internal format the first item of financial transaction information from the customer-facing interface. In some embodiments, the method includes the point of sale server rendering in the common internal format the second item of financial transaction information from the merchant-facing point-of-sale interface.

In some embodiments, the method includes a payment processing module rendering in a second format the first item of financial transaction information for payment processing by a first external financial party. In some embodiments, the rendering in the second format includes converting the tokenized first item of financial transaction information to an account-specific item of financial transaction information using an account identifier associated with the tokenized first item in a registry stored in a secured account data vault. In some embodiments, the method includes the payment processing module rendering in a third format the second item of financial transaction information for payment processing by a second external financial party.

In some embodiments, the method includes a transaction execution module transmitting in the second format the first item of financial transaction information for payment processing by the first external financial, party, wherein the second format includes the financial transaction information using the account identifier associated with the tokenized first item in a registry stored in a secured account data vault. In some embodiments, the method includes the payment processing module transmitting in the third format the second item of financial transaction information for payment processing by the second external financial party.

In some embodiments, the method includes an authentication module recognizing a customer mobile device located in an area defined within a geofence, identifying a customer associated with the customer mobile device based at least in part on a presence of an application executing on the customer mobile device, and issuing a session token to the application on the customer mobile device.

In some embodiments, the transmitting in the second format the first item of financial transaction information for payment processing by the first external financial party further includes transmitting in the second format the first item of financial transaction information for payment processing by the first external financial party, wherein the second format includes the financial transaction information using the account identifier associated with the tokenized first item in a registry stored in the secured account data vault without transmitting the financial transaction information using the account identifier associated with the tokenized first item in the registry stored in the secured account data vault to the merchant-facing point-of-sale interface.

In some embodiments, the receiving over a wireless data communication channel a tokenized first item of financial transaction information from a customer mobile device presenting a customer-facing interface further includes receiving over a Bluetooth low energy radio communication channel a tokenized first item of financial transaction information from a customer mobile device presenting a customer-facing interface. In some embodiments, the receiving a second item of financial transaction information from a merchant-facing point-of-sale interface connected to the mobile device through the wireless data communication channel further includes receiving over a broadband wireless network a second item of financial transaction information from a merchant-facing point-of-sale interface connected to the mobile device through the wireless data communication channel.

In some embodiments, the one or more receiving modules include a single stack application program interface residing on one of the one or more servers. In some embodiments, the transaction execution module is further configured for receiving on the one or more servers a transaction authorization confirmation from the first external financial party, and the point of sale server is further configured for transmitting to the customer-facing interface an indication of the transaction authorization confirmation. In some embodiments, the payment processing module includes a payment processing gateway for communicating with servers of external financial processors using encrypted links over a network.

Some embodiments include a non-transitory computer-readable storage medium storing program instructions for providing a wireless data communication interface. In some embodiments, the program instructions are computer-executable to implement one or more receiving modules receiving over a wireless data communication channel a tokenized first item of financial transaction information from a customer mobile device presenting a customer-facing interface. In some embodiments, the program instructions are computer-executable to implement one or more receiving modules receiving a second item of financial transaction information from a merchant-facing point-of-sale interface connected to the mobile device through the wireless data communication channel.

In some embodiments, the program instructions are computer-executable to implement a point of sale server rendering in-a common internal format the first item of financial transaction information from the customer-facing interface. In some embodiments, the program instructions are computer-executable to implement the point of sale server rendering in the common internal format the second item of financial transaction information from the merchant-facing point-of-sale interface.

In some embodiments, the program instructions, are computer-executable to implement a payment processing module rendering in a second format the first item of financial transaction information for payment processing by a first external financial party. In some embodiments, the rendering in the second format includes converting the tokenized first item of financial transaction information to an account-specific item of financial transaction information using an account identifier associated with the tokenized first item in a registry stored in a secured account data vault. In some embodiments, the program instructions are computer-executable to implement the payment processing module rendering in a third format the second item of financial transaction information for payment processing by a second external financial party.

In some embodiments, the program instructions are computer-executable to implement a transaction execution module transmitting in the second format the first item of financial transaction information for payment processing by the first external financial party, wherein the second format includes the financial transaction information using the account identifier associated with the tokenized first item in a registry stored in a secured account data vault. In some embodiments, the program instructions are computer-executable to implement the payment processing module transmitting in the third format the second item of financial transaction information for payment processing by the second external financial party.

In some embodiments, the program instructions are computer-executable to implement an authentication module recognizing a customer mobile device located in an area defined within a geofence, identifying a customer associated with the customer mobile device based at least in part on a presence of an application executing on the customer mobile device, and issuing a session token to the application on the customer mobile device.

In some embodiments, the program instructions computer executable to implement the transmitting in the second format the first item of financial transaction information for payment processing by the first external financial party further include program instructions computer executable to implement transmitting in the second format the first item of financial transaction information for payment processing by the first external financial party, wherein the second format includes the financial transaction information using the account identifier associated with the tokenized first item in a registry stored in the secured account data vault without transmitting the financial transaction information using the account identifier associated with the tokenized first item in the registry stored in the secured account data vault to the merchant-facing point-of-sale interface.

In some embodiments, the program instructions computer executable to implement receiving over a wireless data communication channel a tokenized first item of financial transaction information from a customer mobile device presenting a customer-facing interface further include program instructions computer executable to implement receiving over a Bluetooth low energy radio communication channel a tokenized first item of financial transaction information from a customer mobile device presenting a customer-facing interface.

In some embodiments, the program instructions computer executable to implement receiving a second item of financial transaction information from a merchant-facing point-of-sale interface connected to the mobile device through the wireless data communication channel further include program instructions computer executable to implement receiving over a broadband wireless network a second item of financial transaction information from a merchant-facing point-of-sale interface connected to the mobile device through the wireless data communication channel.

In some embodiments, the program instructions are computer-executable to implement the one or more receiving modules include a single stack application program interface residing on one of the one or more servers.

In some embodiments, the transaction execution module is further configured for receiving on the one or more servers a transaction authorization confirmation from the first external financial party, and the point of sale server is further configured for transmitting to the customer-facing interface an indication of the transaction authorization confirmation.

Brief Introduction to Electronic Commerce Management for Omnichannel Commerce Enabled by Wireless Data Communication Interfaces Some embodiments include a system for unified inventory and financial transaction management through which a single commercial transaction triggers an integrated system to perform series of both inventory and financial operations as a unified operation as described herein. Some embodiments reduce the complications and unnecessary costs of managing payments partnerships across multiple channels that bring friction into a merchant's business and present artificial barriers to success. In some embodiments, a system for unified inventory and financial transaction management reduces friction caused by disparate processing rates, extra reconciliation paperwork and misaligned inventory by providing an all-in-one payments solution capable, in some embodiments, of receiving data from multiple customer touchpoints across multiple ones of a merchant's channels.

In some embodiments, friction points can be eliminated with the implementation of a system for unified inventory and financial transaction management in multiple channels. Some embodiments of a system for unified inventory and financial transaction management accept mobile, online and point-of-sale payments under a single merchant account, providing room scaling that allows merchants to take advantage of new opportunities for expansion and growth.

Some embodiments of a system for unified inventory and financial transaction management support a merchant that operates a physical store, operates an online store, accepts payments on a mobile device, or any combination of those channels. Some embodiments of a system for unified inventory and financial transaction management present a single merchant account to reduce reconciliation and accounting headaches and to provide one version of the data through consolidated reports across all channels and touchpoints. Some embodiments of a system for unified inventory and financial transaction management can also handle the issues of managing inventory across mobile and c-commerce touchpoints, as well as in the store, providing a single view of the merchandise that's available to sell, and helping businesses balance between inventory and demand.

Some embodiments of a system for unified inventory and financial transaction management support a cloud-based point-of-sale, mobile and eCommerce framework that integrates payments with inventory management.

Some embodiments of a system for unified inventory and financial transaction management real-time, in-app inventory tracking, management and replenishment directly from a mobile application. Some embodiments of a system for unified inventory and financial transaction management provide import and export capabilities that allow merchants to easily transfer and integrate inventory data into other systems. Some embodiments of a system for unified inventory and financial transaction management provide Integration with third party eCommerce platforms—sales and inventory data by location provides merchants more valuable insights into their business. Some embodiments of a system for unified inventory and financial transaction management provide the ability to set replenishment thresholds and alerts and transfer inventory between locations and channels. Some embodiments of a system for unified inventory and financial transaction management adjust inventory for sales and returns in real-time and can also work with a merchant's existing inventory platform, by allowing merchants to integrate in to some embodiments of a system for unified inventory and financial transaction management using application program interfaces.

Some embodiments of a system for unified inventory and financial transaction management can also solve the problems of the friction points mentioned above by eliminating disparate payment processors and processing rates, further simplifying reconciliation across all of a merchant's selling channels. In moving to a single payments provider under some embodiments, merchants can also take advantage of volume pricing, and get the best possible rates for each channel.

Some embodiments of a system for unified inventory and financial transaction management provide business insights, such merchants can leverage data to optimize sales, for example such as how much floor space to allocate to specific products, what items and locations provide the most revenue and profit and what products to feature. Merchants also have the ability to store customer history, past purchases and other customer-specific data to help them become more customer-centric. These systems open the door to integrated loyalty programs and other customer relationship management tools to help merchants know who their best customers are and how to best reach them how, when and where the customer wants to shop.

Some embodiments of a system for unified inventory and financial transaction management also allow developers to integrate payments, inventory and business insights into their platforms through the only single stack of application program interfaces for card present and card not present transactions.

Some embodiments include a system for providing inventory management services from a plurality of disparate inventory resources for transactions received from a plurality of disparate transaction intake platforms. In some embodiments, one or more computers configured to implement executes instructions on one or more processors for a platform-agnostic transaction-related communication system. In some embodiments, the transaction-related communication system includes one or more receiving modules configured for receiving a first item of inventory transaction information from a customer-facing interface, and receiving a second item of inventory transaction information from a merchant-facing point-of-sale interface. In some embodiments, the transaction-related communication system includes an inventory coordination module configured for rendering in a common internal format the first item of inventory transaction information from the customer-facing interface, and rendering in the common internal format the second item of inventory transaction information from the merchant-facing point-of-sale interface. In some embodiments, the transaction-related communication system includes an inventory coordination module configured for transmitting the second item of inventory transaction information for inventory transaction execution by the second inventory resource, and transmitting the first item of inventory transaction information for inventory transaction execution by a first inventory resource.

In some embodiments, the transaction-related communication system includes a synchronization server module configured for providing background updates of transactions to the customer facing interface and the merchant-facing point of sale interface. In some embodiments, the receiving the first item of inventory transaction information from the customer-facing interface further includes receiving in the common intake transaction ticket format over the network from a mobile computing device an order for an item as the first item of inventory transaction information from the customer-facing interface. In some embodiments, the receiving the second item of inventory transaction information from the merchant-facing point-of-sale interface further includes receiving over the network in the common intake transaction ticket format a return of the item as the second item of inventory transaction information from the merchant-facing point-of-sale interface. In some embodiments, the inventory coordination module is further configured for updating a unified inventory database to reflect fulfillment of the order for the item, and the inventory coordination module is further configured for updating a unified inventory database to reflect fulfillment of the return of the item.

In some embodiments, the receiving the first item of inventory transaction information from the customer-facing interface further includes receiving in the common intake transaction ticket format over the network from a mobile computing device an order for an item as the first item of inventory transaction information from the customer-facing interface. In some embodiments, the receiving the second item of inventory transaction information from the merchant-facing point-of-sale interface further includes receiving over the network in the common intake transaction ticket format a return of the item as the second item of inventory transaction information from the merchant-facing point-of-sale interface. In some embodiments, the inventory coordination module is further configured for querying a unified inventory database to ascertain whether fulfillment of the order for the item is possible, and the inventory coordination module is further configured for updating a unified inventory database to reflect fulfillment of the return of the item.

In some embodiments, the common internal format is a common intake transaction ticket format, and the one or more receiving modules include a single stack application program interface residing on one of the one or more servers.

In some embodiments, the receiving the first item of inventory transaction information from the customer-facing interface further includes receiving in the common intake transaction ticket format over the network from a mobile computing device an order for an item as the first item of inventory transaction information from the customer-facing interface. In some embodiments, the receiving the second item of inventory transaction information from the merchant-facing point-of-sale interface further includes receiving over the network in the common intake transaction ticket format a return of the item as the second item of inventory transaction information from the merchant-facing point-of-sale interface. In some embodiments, the inventory coordination module is further configured for updating a unified inventory database to reflect fulfillment of the order for the item from an inventory warehouse resource. In some embodiments, the inventory coordination module is further configured for updating a unified inventory database to reflect fulfillment of the return of the item by updating an in-stock inventory count for a brick-and-mortar retail location housing the merchant-facing point-of-sale interface.

In some embodiments, the system further includes a business intelligence analytics module configured for providing business intelligence based at least in part on the inventory transaction information.

Some embodiments include a method for providing inventory management services from a plurality of disparate inventory resources for transactions received from a plurality of disparate transaction intake platforms. In some embodiments, the method includes one or more computers executing instructions on one or more processors for a platform-agnostic transaction-related communication method.

In some embodiments, the method includes a receiving module receiving a first item of inventory transaction information from a customer-facing interface. In some embodiments, the method includes the receiving module receiving a second item of inventory transaction information from a merchant-facing point-of-sale interface. In some embodiments, the method includes an inventory coordination module rendering in a common internal format the first item of inventory transaction information from the customer-facing interface. In some embodiments, the method includes the inventory coordination module rendering in the common internal format the second item of inventory transaction information from the merchant-facing point-of-sale interface. In some embodiments, the method includes the inventory coordination module transmitting the second item of inventory transaction information for inventory transaction execution by the second inventory resource. In some embodiments, the method includes the inventory coordination module transmitting the first item of inventory transaction information for inventory transaction execution by a first inventory resource.

In some embodiments, the method includes a synchronization server module providing background updates of transactions to the customer facing interface and the merchant-facing point of sale interface. In some embodiments, the receiving the first item of inventory transaction information from the customer-facing interface further includes receiving in the common intake transaction ticket format over the network from a mobile computing device an order for an item as the first item of inventory transaction information from the customer-facing interface. In some embodiments, the receiving the second item of inventory transaction information from the merchant-facing point-of-sale interface further includes receiving over the network in the common intake transaction ticket format a return of the item as the second item of inventory transaction information from the merchant-facing point-of-sale interface. In some embodiments, the method further includes updating a unified inventory database to reflect fulfillment of the order for the item, and the method further includes updating a unified inventory database to reflect fulfillment of the return of the item.

In some embodiments, the receiving the first item of inventory transaction information from the customer-facing interface further includes receiving in the common intake transaction ticket format over the network from a mobile computing device an order for an item as the first item of inventory transaction information from the customer-facing interface. In some embodiments, the receiving the second item of inventory transaction information from the merchant-facing point-of-sale interface further includes receiving over the network in the common intake transaction ticket format a return of the item as the second item of inventory transaction information from the merchant-facing point-of-sale interface. In some embodiments, the method further includes querying a unified inventory database to ascertain whether fulfillment of the order for the item is possible, and the method further includes updating a unified inventory database to reflect fulfillment of the return of the item.

In some embodiments, the common internal format is a common intake transaction ticket format, and the one or more receiving modules include a single stack application program interface residing on one of the one or more servers.

In some embodiments, the receiving the first item of inventory transaction information from the customer-facing interface further includes receiving in the common intake transaction ticket format over the network from a mobile computing device an order for an item as the first item of inventory transaction information from the customer-facing interface. In some embodiments, the receiving the second item of inventory transaction information from the merchant-facing point-of-sale interface further includes receiving over the network in the common intake transaction ticket format a return of the item as the second item of inventory transaction information from the merchant-facing point-of-sale interface.

In some embodiments, the method further includes updating a unified inventory database to reflect fulfillment of the order for the item, from an inventory warehouse resource, and the method further includes updating a unified inventory database to reflect fulfillment of the return of the item by updating an in-stock inventory count for a brick-and-mortar retail location housing the merchant-facing point-of-sale interface.

In some embodiments, the method further includes a business intelligence analytics module providing business intelligence based at least in part on the inventory transaction information.

Some embodiments include a non-transitory computer-readable storage medium storing program instructions for providing payment processing services from a plurality of disparate payment processors to a plurality of disparate transaction intake platforms, wherein the program instructions are computer-executable to implement a receiving module receiving a first item of inventory transaction information from a customer-facing interface and the receiving module receiving a second item of inventory transaction information from a merchant-facing point-of-sale interface. In some embodiments, the program instructions are computer-executable to implement an inventory coordination module rendering in a common internal format the first item of inventory transaction information from the customer-facing interface. In some embodiments, the program instructions are computer-executable to implement the inventory coordination module rendering in the common internal format the second item of inventory transaction information from the merchant-facing point-of-sale interface. In some embodiments, the program instructions are computer-executable to implement the inventory coordination module transmitting the second item of inventory transaction information for inventory transaction execution by the second inventory resource. In some embodiments, the program instructions are computer-executable to implement the inventory coordination module transmitting the first item of inventory transaction information for inventory transaction execution by a first inventory resource.

In some embodiments, the program instructions computer executable to implement receiving the first item of inventory transaction information from the customer-facing interface further include program instructions computer executable to implement receiving in the common intake transaction ticket format over the network from a mobile computing device an order for an item as the first item of inventory transaction information from the customer-facing interface. In some embodiments, the program instructions computer executable to implement receiving, the second item of inventory transaction information from the merchant-facing point-of-sale interface further include program instructions computer executable to implement receiving over the network in the common intake transaction ticket format a return of the item as the second item of inventory transaction information from the merchant-facing point-of-sale interface.

In some embodiments, the non-transitory computer readable storage medium further includes program instructions computer executable to implement updating a unified inventory database to reflect fulfillment of the order for the item, and the non-transitory computer readable storage medium further includes program instructions computer executable to implement updating a unified inventory database to reflect fulfillment of the return of the item.

In some embodiments, the program instructions computer executable to implement receiving the first item of inventory transaction information from the customer-facing interface further include program instructions computer executable to implement receiving in the common intake transaction ticket format over the network from a mobile computing device an order for an item as the first item of inventory transaction information from the customer-facing interface. In some embodiments, the program instructions computer executable to implement receiving the second item of inventory transaction information from the merchant-facing point-of-sale interface further include program instructions computer executable to implement receiving over the network in the common intake transaction ticket format a return of the item as the second item of inventory transaction information from the merchant-facing point-of-sale interface.

In some embodiments, the non-transitory computer readable storage medium further includes program instructions computer executable to implement querying a unified inventory database to ascertain whether fulfillment of the order for the item is possible, and the non-transitory computer readable storage medium further includes program instructions computer executable to implement updating a unified inventory database to reflect fulfillment of the return of the item. In some embodiments, the common internal format is a common intake transaction ticket format, and the one or more receiving modules include a single stack application program interface residing on one of the one or more servers.

In some embodiments, the program instructions computer executable to implement receiving the first item of inventory transaction information from the customer-facing interface further include program instructions computer executable to implement receiving in the common intake transaction ticket format over the network from a mobile computing device an order for an item as the first item of inventory transaction information from the customer-facing interface.

In some embodiments, the program instructions computer executable to implement receiving the second item of inventory transaction information from the merchant-facing point-of-sale interface further include program instructions computer executable to implement receiving over the network in the common intake transaction ticket format a return of the item as the second item of inventory transaction information from the merchant-facing point-of-sale interface.

In some embodiments, the non-transitory computer readable storage medium further includes program instructions computer executable to implement updating a unified inventory database to reflect fulfillment of the order for the item from an inventory warehouse resource.

In some embodiments, the non-transitory computer readable storage medium further includes program instructions computer executable to implement updating a unified inventory database to reflect fulfillment of the return of the item by updating an in-stock inventory count for a brick-and-mortar retail location housing the merchant-facing point-of-sale interface.

In some embodiments, the system includes a processor and program instructions computer-executable to implement a system for providing payment processing services from a plurality of disparate payment processors to a plurality of disparate transaction intake platforms. In some embodiments, the system includes one or more computers configured to implement by executing instructions on one or more processors a platform-agnostic transaction-related communication system. In some embodiments, the transaction-related communication system includes one or more receiving modules for receiving a first item of financial transaction information from a customer-facing interface, and receiving a second item of financial transaction information from a merchant-facing point-of-sale interface.

In some embodiments, the transaction-related communication system includes a point of sale server for rendering in a common internal format the first item of financial transaction information from the customer-facing interface, and rendering in the common internal format the second item of financial transaction information from the merchant-facing point-of-sale interface. In some embodiments, the transaction-related communication system includes a payment processing module configured for rendering in a second format the first item of financial transaction information for payment processing by a first external financial party, and rendering in a third format the first item of financial transaction information for payment processing by a second external financial party.

In some embodiments, the transaction-related communication system includes a transaction execution module configured for transmitting in the second format the first item of financial transaction information for payment processing by the first external financial party, and transmitting in the third format the second item of financial transaction information for payment processing by the second external financial party.

In some embodiments, the system supports providing payment processing services from a plurality of disparate payment processors to a plurality of disparate transaction intake platforms. In some embodiments, the common internal format is a common intake transaction ticket format. In some embodiments, the one or more receiving modules include a single stack application program interface residing on one of the one or more servers. In some embodiments, the receiving the first item of financial transaction information from the customer-facing interface further includes receiving in the common intake transaction ticket format over the network from a mobile computing device the first item of financial transaction information from the customer-facing interface. In some embodiments, the receiving the second item of financial transaction information from the merchant-facing point-of-sale interface further includes receiving over the network in the common intake transaction ticket format the second item of financial transaction information from the merchant-facing point-of-sale interface.

In some embodiments, the common internal format is a common intake transaction ticket format. In some embodiments, the system further includes a first translation module on a mobile computing device for receiving from a customer facing application including the customer-facing interface on the mobile computing device the first item of financial transaction information, and translating to a common intake transaction ticket format the first item of financial transaction information. In some embodiments, the system further includes a second translation module on a merchant-facing point of sale device for receiving from a merchant facing application including the merchant-facing point-of-sale interface on a merchant point of sale device the second item of financial transaction information, and translating to the common intake transaction ticket format the second item of financial transaction information.

In some embodiments, the one or more receiving modules include a single stack application program interface residing on one of the one or more servers. In some embodiments, the server communicates remotely with the mobile computing device over a wireless network. In some embodiments, the server communicates remotely with the merchant-facing point of sale device over a second network. In some embodiments, the receiving the first item of financial transaction information from the customer-facing interface further includes receiving in the common intake transaction ticket format at the single stack application interface from the mobile computing device the first item of financial transaction information from the customer-facing interface. In some embodiments, the receiving the second item of financial transaction information from the merchant-facing point-of-sale interface further includes receiving in the common intake transaction ticket format at the single stack application interface the second item of financial transaction information from the merchant-facing point-of-sale interface.

In some embodiments, the transaction execution module is further configured for receiving on the one or more servers a transaction authorization confirmation from the first external financial party, and the point of sale server is further configured for transmitting to the customer-facing interface an indication of the transaction authorization confirmation. In some embodiments, the payment processing module includes a payment processing gateway for communicating with servers of external financial processors using encrypted links over a network.

In some embodiments, the system for providing payment processing services from a plurality of disparate payment processors to a plurality of disparate transaction intake platforms further includes a business intelligence analytics module configured for providing business intelligence based at least in part on the first item of financial transaction information.

In some embodiments, the system for providing payment processing services from a plurality of disparate payment processors to a plurality of disparate transaction intake platforms further includes an inventory coordination module configured for providing transaction fulfillment information based at least in part on the first item of financial transaction information.

Some embodiments include a method for providing payment processing services from a plurality of disparate payment processors to a plurality of disparate transaction intake platforms. In some embodiments, the method includes causing modules, implemented as hardware, software, or a combination of hardware and software on one or more computers executing instructions on one or more processors to implement a platform-agnostic transaction-r-elated communication system that performs a method including receiving a first item of financial transaction information from a customer-facing interface and receiving a second item of financial transaction information from a merchant-facing point-of-sale interface.

In some embodiments, the method includes rendering in a common internal format the first item of financial transaction information from the customer-facing interface. In some embodiments, the method includes rendering in the common internal format the second item of financial transaction information from the merchant-facing point-of-sale interface. In some embodiments, the method includes rendering in a second format the first item of financial transaction information for payment processing by a first external financial party. In some embodiments, the method includes rendering in a third format the first item of financial transaction information for payment processing by a second external financial party.

In some embodiments, the method includes transmitting in the second format the first item of financial transaction information for payment processing by the first external financial party. In some embodiments, the method includes transmitting in the third format the second item of financial transaction information for payment processing by the second external financial party.

In some embodiments, the method includes providing payment processing services from a plurality of disparate payment processors to a plurality of disparate transaction intake platforms. In some embodiments, the common internal format is a common intake transaction ticket format.

In some embodiments, the receiving the first item of financial transaction information from the customer-facing interface further includes receiving in the common intake transaction ticket format over the network from a mobile computing, device the first item of financial transaction information from the customer-facing interface. In some embodiments, the receiving the second item of financial transaction information from the merchant-facing point-of-sale interface further includes receiving over the network in the common intake transaction ticket format the second item of financial transaction information from the merchant-facing point-of-sale interface.

In some embodiments, the common internal format is a common intake transaction ticket format, and the method further includes receiving from a customer facing application including the customer-facing interface on the mobile computing device the first item of financial transaction information. In some embodiments, the common internal format is a common intake transaction ticket format, and the method further includes translating to a common intake transaction ticket format the first item of financial transaction information. In some embodiments, the common internal format is a common intake transaction ticket format, and the method further includes receiving from a merchant facing application including the merchant-facing point-of-sale interface on a merchant point of sale device the second item of financial transaction information. In some embodiments, the common internal format is a common intake transaction ticket format, and the method further includes translating to the common intake transaction ticket format the second item of financial transaction information.

In some embodiments, the receiving the first item of financial transaction information from the customer-facing interface further includes receiving in the common intake transaction ticket format at a single stack application interface from the mobile computing device the first item of financial transaction information from the customer-facing interface. In some embodiments, the receiving the second item of financial transaction information from the merchant-facing point-of-sale interface further includes receiving in the common intake transaction ticket format at the single stack application interface the second item of financial transaction information from the merchant-facing point-of-sale interface.

In some embodiments, the method further includes receiving on the one or more servers a transaction authorization confirmation from the first external financial party, and transmitting to the customer-facing interface an indication of the transaction authorization confirmation. In some embodiments, the method further includes a payment processing gateway communicating with servers of external financial processors using encrypted links over a network. In some embodiments, the method further includes a business intelligence analytics module providing business intelligence based at least in part on the first item of financial transaction information.

In some embodiments, the method further includes an inventory coordination module providing transaction fulfillment information based at least in part on the first item of financial transaction information.

Some embodiments include a non-transitory computer-readable storage medium storing program instructions for providing payment processing services from a plurality of disparate payment processors to a plurality of disparate transaction intake platforms. In some embodiments, the program instructions are computer-executable to implement receiving a first item of financial transaction information from a customer-facing interface. In some embodiments, the program instructions are computer-executable to implement receiving a second item of financial transaction information from a merchant-facing point-of-sale interface. In some embodiments, the program instructions are computer-executable to implement rendering in a common internal format the first item of financial transaction information from the customer-facing interface. In some embodiments, the program instructions are computer-executable to implement rendering in the common internal format the second item of financial transaction information from the merchant-facing point-of-sale interface.

In some embodiments, the program instructions are computer-executable to implement transmitting in the second format the first item of financial transaction information for payment processing by the first external financial party. In some embodiments, the program instructions are computer-executable to implement transmitting in the third format the second item of financial transaction information for payment processing by the second external financial party.

In some embodiments, the common internal format is a common intake transaction ticket format. In some embodiments, the program instructions computer-executable to implement receiving the first item of financial transaction information from the customer-facing interface further include program instructions computer-executable to implement receiving in the common intake transaction ticket format over the network from a mobile computing device the first item of financial transaction information from the customer-facing interface. In some embodiments, the program instructions computer-executable to implement receiving the second item of financial transaction information from the merchant-facing point-of-sale interface further include program instructions computer-executable to implement receiving over the network in the common intake transaction ticket format the second item of financial transaction information from the merchant-facing point-of-sale interface.

In some embodiments, the common internal format is a common intake transaction ticket format. In some embodiments, the program instructions computer-executable for providing payment processing services further include program instructions computer-executable to implement receiving from a customer facing application including the customer-facing interface on the mobile computing device the first item of financial transaction information. In some embodiments, the program instructions computer-executable for providing payment processing services further include program instructions computer-executable to implement translating to a common intake transaction ticket format the first item of financial transaction information. In some embodiments, the program instructions for providing payment processing services further include program instructions computer-executable to implement receiving from a merchant facing application including the merchant-facing point-of-sale interface on a merchant point of sale device the second item of financial transaction information. In some embodiments, the program instructions for providing payment processing services further include program instructions, computer-executable to implement translating to the common intake transaction ticket format the second item of financial transaction information.

In some embodiments, the one or more receiving modules include a single stack application program interface residing on one of the one or more servers. In some embodiments, the program instructions computer-executable to implement receiving the first item of financial transaction information from the customer-facing interface further include program instructions computer-executable to implement receiving in the common intake transaction ticket format at the single stack application interface from the mobile computing device the first item of financial transaction information from the customer-facing interface. In some embodiments, the program instructions computer-executable to implement receiving the second item of financial transaction information from the merchant-facing point-of-sale interface further include program instructions computer-executable to implement receiving in the common intake transaction ticket format at the single stack application interface the second item of financial transaction information from the merchant-facing point-of-sale interface.

In some embodiments, the program instructions for providing payment processing services further include program instructions computer-executable to implement receiving on the one or more servers a transaction authorization confirmation from the first external financial party, and program instructions computer-executable to implement transmitting to the customer-facing interface an indication of the transaction authorization confirmation. In some embodiments, the program instructions for providing payment processing services further include program instructions computer-executable to implement further include program instructions computer-executable to implement a payment processing gateway for communicating with servers of external financial processors using encrypted links over a network.

In some embodiments, the program instructions for providing payment processing services further include program instructions computer-executable to implement program instructions computer-executable to implement a business intelligence analytics module configured for providing business intelligence based at least in part on the first item of financial transaction information. In some embodiments, the program instructions for providing payment processing services further include program instructions computer-executable to implement program instructions computer-executable to implement an inventory coordination module configured for transaction fulfillment information based at least in part on the first item of financial transaction information.

Example Implementations

FIG. 1 depicts a distributed system that may implement a wireless data communication interface, according to some embodiments. An integrated electronic commerce management provider 100 hosts a system 198 for providing payment processing services from a plurality of disparate payment processors 151-156 to a plurality of disparate transaction intake platforms 118, 110 and 110. Integrated electronic commerce management provider 100 includes, in some embodiments, a database 101 storing electronic commerce inventory and transaction records in a common internal format. Integrated electronic commerce management provider 100 includes, in some embodiments, an integrated wireless commerce module 120 for implementing platform-agnostic transaction-related communication across a single-stack standard application program interface gateway 106. An ordering customer client embodied in the form of a customer mobile device 110, a merchant client embodied in the form of a cash register or other form of merchant-facing point of sale hardware 110, a customer web browser 118, payment processors 151-156, a point of sale location embodied as a brick-and-mortar store 160, an inventory resource embodied as a fulfillment warehouse 170, and another point of sale location embodied as a brick-and-mortar store 180 communicate across network 150 with integrated wireless commerce module 120 to implement platform-agnostic transaction-related communication using single-stack standard application program interface gateway 106.

On customer mobile device 110, a customer-facing an order interface embodied as a customer-facing mobile point of sale application 111 undertakes transaction communications 114 with single-stack standard application program interface gateway 106 over network 150. On customer web browser 118 (e.g., executing on a desktop PC), a customer-facing an order interface embodied as a customer-facing web interface 116 undertakes transaction communications 115 with single-stack standard application program interface gateway 106 over network 150. On merchant-facing point-of-sale hardware client 110, a merchant point of sale interface 111 undertakes transaction communications 114 with single-stack standard application program interface gateway 106 over network 150. Payment processors 151-156 undertake transaction communications 164-168 with single-stack standard application program interface gateway 106 over network 150. In some embodiments, wireless transaction communications 196 are undertaken between customer mobile device 110 and merchant-facing point of sale hardware 110 to automate creation of transactions.

In some embodiments, integrated electronic commerce management provider 100 provides a system for providing a wireless data communication interface. In some embodiments, the system 198 includes one or more computers, such as will be discussed below with respect to FIG. 36, configured to implement by executing instructions on one or more processors to provide a platform-agnostic wireless data communication system. In some embodiments, an integrated wireless commerce module 120 includes one or more receiving modules for receiving over a wireless data communication channel (as part of transaction communications 114) a tokenized first item of financial transaction information from a customer mobile device 110 presenting a customer-facing interface (e.g., customer facing mobile POS app 111), and receiving (as part of transaction communications 114) a second item of financial transaction information from a merchant-facing point-of-sale interface connected to the mobile device through the wireless data communication channel.

In some embodiments, integrated wireless commerce module 120 provides a point of sale server for rendering in a common, internal format the first item of financial transaction information from the customer-facing interface (e.g., from customer-facing mobile POS app 111), and rendering in the common internal format the second item of financial transaction information from the merchant-facing point-of-sale interface (e.g., merchant POS interface 111).

In some embodiments, integrated wireless commerce module 120 provides a payment processing module for rendering in a second format the first item of financial transaction information for payment processing by a first external financial party (e.g., one of payment processors 151-156). In some embodiments, the rendering in the second format includes converting the tokenized first item of financial transaction information to an account-specific item of financial transaction information using an account identifier associated with the tokenized first item in a registry stored in a secured account data vault, and rendering in a third format the second item of financial transaction information for payment processing, by a second external financial party (e.g., one of payment processors 151-156).

In some embodiments, integrated wireless commerce module 120 provides a transaction execution module for transmitting in the second format the first item of financial transaction information for payment processing by the first external financial party (e.g., one of payment processors 151-156). In some embodiments, the second format includes the financial transaction information using the account identifier associated with the tokenized first item in a registry stored in a secured account data vault. In some embodiments, the transaction execution module is further configured for transmitting in the third format the second item of financial transaction information for payment processing by the second external financial party.

In some embodiments, integrated wireless commerce module 120 provides an authentication module for recognizing a customer mobile device (e.g., customer mobile device 110 hosting customer-facing mobile POS app 111) located in an area defined within a geofence, identifying a customer associated with the customer mobile device 110 based at least in part on a presence of an application (e.g., customer-facing mobile POS app 111) executing on the customer mobile device, and issuing a session token to the application on the customer mobile device 110.

In some embodiments, the transmitting in the second format the first item of financial transaction information for payment processing by the first external financial party (e.g., one of payment processors 151-156) in the second format further includes transmitting in the second format the first item of financial transaction information for payment processing by the first external financial party. In some embodiments, the transmitting financial transaction information using the account identifier associated with the tokenized first item in a registry stored in the secured account data vault without transmitting the financial transaction information using the account identifier associated with the tokenized first item in the registry stored in the secured account data vault to the merchant-facing point-of-sale interface.

In some embodiments, the receiving over a wireless data communication channel a tokenized first item of financial transaction information from a customer mobile device (e.g., customer mobile device 110 hosting customer-facing mobile POS app 111) presenting a customer-facing interface (e.g., customer-facing mobile POS app 111) further includes receiving over a Bluetooth low energy radio communication channel a tokenized first item of financial transaction information from a customer mobile device presenting a customer-facing interface.

In some embodiments, the receiving a second item of financial transaction information from a merchant-facing point-of-sale interface (e.g., merchant POS interface 111) connected to the mobile device through the wireless data communication channel 196 further includes receiving over a broadband wireless network a second item of financial transaction information from a merchant-facing point-of-sale interface (e.g., merchant POS interface 111) connected to the mobile device (e.g., customer mobile device 110 hosting customer-facing mobile POS app 11*l*) through the wireless data communication channel 196.

In some embodiments, the one or more receiving modules include a single stack application program interface 106 residing on one of the one or more servers.

In some embodiments, the transaction execution module is further configured for receiving on the one or more servers a transaction authorization confirmation from the first external financial party (e.g., one of payment processors 151-156).

In some embodiments, the point of sale server is further configured for transmitting to the customer-facing interface (e.g., customer mobile device 110 hosting customer-facing mobile POS app 111) an indication of the transaction authorization confirmation.

In some embodiments, the payment processing module includes a payment processing gateway (e.g., single stack application program interface 106) for communicating with servers of external financial processors (e.g., one of payment processors 151-156) using encrypted links over a network.

In some embodiments, inventory transactions can be reported by or ordered by transaction communication 104*a*-104*n* over network 150 to point of sale client 161, inventory client 171, and point of sale client 181. In some embodiments, inventory transactions involve the delivery 194 or return 191 of delivery goods 190. Likewise, inventory transactions involve the transfer 184 from a first point of sale location in the form of second brick and mortar store 180 to a second point of sale location in the form of first brick and mortar store 160 or the transfer 174 from an inventory resource in the form of fulfillment warehouse 170 to a point of sale location in the form of first brick and mortar store 160.

In some embodiments, the system 198 includes one or more computers, such as will be discussed below with respect to FIG. 36, configured to implement by executing instructions on one or more processors a platform-agnostic transaction-related communication system. In some embodiments, the transaction-related communication system includes one or more receiving modules, which can, in some example embodiments, be located in or executing on customer web browser 118, customer mobile device 110, merchant facing point of sale hardware 110, or integrated electronic commerce module 104, for receiving a first item of financial transaction information from a customer-facing interface (for example, in some embodiments customer facing mobile point of sale application 111 or customer facing web interface 116), and receiving a second item of financial transaction information from a merchant-facing point-of-sale interface (for example, in some embodiments merchant point of sale interface 111). As one of skill in the art will readily comprehend in light of having read the present disclosure, any function described as having been performed by a module or interface of the present disclosure can be performed by another interface or module of the present disclosure without departing from the scope and intent of the present disclosure.

In some embodiments, the transaction-related communication system includes a point of sale server (for example, in some embodiments located in customer mobile device 110) for rendering in a common internal format the first item of financial transaction information from the customer-facing interface (for example, in some embodiments customer facing mobile point of sale application 111), and rendering in the common internal format the second item of financial transaction information from the merchant-facing point-of-sale interface (for example, in some embodiments merchant point of sale interface 111). In some embodiments, the transaction-related communication system includes a payment processing module (for example, in some embodiments, contained within integrated electronic commerce module 104), for rendering in a second format the first item of financial transaction information for payment processing by a first external financial party (for example, in some embodiments payment processor 151), and rendering in a third format the first item of financial transaction information for payment processing by a second external financial party (for example, in some embodiments payment processor 154).

In some embodiments, the transaction-related communication system includes a transaction execution module (for example, in some embodiments, contained within integrated electronic commerce module 104), for transmitting in the second format the first item of financial transaction information for payment processing by the first external financial party (for example, in some embodiments payment processor 151), and transmitting in the third format the second item of financial transaction information for payment processing by the second external financial party (for example, in some embodiments payment processor 154).

In some embodiments, the system provides payment processing services from a plurality of disparate payment processors (for example, in some embodiments, payment processors 151-156) to a plurality of disparate transaction intake platforms (for example, in some embodiments customer mobile device 110 and merchant facing point of sale hardware 110). In some embodiments, the common internal format is a common intake transaction ticket format. In some embodiments, the one or more receiving modules include a single stack application program interface residing on one of the one or more servers (for example, in some embodiments as a part of single-stack standard application programming interface gateway 106). In some embodiments, the receiving the first item of financial transaction information from the customer-facing interface (for example, in some embodiments customer facing mobile point of sale application 111) further includes receiving in the common intake transaction ticket format over the network from a mobile computing device (for example, in some embodiments customer mobile device 110 or customer web browser 118) the first item of financial transaction information from the customer-facing interface (for example, in some embodiments customer facing mobile point of sale application 111). In some embodiments, the receiving the second item of financial transaction information from the merchant-facing point-of-sale interface (for example, in some embodiments merchant point of sale interface 111) further includes receiving over the network in the common intake transaction ticket format the second item of financial transaction information from the merchant-facing point-of-sale interface (for example, in some embodiments merchant facing point of sale hardware 110).

In some embodiments, the common internal format is a common intake transaction ticket format. In some embodiments, the system further includes a first translation module on a mobile computing device (for example, in some embodiments customer mobile device 110) for receiving from a customer facing application including the customer-facing interface (for example, in some embodiments customer facing mobile point of sale application 111) on the mobile computing device the first item of financial transaction information, and translating to a common intake transaction ticket format the first item of financial transaction information. In some embodiments, the system further includes a second translation module on a merchant-facing point of sale device (for example, in some embodiments merchant facing point of sale hardware 110) for receiving from a merchant facing application (for example, in some embodiments merchant point of sale interface 111) including the merchant-facing point-of-sale interface on a merchant point of sale device the second item of financial transaction information, and translating to the common intake transaction ticket format the second item of financial transaction information.

In some embodiments, the one or more receiving modules include a single stack application program interface residing on one of the one or more servers. In some embodiments, the server (for example, in some embodiments integrated electronic commerce module 104) communicates (for example, in some embodiments sending and receiving communications 114) remotely with the mobile computing device (for example, in some embodiments customer mobile device 110) over a wireless network (for example, in some embodiments network 150). In some embodiments, the server (for example, in some embodiments integrated electronic commerce module 104) communicates remotely with the merchant-facing point of sale device over a second network. In some embodiments, the receiving the first item of financial transaction information from the customer-facing interface (for example, in some embodiments in customer facing mobile point of sale application 111) further includes receiving in the common intake transaction ticket format at the single stack application interface (for example, in some embodiments in single-stack standard application programming interface gateway 106) from the mobile computing device the first item of financial transaction information from the customer-facing interface (for example, in some embodiments in customer-facing mobile point of sale application 111). In some embodiments, the receiving the second item of financial transaction information from the merchant-facing point-of-sale interface further includes receiving in the common intake transaction ticket format at the single stack application interface (for example, in some embodiments in single-stack standard application programming interface gateway 106) the second item of financial transaction information from the merchant-facing point-of-sale interface (for example, in some embodiments merchant point of sale interface 111).

In some embodiments, the transaction execution module (for example, in some embodiments in integrated electronic commerce module 104) is further configured for receiving on the one or more servers a transaction authorization confirmation from the first external financial party, and the point of sale server (for example, in some embodiments in integrated electronic commerce module 104) is further configured for transmitting to the customer-facing interface (for example, in some embodiments customer facing mobile point of sale application 111) an indication of the transaction authorization confirmation. In some embodiments, the payment processing module includes a payment processing gateway (for example, in some embodiments in single-stack standard application programming interface gateway 106) for communicating with servers of external financial processors (for example, in some embodiments payment processors 151-156) using encrypted links over a network 150.

In some embodiments, the system for providing payment processing services from a plurality of disparate payment processors (for example, in some embodiments payment processors 151-156) to a plurality of disparate transaction intake platforms further includes a business intelligence analytics module (for example, in some embodiments in integrated electronic commerce module 104) for providing business intelligence based at least in part on the first item of financial transaction information.

In some embodiments, the system for providing payment processing services from a plurality of disparate payment processors (for example, in some embodiments payment processors 151-156) to a plurality of disparate transaction intake platforms (for example, in some embodiments merchant facing point of sale hardware 110 and customer mobile device 110) further includes an inventory coordination module (for example, in some embodiments in integrated electronic commerce module 104) for providing transaction fulfillment information based at least in part on the first item of financial transaction information.

In some embodiments, the inventory coordination module enables the integrated electronic commerce module 104 to monitor consolidated stock levels and determine when to re-order, without relying on additional systems or manual reporting, thereby enabling merchants to provide a consistent, seamless experience for consumers across all channels, including offering returns through any channel no matter where the purchase originated.

Some embodiments of integrated electronic commerce module 104 support a merchant that operates a physical store, operates an online store, and accepts payments on a mobile device, or any combination of those channels. Some embodiments of integrated electronic commerce module 104 present a single merchant account to reduce reconciliation and accounting headaches and to provide one version of the data through consolidated reports across all channels and touchpoints. Some embodiments of integrated electronic commerce module 104 can also handle the issues of managing inventory across mobile and e-commerce touchpoints, as well as in the store, providing a single view of the merchandise that's available to sell, and helping businesses balance between inventory and demand.

Some embodiments of integrated electronic commerce module 104 support a cloud-based point-of-sale, mobile and eCommerce framework that integrates payments with inventory management.

Some embodiments of integrated electronic commerce module 104 real-time, in-app inventory tracking, management and replenishment directly from a mobile application. Some embodiments of integrated electronic commerce module 104 provide import and export capabilities that allow merchants to easily transfer and integrate inventory data into other systems. Some embodiments of integrated electronic commerce module 104 provide Integration with third party eCommerce platforms—sales and inventory data by location provides merchants more valuable insights into their business. Some embodiments of integrated electronic commerce module 104 provide the ability to set replenishment thresholds and alerts and transfer inventory between locations and channels. Some embodiments of integrated electronic commerce module 104 adjust inventory for sales and returns in real-time and can also work with a merchant's existing inventory platform, by allowing merchants to integrate in to some embodiments of integrated electronic commerce module 104 using application program interfaces.

Some embodiments of integrated electronic commerce module 104 can also solve the problems of the friction points mentioned above by eliminating disparate payment processors and processing rates, further simplifying reconciliation across all of a merchant's selling channels. In moving to a single payments provider under some embodiments, merchants can also take advantage of volume pricing, and get the best possible rates for each channel.

Some embodiments of integrated electronic commerce module 104 provide business insights, such merchants can leverage data to optimize sales, for example such as how much floor space to allocate to specific products, what items and locations provide the most revenue and profit and what products to feature. Merchants also have the ability to store customer history, past purchases and other customer-specific data to help them become more customer-centric. These systems open the door to integrated loyalty programs and other customer relationship management tools to help merchants know who their best customers are and how to best reach them how, when and where the customer wants to shop.

Some embodiments of integrated electronic commerce module 104 also allow developers to integrate payments, inventory and business insights into their platforms through the only single stack of application program interfaces for card present and card not present transactions.

Some embodiments of integrated electronic commerce module 104 also include a system for providing inventory management services from a plurality of disparate inventory resources (for example, in some embodiments brick-and-mortar store 160, fulfillment warehouse 170 and brick and mortar store 180) for transactions received from a plurality of disparate transaction intake platforms (for example, in some embodiments customer web browser 118, customer mobile device 110 and merchant facing point of sale hardware 110).

In some embodiments, one or more computers executes instructions on one or more processors for a platform-agnostic transaction-related communication system 198. In some embodiments, the transaction-related communication system includes one or more receiving modules, which can, in some example embodiments, be located in brick-and-mortar store 160, fulfillment warehouse 170 and brick and mortar store 180, customer web browser 118, customer mobile device 110 and merchant facing point of sale hardware 110 configured for receiving a first item of inventory transaction information from a customer-facing interface such as customer mobile device 110, and receiving a second item of inventory transaction information from a merchant-facing point-of-sale interface, such as merchant facing point of sale hardware 110.

In some embodiments, the transaction-related communication system includes an inventory coordination module (for example, in some embodiments, contained within integrated electronic commerce module 104), configured for rendering in a common internal format the first item of inventory transaction information from the customer-facing interface (for example, in some embodiments customer facing mobile point of sale application 111), and rendering in the common internal format the second item of inventory transaction information from the merchant-facing point-of-sale interface (for example, in some embodiments, merchant point of sale interface 111). In some embodiments, the transaction-related communication system includes an inventory coordination module configured for transmitting the second item of inventory transaction information for inventory transaction execution by the second inventory resource (for example, in some embodiments, a warehouse or manufacturing facility, such as fulfillment warehouse 170), and transmitting the first item of inventory transaction information for inventory transaction execution by a first inventory resource (for example, in some embodiments, brick and mortar store 160).

In some embodiments, the transaction-related communication system includes a synchronization server module (for example, in some embodiments, contained within integrated electronic commerce module 104) configured for providing background updates of transactions to the customer facing interface and the merchant-facing point of sale interface (for example, in some embodiments customer-facing web browser 118 customer mobile device 110 and merchant facing point of sale hardware 110). In some embodiments, the receiving the first item of inventory transaction information from the customer-facing interface further includes receiving in the common intake transaction ticket format over the network from a mobile computing device an order for an item as the first item of inventory transaction information from the customer-facing interface (for example, in some embodiments customer mobile device 110). In some embodiments, the receiving the second item of inventory transaction information from the merchant-facing point-of-sale interface further includes receiving over the network in the common intake transaction ticket format a return of the item as the second item of inventory transaction information from the merchant-facing point-of-sale interface (for example, in some embodiments merchant facing point of sale hardware 110). In some embodiments, the inventory coordination module is further configured for updating a unified inventory database (for example, in some embodiments database 101) to reflect fulfillment of the order for the item, and the inventory coordination module is further configured for updating a unified inventory database (for example, in some embodiments database 101) to reflect fulfillment of the return of the item.

In some embodiments, the receiving the first item of inventory transaction information from the customer-facing interface (for example, in some embodiments customer mobile device 110) further includes receiving in the common intake transaction ticket format over the network from a mobile computing device an order for an item as the first item of inventory transaction information from the customer-facing interface (for example, in some embodiments customer facing mobile point of sale application 111). In some embodiments, the receiving the second item of inventory transaction information from the merchant-facing point-of-sale interface (for example, in some embodiments merchant facing point of sale hardware 110) further includes receiving over the network in the common intake transaction ticket format a return of the item as the second item of inventory transaction information from the merchant-facing point-of-sale interface (for example, in some embodiments merchant point of sale interface 111). In some embodiments, the inventory coordination module is further configured for querying a unified inventory database (for example, in some embodiments database 101) to ascertain whether fulfillment of the order for the item is possible, and the inventory coordination module is further configured for updating a unified inventory database (for example, in some embodiments database 101) to reflect fulfillment of the return of the item.

In some embodiments, the common internal format is a common intake transaction ticket format, and the one or more receiving modules include a single stack application program interface residing on one of the one or more servers, such as single stack standard application program interface gateway 106.

In some embodiments, the receiving the first item of inventory transaction information from the customer-facing interface further includes receiving in the common intake transaction ticket format over the network from a mobile computing device (for example, in some embodiments customer mobile device 110) an order for an item as the first item of inventory transaction information from the customer-facing interface (for example, in some embodiments merchant point of sale interface 111). In some embodiments, the receiving the second item of inventory transaction information from the merchant-facing point-of-sale interface (for example, in some embodiments merchant facing point of sale hardware 110) further includes receiving over the network in the common intake transaction ticket format a return of the item as the second item of inventory transaction information from the merchant-facing point-of-sale interface (for example, in some embodiments merchant facing point of sale hardware 110). In some embodiments, the inventory coordination module is further configured for updating a unified inventory database (for example, in some embodiments database 101) to reflect fulfillment of the order for the item from an inventory warehouse resource. In some embodiments, the inventory coordination module is further configured for updating a unified inventory database (for example, in some embodiments database 101) to reflect fulfillment of the return of the item by updating an in-stock inventory count for a brick-and-mortar retail location (for example, in some embodiments brick and mortar store 180) housing the merchant-facing point-of-sale interface (for example, in some embodiments point of sale client 181).

In some embodiments, the system further includes a business intelligence analytics module (for example, in some embodiments, contained within integrated electronic commerce module 104) configured for providing business intelligence based at least in part on the inventory transaction information.

Figure 2A:
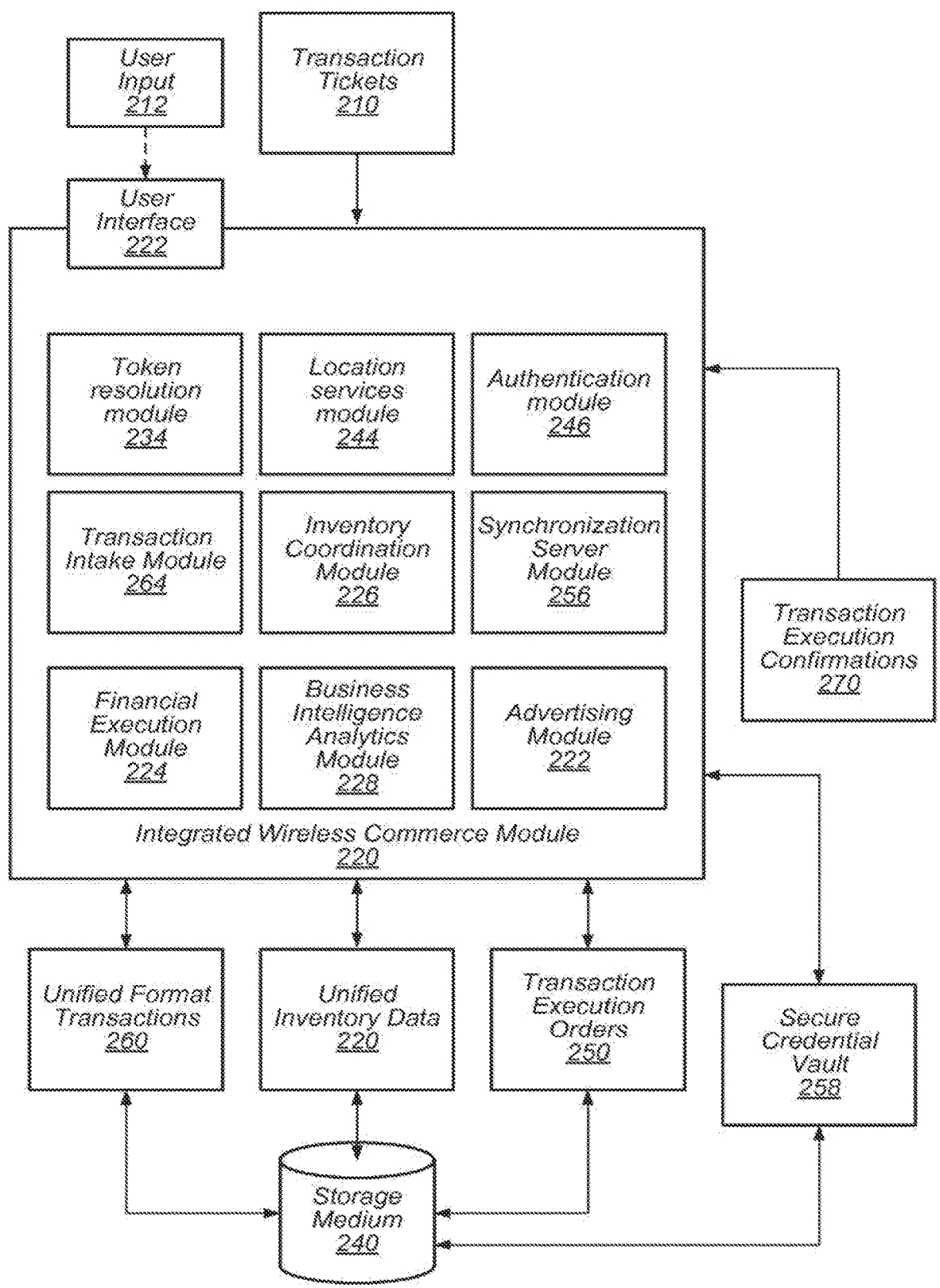
FIG. 2A illustrates a module that may implement a wireless data communication interface, according to some embodiments.

FIG. 2A illustrates a module that may implement a wireless data communication interface, according to some embodiments. An integrated wireless commerce management module 220 receives as input transaction execution confirmations 270, transaction tickets 210 and user input 212 (for example, in some embodiments, through a user interface 222) and stores transaction execution orders 250, unified inventory data 220, and unified format transactions 260 in a storage medium 240. Integrated wireless commerce management module 220 is one embodiment of integrated wireless commerce module 104 of FIG. 1, which is discussed above.

In some embodiments, integrated wireless commerce management module 220 also includes a transaction intake module 264, an inventory coordination module 226, a synchronization server module 256, a financial execution module 224, an authentication module 246, a location services module 244, a business intelligence analytics module 228, and an advertising module 222. In some embodiments, integrated wireless commerce management module 220 also interacts with a secure credential vault 258.

In some embodiments, a transaction intake module 264 includes one or more receiving modules for receiving over a wireless data communication channel a tokenized first item of financial transaction information (e.g., a transaction ticket 210) from a customer mobile device presenting a customer-facing interface, and receiving a second item of financial transaction information from a merchant-facing point-of-sale interface connected to the mobile device through the wireless data communication channel.

In some embodiments, a financial execution module 224 includes a point of sale server for rendering in a common internal format the first item of financial transaction information from the customer-facing interface, and rendering in the common internal format the second item of financial transaction information from the merchant-facing point-of-sale interface. In some embodiments, the financial execution module 224 further includes a payment processing module for rendering in a second format the first item of financial transaction information for payment processing by a first external financial party.

In some embodiments, a token resolution module 234 converts the tokenized first item of financial transaction information to an account-specific item of financial transaction information using an account identifier associated with the tokenized first item in a registry stored in a secured account data vault, such as secured credential vault 258.

In some embodiments, financial execution module 224 performs rendering in a third format the second item of financial transaction information for payment processing by a second external financial party, and transmitting in the second format the first item of financial transaction information for payment processing by the first external financial party. In some embodiments, the second format includes the financial transaction information using the account identifier associated with the tokenized first item in a registry stored in a secured account data vault, such as secured credential vault 258. In some embodiments, financial execution module 224 performs transmitting in the third format the second item of financial transaction information as a transaction execution order 270 for payment processing by the second external financial party. In some embodiments, the transmitting in the second format the first item of financial transaction information for payment processing by the first external financial party, further includes transmitting in the second format the first item of financial transaction information for payment processing by the first external financial party, wherein the second format includes the financial transaction information using the account identifier associated with the tokenized first item in a registry stored in the secured account data vault without transmitting the financial transaction information using the account identifier associated with the tokenized first item in the registry stored in the secured account data vault to the merchant-facing point-of-sale interface.

Some embodiments include an authentication module for recognizing, using a location services module 244, a customer mobile device located in an area defined within a geofence, identifying a customer associated with the customer mobile device based at least in part on a presence of an application executing on the customer mobile device, and issuing a session token to the application on the customer mobile device.

In some embodiments, the transaction intake module 264 receiving over a wireless data communication channel a tokenized first item of financial transaction information from a customer mobile device presenting a customer-facing interface further includes receiving over a Bluetooth low energy radio communication channel a tokenized first item of financial transaction information from a customer mobile device presenting a customer-facing interface.

In some embodiments, the transaction intake module 264 receiving a second item of financial transaction information from a merchant-facing point-of-sale interface connected to the mobile device through the wireless data communication channel further includes receiving over a broadband wireless network a second item of financial transaction information from a merchant-facing point-of-sale interface connected to the mobile device through the wireless data communication channel.

In some embodiments, the transaction intake module 264 the one or more receiving modules include a single stack application program interface residing on one of the one or more servers. In some embodiments, the transaction execution module is further configured for receiving on the one or more servers a transaction authorization confirmation from the first external financial party, and the point of sale server is further configured for transmitting to the customer-facing interface an indication of the transaction authorization confirmation.

In some embodiments, the payment processing module includes a payment processing gateway for communicating with servers of external financial processors using encrypted links over a network.

In some embodiments, integrated wireless commerce management module 220 implements or supports a system for providing payment processing services from a plurality of disparate payment processors, to a plurality of disparate transaction intake platforms. In some embodiments, integrated wireless commerce management module 220 includes one or more computers configured to implement by executing instructions on one or more processors a platform-agnostic transaction-related communication system. In some embodiments, integrated wireless commerce management module 220 includes software for execution on one or more computers configured to implement by executing instructions on one or more processors a platform-agnostic transaction-related communication system. In some embodiments, the transaction-related communication system includes one or more receiving modules, such as transaction intake module 224, for receiving a first item of financial transaction information from a customer-facing interface, such as a user interface 222, which may be implemented on integrated wireless commerce management module 220 or in a separate system, and receiving a second item of financial transaction information from a merchant-facing point-of-sale interface.

In some embodiments, the transaction-related communication system includes a point of sale server, for example as a component of financial execution module 224, for rendering in a common internal format (for example, for storage on storage medium 240 as unified format transactions 260) the first item of financial transaction information from the customer-facing interface of user interface 222, and rendering in the common internal format (for example, for storage on storage medium 240 as unified format transactions 260) the second item of financial transaction information from the merchant-facing point-of-sale interface. In some embodiments, the transaction-related communication system includes a payment processing module, for example as a component of financial execution module 224, for rendering, in a second format (for example, as transaction execution orders 250) the first item of financial transaction information for payment processing by a first external financial party, and rendering in a third format (for example, as transaction execution orders 250) the first item of financial transaction information for payment processing by a second external financial party.

In some embodiments, the transaction-related communication system includes a transaction execution module, for example as a component of financial execution module 224, for transmitting in the second format the first item of financial transaction information for payment processing by the first external financial party, and transmitting in the third format the second item of financial transaction information for payment processing by the second external financial party.

In some embodiments, the system uses integrated wireless commerce management module 220 for providing payment processing services from a plurality of disparate payment processors to a plurality of disparate transaction intake platforms. In some embodiments, the common internal format is a common intake transaction ticket format, which may be used in unified format transactions 260. In some embodiments, the one or more receiving modules, such as transaction intake module 224, include a single stack application program interface residing on one of the one or more servers that host or include integrated wireless commerce management module 220. In some embodiments, the receiving the first item of financial transaction information, such as transaction tickets 210, from a customer-facing interface further includes receiving in the common intake transaction ticket format over the network from a mobile computing device the first item of financial transaction information from the customer-facing interface, such as a user interface 222 implemented on a system remote from integrated wireless commerce management module 220. In some embodiments, the receiving the second item of financial transaction information, such as transaction tickets 210, from the merchant-facing point-of-sale interface further includes receiving over the network in the common intake transaction ticket format the second item of financial transaction information from the merchant-facing point-of-sale interface.

In some embodiments, the common internal format is a common intake transaction ticket format for use in transaction tickets 210. In some embodiments, the system further includes a first translation module on a mobile computing device, such as a user interface 222 implemented on a system remote from integrated wireless commerce management module 220, for receiving from a customer facing application including the customer-facing interface on the mobile computing device the first item of financial transaction information, and translating to a common intake transaction ticket format the first item of financial transaction information. In some embodiments, the system further includes a second translation module on a merchant-facing point of sale device for receiving from a merchant facing application including the merchant-facing point-of-sale interface on a merchant point of sale device the second item of financial transaction information, and translating to the common intake transaction ticket format the second item of financial transaction information.

In some embodiments, the one or more receiving modules, such as transaction intake module 224, include a single stack application program interface residing on one of the one or more servers that host or include integrated wireless commerce management module 220. In some embodiments, a server communicates remotely with the mobile computing device over a wireless network. In some embodiments, the server communicates remotely with the merchant-facing point of sale device over a second network. In some embodiments, the receiving the first item of financial transaction information from the customer-facing interface further includes receiving in the common intake transaction ticket format at the single stack application interface from the mobile computing device the first item of financial transaction information from the customer-facing interface. In some embodiments, the receiving the second item of financial transaction information from the merchant-facing point-of-sale interface further includes receiving in the common intake transaction ticket format at the single stack application interface the second item of financial transaction information from the merchant-facing point-of-sale interface.

In some embodiments, the transaction execution module, such as financial execution module 224, is further configured for receiving on the one or more servers a transaction authorization confirmation from the first external financial party, and the point of sale server is further configured for transmitting to the customer-facing interface an indication of the transaction authorization confirmation. In some embodiments, the payment processing module, such as financial execution module 224, includes a payment processing gateway for communicating with servers of external financial processors using encrypted links over a network.

In some embodiments, the system for providing payment processing services from a plurality of disparate payment processors to a plurality of disparate transaction intake platforms further includes a business intelligence analytics module 228 for providing business intelligence based at least in part on the first item of financial transaction information. In some embodiments, such business intelligence includes risk assessment for use in deciding whether to authorize or deny authorization for a transaction.

In some embodiments, the system for providing payment processing services from a plurality of disparate payment processors to a plurality of disparate transaction intake platforms further includes an inventory coordination module 226 for providing transaction fulfillment information based at least in part on the first item of financial transaction information. In some embodiments, the inventory coordination module 226 enables the integrated wireless commerce module 220 to monitor consolidated stock levels and determine when to re-order, without relying on additional systems or manual reporting, thereby enabling merchants to provide a consistent, seamless experience for consumers across all channels, including offering returns through any channel no matter where the purchase originated.

In some embodiments, the financial execution module 224 supports reconciling accounts for every channel, such that merchants may consolidate accounts with payment processors and accounting systems, without manual posting of entries.

Some embodiments of integrated wireless commerce management module 220 support a merchant that operates a physical store, operates an online store, accepts payments on a mobile device, or any combination of those channels. Some embodiments of integrated wireless commerce management module 220 present a single merchant account to reduce reconciliation and accounting headaches and to provide one version of the data through consolidated reports across all channels and touchpoints. Some embodiments of integrated wireless commerce management module 220 can also handle the issues of managing inventory across mobile and e-commerce touchpoints, is well as in the store, providing a single view of the merchandise that's available to sell, and helping businesses balance between inventory and demand.

Some embodiments of integrated wireless commerce management module 220 support a cloud-based point-of-sale, mobile and eCommerce framework that integrates payments with inventory management.

Some embodiments of integrated wireless commerce management module 220 real-time, in-app inventory tracking, management and replenishment directly from a mobile application. Some embodiments of integrated wireless commerce management module 220 provide import and export capabilities that allow merchants to easily transfer and integrate inventory data into other systems. Some embodiments of integrated wireless commerce management module 220 provide Integration with third party eCommerce platforms—sales and inventory data by location provides merchants more valuable insights into their business. Some embodiments of integrated wireless commerce management module 220 provide the ability to set replenishment thresholds and alerts and transfer inventory between locations, and channels. Some embodiments of integrated wireless commerce management module 220 adjust inventory for sales and returns in real-time and can also work with a merchant's existing inventory platform, by allowing merchants to integrate in to some embodiments of integrated wireless commerce management module 220 using application program interfaces.

Some embodiments of integrated wireless commerce management module 220 can also solve the problems of the friction points mentioned above by eliminating disparate payment processors and processing rates, further simplifying reconciliation across all of a merchant's selling channels. In moving to a single payments provider under some embodiments, merchants can also take advantage of volume pricing, and get the best possible rates for each channel.

Some embodiments of integrated wireless commerce management module 220 provide business insights, such merchants can leverage data to optimize sales, for example such as how much floor space to allocate to specific products, what items and locations provide the most revenue and profit and what products to feature. Merchants also have the ability to store customer history, past purchases and other-customer-specific data to help them become more customer-centric. These systems open the door to, integrated loyalty programs and other customer relationship management tools to help merchants know who their best customers are and how to best reach them how, when and where the customer wants to shop.

Some embodiments of integrated wireless commerce management module 220 also allow developers to integrate payments, inventory and business insights into their platforms through the only single stack of application program interfaces for card present and card not present transactions.

In some embodiments, the synchronization server module 226 implements a synchronization server protocol that synchronizes data between a server, such as one of the one or more servers that host or include integrated wireless commerce management module 220, and clients, such as ordering customer client 110 or merchant client 120 of FIG. 1, providing objects from database 102 of FIG. 1 from storage medium 240 that the clients have not received or that have been updated since client receipt.

In some embodiments, data synchronization from synchronization server module 226 allows clients to execute transactions or parts of transactions offline without querying one of the one or more servers that host or include integrated wireless commerce management module 220, instead using local copies of objects from database 102 of FIG. 1. In some embodiments, database objects stored in storage medium 240 include serial numbers, and based on the serial number, and the fact that clients store a serial number (called an update ID) for their most recent transaction update, clients may send to one of the one or more servers that host or include integrated wireless commerce management module 220 a database-wide pointer indicating the client's last received object (inserted or updated) to request from synchronization server module 226. In some embodiments, serial numbers for objects stored in storage medium 240 are assigned at object creation and new serial numbers are assigned at object update.

In some embodiments, synchronization server module receives a serial number and a list of query objects or object-types of interest to the client and replies in the background of transaction flow with an update of all data (both new and updated) with serial numbers assigned after the pointer. In some embodiments, this update allows for off-peak updates of the database outside of time-critical traffic flow. The client then assimilates the reply objects into a local (sometimes partial) mirror copy of the database, as well as saving the pointer of the last updated object for use in the next query. When the client is updating certain objects for its own transaction, synchronization server module 226 also provides the updated state of the objects created or updated by the client and sends the update ID and modified and new objects resulting from the transaction, as well as any that may have been modified by another client.

Some embodiments include a system (such as integrated wireless commerce management module 220) for providing inventory management services from a plurality of disparate inventory resources for transactions received from a plurality of disparate transaction intake platforms. In some embodiments, one or more computers configured to implement an integrated wireless commerce management module 220 executes instructions on one or more processors for a platform-agnostic transaction-related communication system. In some embodiments, the transaction-related communication system includes one or more receiving modules, such as transaction intake module 224, configured for receiving a first item of inventory transaction information, such as transaction tickets. 210 from a customer-facing interface, for example, in some embodiments, through a user interface 222 and receiving a second item of inventory transaction information from, such as transaction tickets 210 a merchant-facing point-of-sale interface. In some embodiments, the transaction-related communication system includes an inventory coordination module 226 configured for rendering in a common internal format the first item of inventory transaction information, for example, as unified format transactions 260 from the customer-facing interface, and rendering in the common internal format the second item of inventory transaction information, for example, as unified format transactions 260 from the merchant-facing point-of-sale interface. In some embodiments, the transaction-related communication system includes an inventory coordination module 226 configured for transmitting the second item of inventory transaction information, for example, as unified inventory data. 220 or transaction execution orders for inventory transaction execution by the second inventory resource, and transmitting the first item of inventory transaction information for inventory transaction execution by a first inventory resource.

In some embodiments, the transaction-related communication system includes a synchronization server module 226 configured for providing background updates of transactions including in some embodiments unified inventory data 220 and/or unified format transactions 260 to the customer facing interface and the merchant-facing point of sale interface. In some embodiments, the receiving the first item of inventory transaction information (for example, as user input 212) from the customer-facing interface further includes receiving in the common intake transaction ticket format as transaction tickets 210 over the network from a mobile computing device an order for an item as the first item of inventory transaction information from the customer-facing interface (e.g., user interface 222). In some embodiments, the receiving the second item of inventory transaction information from the merchant-facing point-of-sale interface further includes receiving over the network in the common intake transaction ticket format (for example, as a transaction ticket 210) a return of the item as the second item of inventory transaction information from the merchant-facing point-of-sale interface. In some embodiments, the inventory coordination module 226 is further configured for updating a unified inventory database in storage medium 240 to reflect fulfillment of the order for the item, and the inventory coordination module is further configured for updating a unified inventory database to reflect fulfillment of the return of the item.

In some embodiments, the receiving the first item of inventory transaction information (for example, as a transaction ticket 210) from the customer-facing interface further includes receiving in the common intake transaction ticket format over the network from a mobile computing device an order for an item as the first item of inventory transaction information from the customer-facing interface (e.g., user interface 222). In some embodiments, the receiving the second item of inventory transaction information (for example, as a transaction ticket 210) from the merchant-facing point-of-sale interface further includes receiving over the network in the common intake transaction ticket format a return of the item as the second item of inventory transaction information from the merchant-facing point-of-sale interface. In some embodiments, the inventory coordination module 226 is further configured for querying a unified inventory database, for example, in storage medium 240, to ascertain whether fulfillment of the order for the item is possible, and the inventory coordination module 226 is further configured for updating a unified inventory database to reflect fulfillment of the return of the item.

In some embodiments, the common internal format is a common intake transaction ticket format for use in unified format transactions 260 and/or unified inventory data 220, and the one or more receiving modules, such as transaction intake module 224, include a single stack application program interface residing on one of the one or more servers that house integrated wireless commerce management module 220.

In some embodiments, the receiving the first item of inventory transaction information (for example, as a transaction ticket 210) from the customer-facing interface, for example, user interface 222, further includes receiving in the common intake transaction ticket format (for example, as a transaction ticket 210) over the network from a mobile computing device an order for an item as the first item of inventory transaction information from the customer-facing interface. In some embodiments, the receiving the second item of inventory transaction information (for example, as a transaction ticket 210) from the merchant-facing point-of-sale interface further includes receiving over the network in the common intake transaction ticket format a return of the item as the second item of inventory transaction information from the merchant-facing point-of-sale interface. In some embodiments, the inventory coordination module 226 is further configured for updating a unified inventory database (for example, by sending unified inventory data 220 to storage medium 240) to reflect fulfillment of the order for the item from an inventory warehouse resource. In some embodiments, the inventory coordination module is further configured for updating a unified inventory database (for example, by sending unified inventory data 220 to storage medium 240) to reflect fulfillment of the return of the item by updating an in-stock inventory count for a brick-and-mortar retail location housing the merchant-facing point-of-sale interface.

In some embodiments, the system further includes a business intelligence analytics module 228 configured for providing business intelligence based at least in part on the inventory transaction information.

Figure 2B:
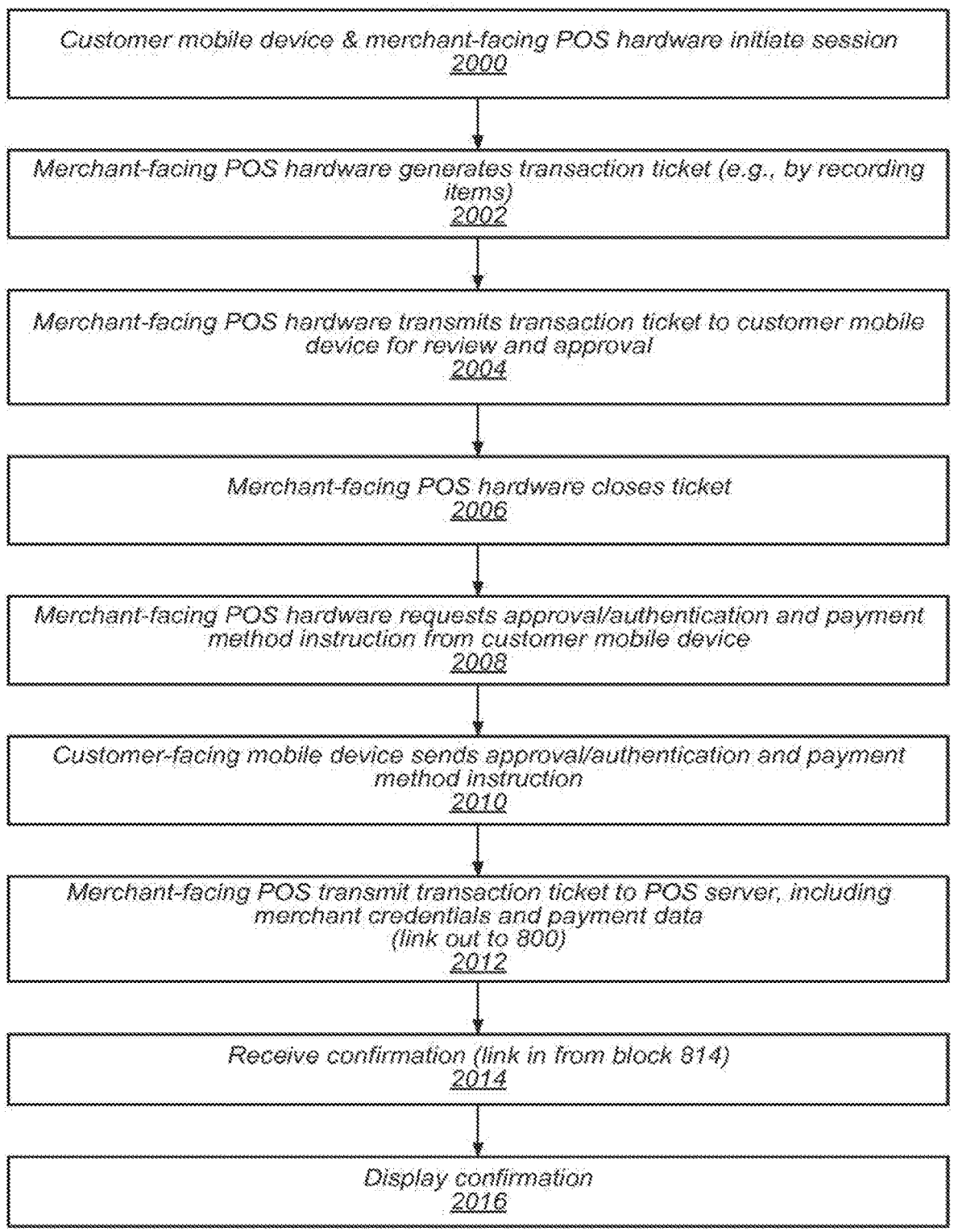
FIG. 2B is a flowchart of a process for a wireless data communication interface, according to some embodiments.

FIG. 2B is a flowchart of a process for a wireless data communication interface, according to some embodiments. A customer mobile device and a terminal of merchant-facing point-of-sale (POS) hardware initiate a session over a radio-frequency network or a radio-frequency link (block 2000). The merchant-facing POS hardware generates transaction ticket (e.g., by recording items) (block 2002). The merchant-facing POS hardware transmits a transaction ticket to customer mobile device for review and approval (block 2004). The merchant-facing POS hardware closes the ticket (block 2006). The merchant-facing POS hardware requests approval/authentication and payment method instruction from customer mobile device (block 2008). The customer-facing mobile device sends approval/authentication and payment method instruction (block 2010). The merchant-facing POS transmit transaction ticket to POS server, including merchant credentials and payment data, triggering a complementary process described at step 800 (block 2012). Confirmation is received, resulting from a process starting at block 814 of FIG. 8, which is described below (block 2014). The confirmation is displayed (block 2016).

Figure 2C:
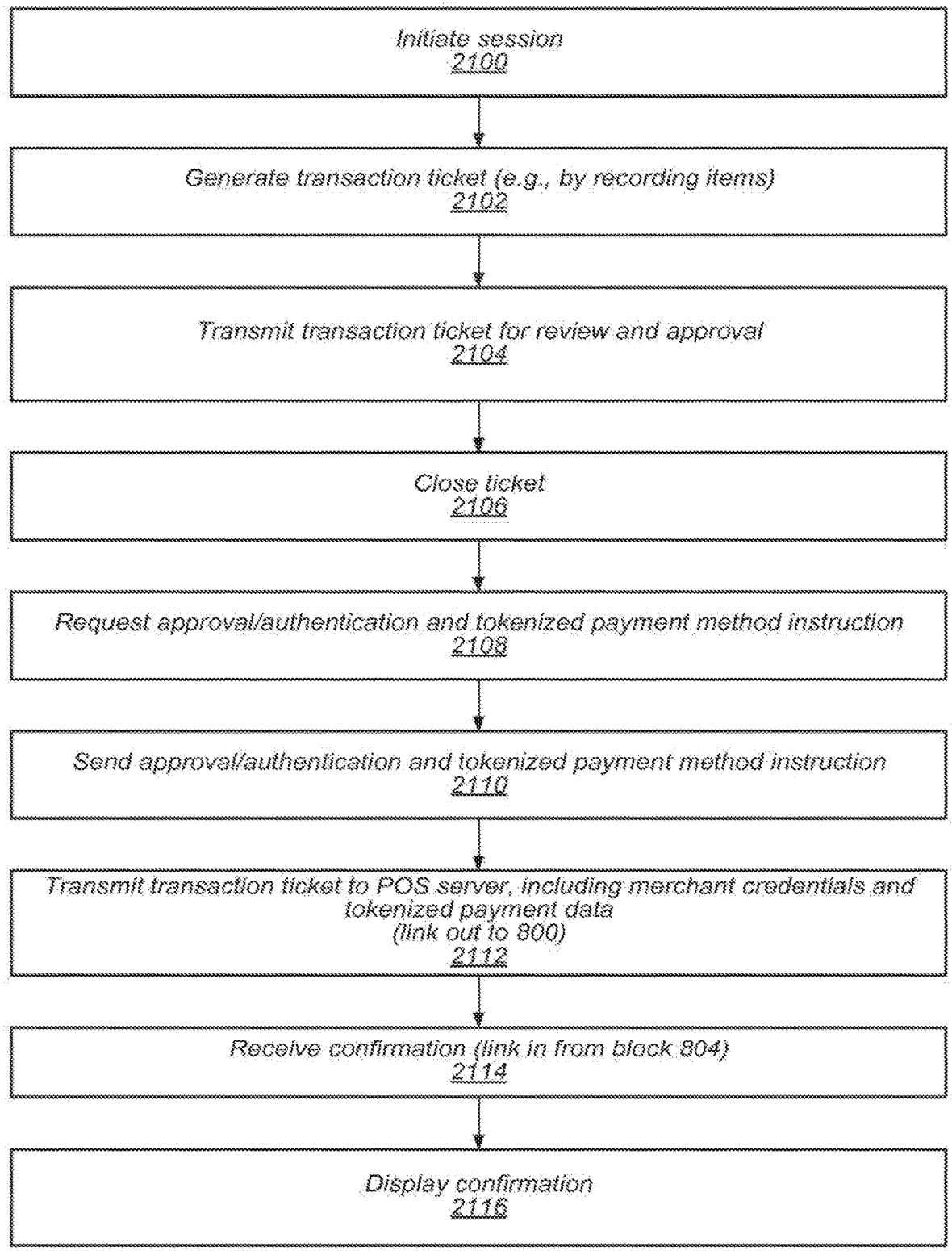
FIG. 2C is a flowchart of a process for a wireless data communication interface, according to some embodiments.

FIG. 2C is a flowchart of a process for a wireless data communication interface, according to some embodiments. A session is initiated (block 2100). A transaction ticket is generated (block 2102). The transaction ticket is transmitted for review and approval (block 2104). The ticket is closed (block 2106). Approval and authentication of the ticket with a tokenized payment instruction are requested (block 2108). Approval and authentication are of the ticket are sent with a tokenized payment instruction (block 2110). The transaction ticket is transmitted to a POS server, including merchant credentials and tokenized payment data, triggering a process described below with respect to block 800 of FIG. 8 (block 2112). Confirmation is received, resulting from a process starting at block 804 of FIG. 8, which is described below (block 2114). The confirmation is displayed (block 2116).

Figure 2D:
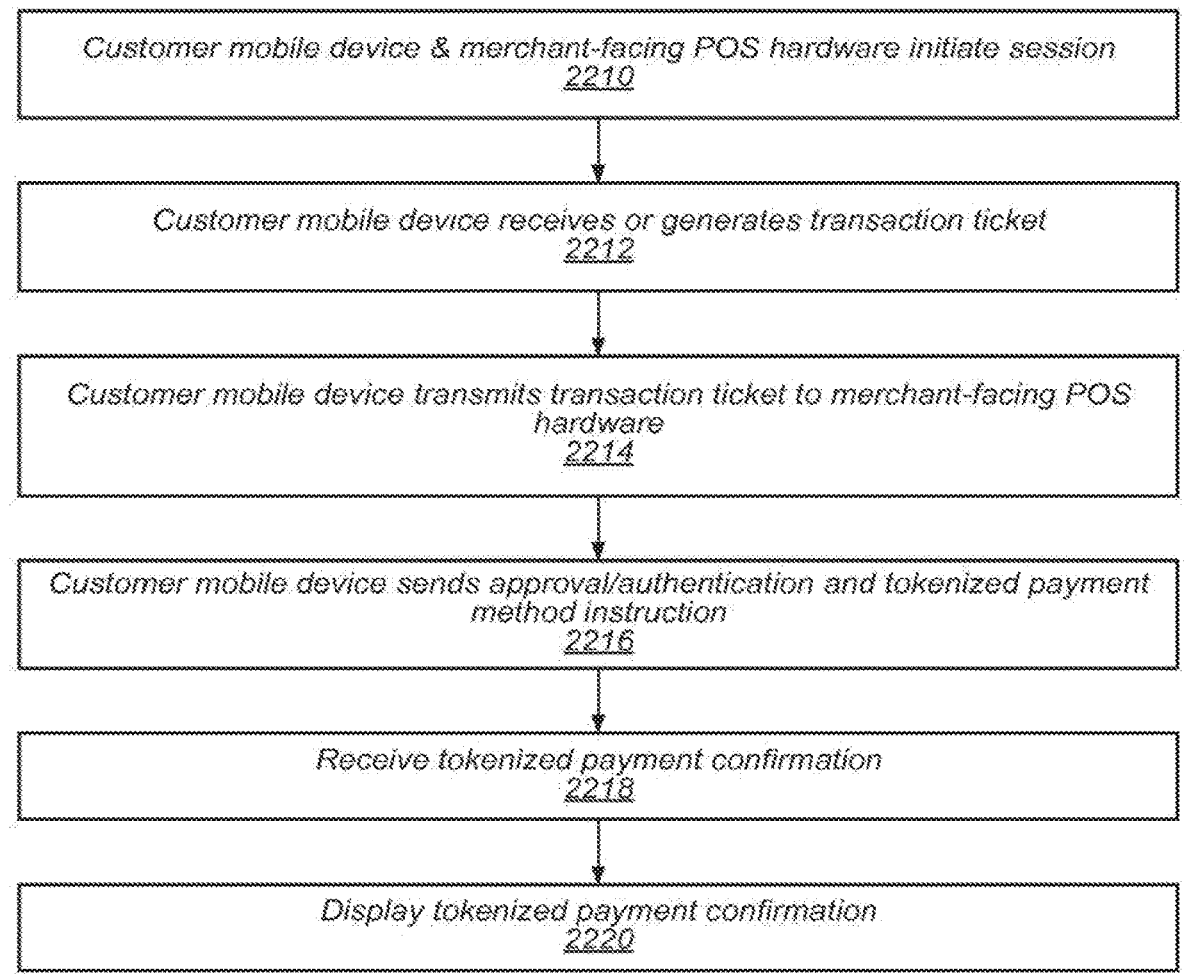
FIG. 2D is a flowchart of a process on a customer mobile device for a wireless data communication interface, according to some embodiments.

FIG. 2D is a flowchart of a process on a customer mobile device for a wireless data communication interface, according to some embodiments. A customer mobile device and merchant-facing POS hardware initiate session (block 2210). The customer mobile device receives or generates transaction ticket (block 2212). The customer mobile device transmits (an updated) transaction ticket to merchant-facing POS hardware (block 2214). The customer mobile device sends approval/authentication and tokenized payment method instruction (block 2216). Tokenized payment confirmation (block 2218). Tokenized payment confirmation is displayed (block 2220).

Figure 2E:
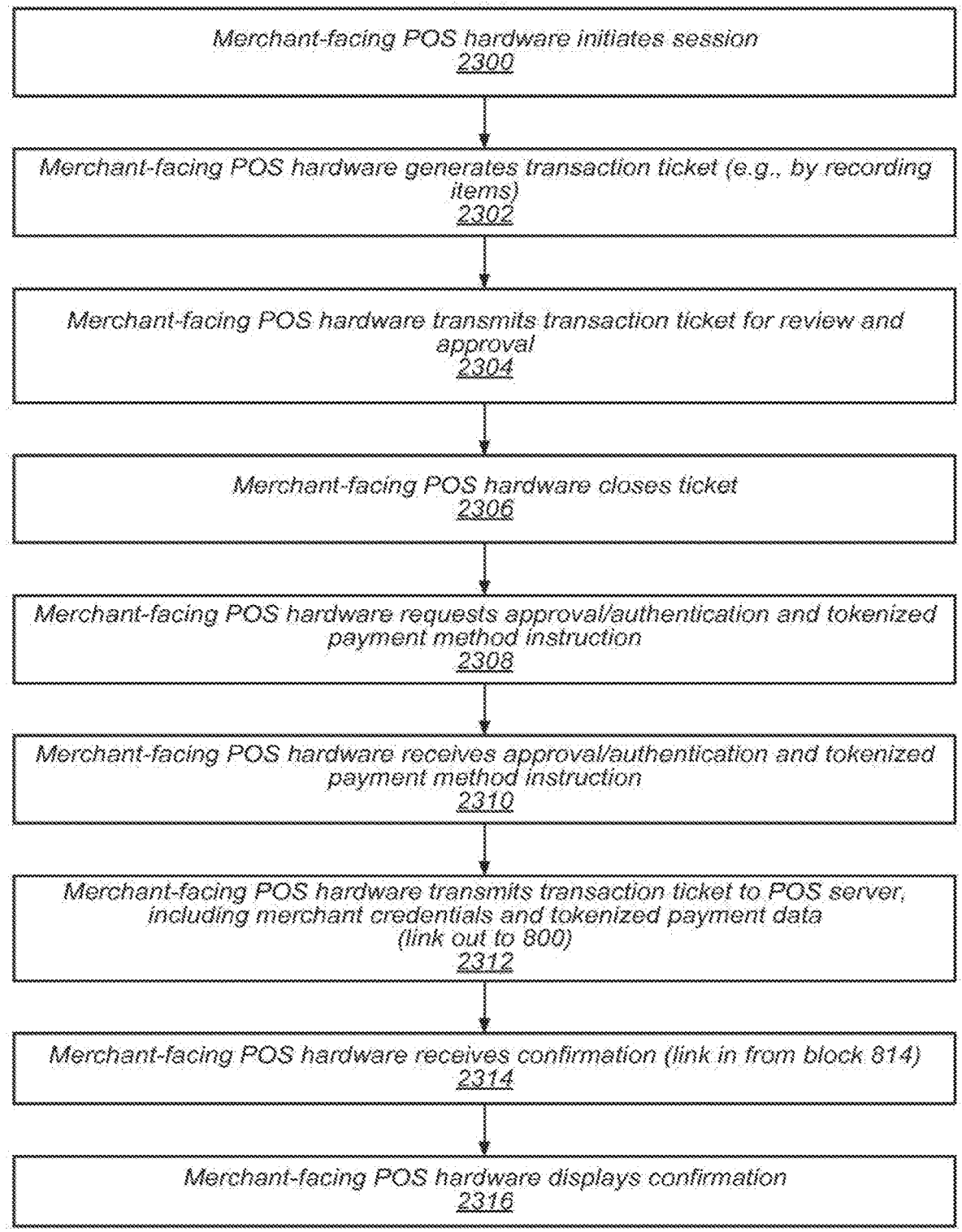
FIG. 2E is a flowchart of a process on a unit of merchant-facing POS hardware for a wireless data communication interface, according to some embodiments.

FIG. 2E is a flowchart of a process on a unit of merchant-facing POS hardware for a wireless data communication interface, according to some embodiments. Merchant-facing point-of-sale hardware initiates a session (block 2300). The merchant-facing POS hardware generates transaction ticket (e.g., by recording items) (block 2302). The merchant-facing POS hardware transmits transaction ticket for review and approval (block 2304). The merchant-facing POS hardware closes the ticket (block 2306). The merchant-facing POS hardware requests approval/authentication and tokenized payment method instruction (block 2308). The merchant-facing POS hardware receives approval/authentication and tokenized payment method instruction (block 2310). The merchant-facing POS hardware transmits transaction ticket to POS server, including merchant credentials and tokenized payment data (as described below with respect to block 800 in FIG. 8) (block 2312). The merchant-facing POS hardware receives confirmation (as described below with respect to block 814 in FIG. 8) (block 2314). The merchant-facing POS hardware displays confirmation (block 2316).

Figure 2F:
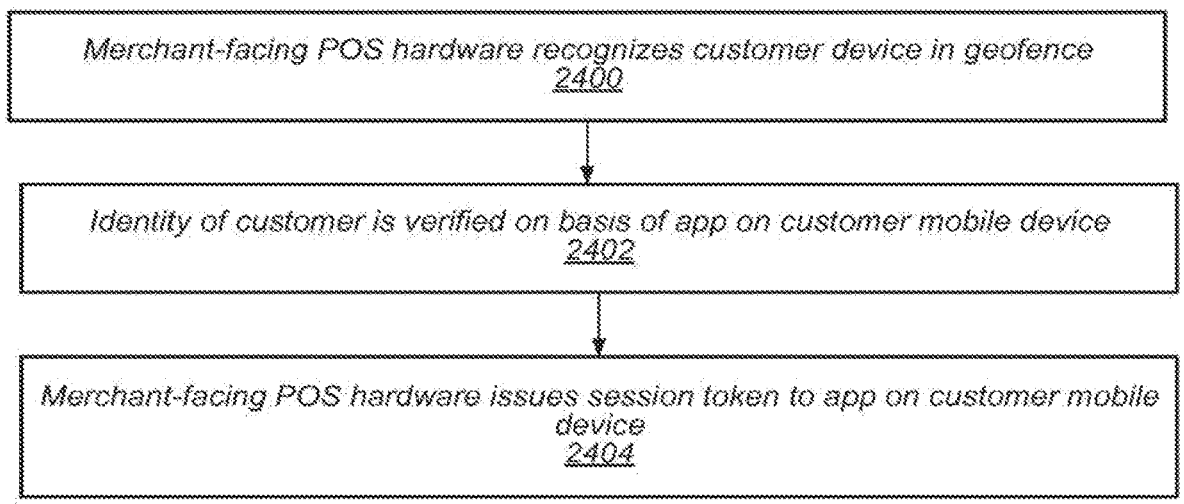
FIG. 2F is a flowchart of a process on a unit of merchant-facing POS hardware for a wireless data communication interface, according to some embodiments.

FIG. 2F is a flowchart of a process on a unit of merchant-facing POS hardware for a wireless data communication interface, according to some embodiments. The merchant-facing POS hardware recognizes customer device in geofence (block 2400). Identity of customer is verified on basis of app on customer mobile device (block 2402). The merchant-facing POS hardware issues session token to app on customer mobile device (block 2404).

Figure 2G:
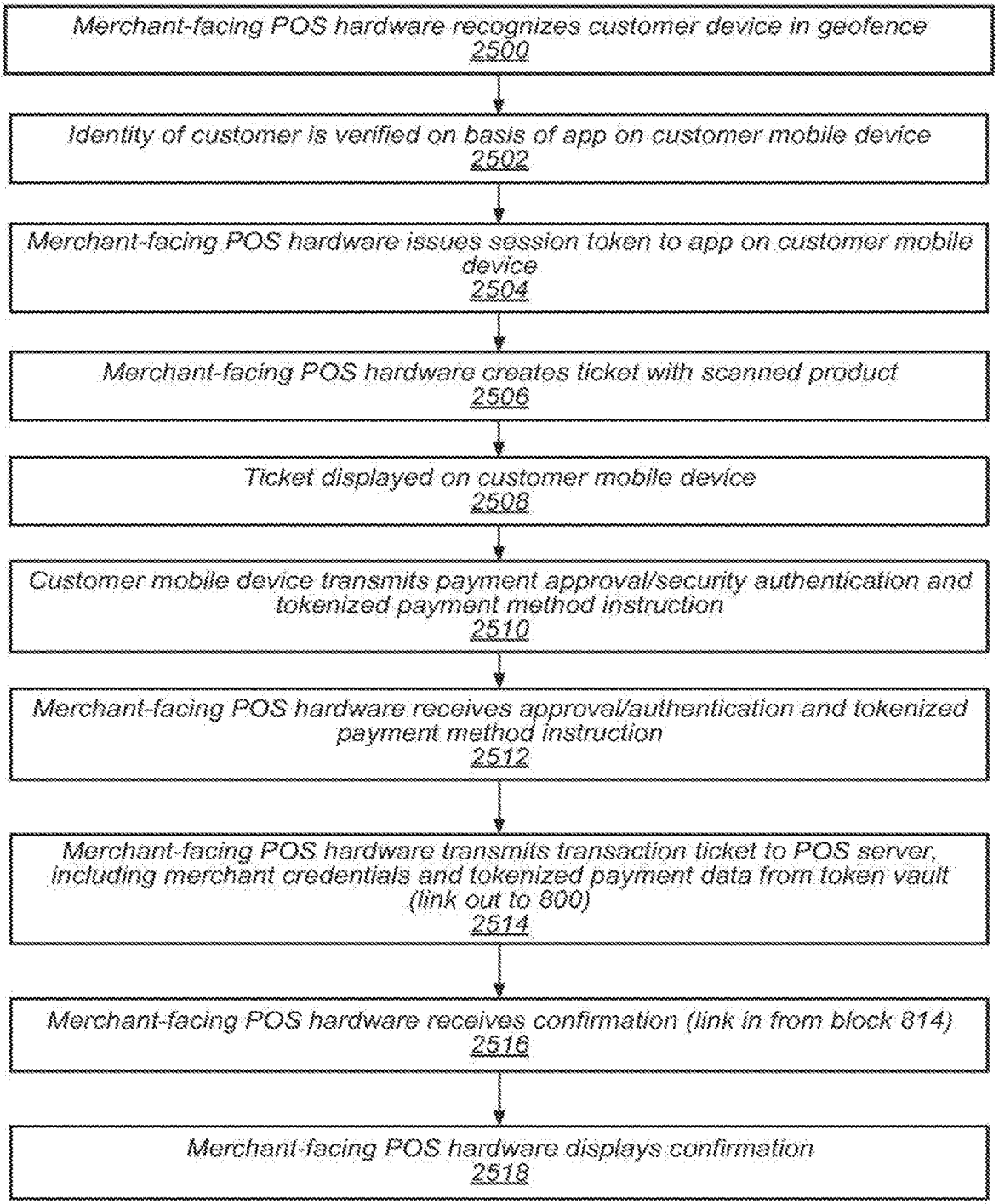
FIG. 2G is a flowchart of a process on a unit of merchant-facing POS hardware for a wireless data communication interface, according to some embodiments.

FIG. 2G is a flowchart of a process on a unit of merchant-facing POS hardware for a wireless data communication interface, according to some embodiments. The merchant-facing POS hardware recognizes the customer device in the geofence (block 2500). The identity of the customer is verified on basis of app on customer mobile device (block 2502). The merchant-facing POS hardware issues a session token to the application on the customer mobile device (block 2504). The merchant-facing POS hardware creates the ticket with scanned product (block 2506). The ticket is displayed on the customer mobile device (block 2508). The customer mobile device transmits payment approval/security authentication and tokenized payment method instruction (block 2510). The merchant-facing POS hardware receives the approval/authentication and tokenized payment method instruction (block 2512). The merchant-facing POS hardware transmits transaction ticket to POS server, including merchant credentials and tokenized payment data from token vault, as is described below with respect to FIG. 8 at block 800 (block 2514). The merchant-facing POS hardware receives confirmation, resulting from a process described below with respect to block 814 in FIG. 8 (block 2516). The merchant-facing POS hardware displays confirmation (block 2518).

Figure 3:
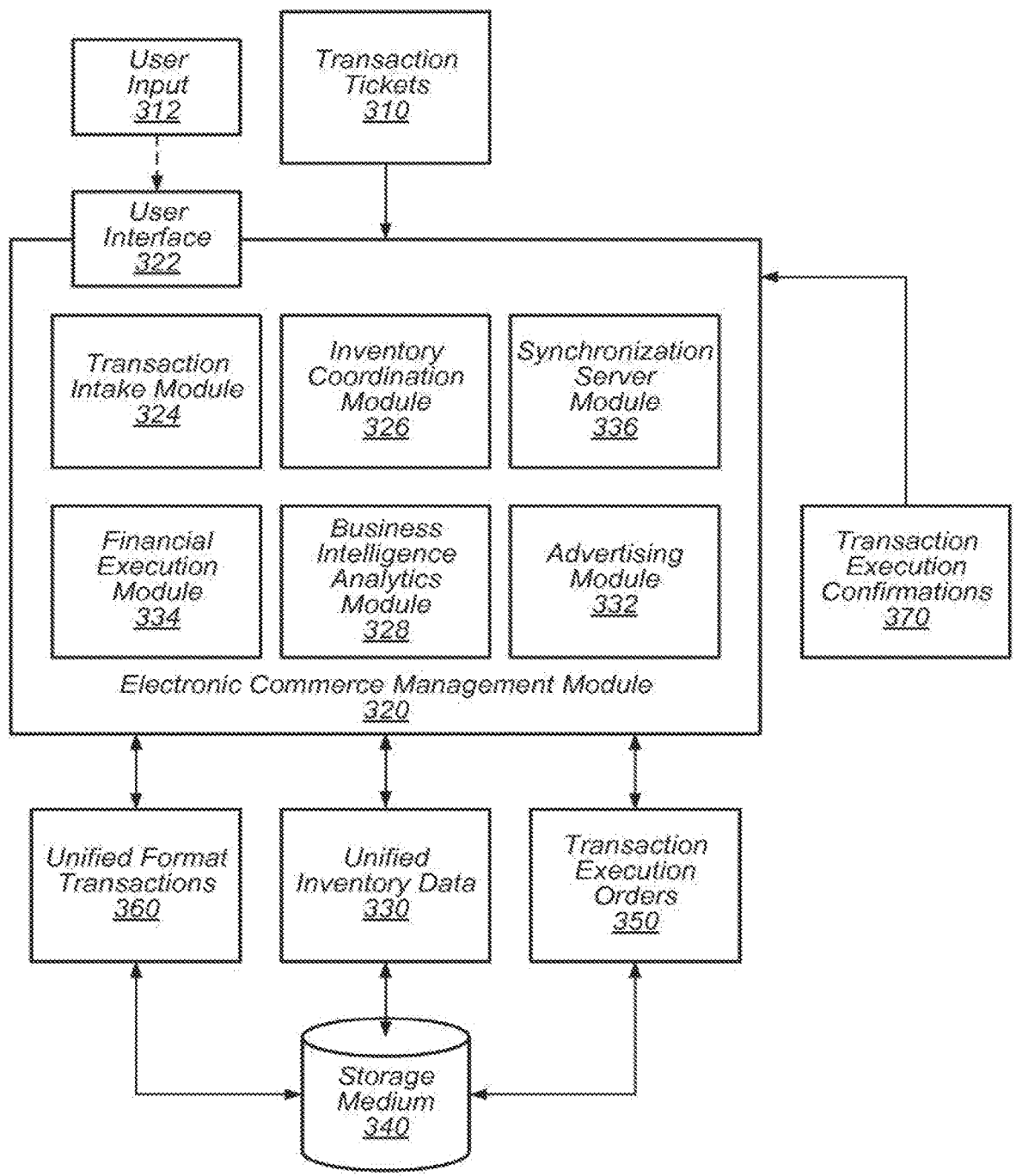
FIG. 3 depicts a module that may implement unified inventory and financial transaction management, according to some embodiments.

FIG. 3 depicts a module that may implement unified inventory and financial transaction management, according to some embodiments. An electronic commerce management module 320 receives as input transaction execution confirmations 370 transaction tickets 310 and user input 312 (for example, in some embodiments, through a user interface 322) and stores transaction execution orders 350, unified inventory data 330, and unified format transactions 360 in a storage medium 340. Electronic commerce management module 320 is one embodiment of integrated wireless commerce module 104 of FIG. 1, which is discussed above.

In some embodiments, electronic commerce management module 320 includes a transaction intake module 324, an inventory coordination module 326, a synchronization server module 336, a financial execution module 334, a business intelligence analytics module 328, and an advertising module 332.

In some embodiments, electronic commerce management module 320 implements or supports a system for providing payment processing services from a plurality of disparate payment processors to a plurality of disparate transaction intake platforms. In some embodiments, electronic commerce management module 320 includes one or more computers configured to implement by executing instructions on one or more processors a platform-agnostic transaction-related communication system. In some embodiments, electronic commerce management module 320 includes software for execution on one or more computers configured to implement by executing instructions on one or more processors a platform-agnostic transaction-related communication system. In some embodiments, the transaction-related communication system includes one or more receiving modules, such as transaction intake module 324, for receiving a first item of financial transaction information from a customer-facing interface, such as a user interface 322, which may be implemented on electronic commerce management module 320 or in a separate system, and receiving a second item of financial transaction information from a merchant-facing point-of-sale interface.

In some embodiments, the transaction-related communication system includes a point of sale server, for example as a component of financial execution module 334, for rendering in a common internal format (for example, for storage on storage medium 340 as unified format transactions 360) the first item of financial transaction information from the customer-facing interface of user interface 322, and rendering in the common internal format (for example, for storage on storage medium 340 as unified format transactions 360) the second item of financial transaction information from the merchant-facing point-of-sale interface. In some embodiments, the transaction-related communication system includes a payment processing module, for example as a component of financial execution module 334, for rendering in a second format (for example, as transaction execution orders 350) the first item of financial transaction information for payment processing by a first external financial party, and rendering in a third format (for example, as transaction execution orders 350) the first item of financial transaction information for payment processing by a second external financial party.

In some embodiments, the transaction-related communication system includes a transaction execution module, for example as a component of financial execution module 334, for transmitting in the second format the first item of financial transaction information for payment processing by the first external financial party, and transmitting in the third format the second item of financial transaction information for payment processing by the second external financial party.

In some embodiments, the system uses electronic commerce management module 320 for providing payment processing services from a plurality of disparate payment processors to a plurality of disparate transaction intake platforms. In some embodiments, the common internal format is a common intake transaction ticket format, which may be used in unified format transactions 360. In some embodiments, the one or more receiving modules, such as transaction intake module 324, include a single stack application program interface residing on one of the one or more servers that host or include electronic commerce management module 320. In some embodiments, the receiving the first item of financial transaction information, such as transaction tickets 310, from a customer-facing interface further includes receiving in the common intake transaction ticket format over the network from a mobile computing device the first item of financial transaction information from the customer-facing interface, such as a user interface 322 implemented on a system remote from electronic commerce management module 320. In some embodiments, the receiving the second item of financial transaction information, such as transaction tickets 310, from the merchant-facing point-of-sale interface further includes receiving over the network in the common intake transaction ticket format the second item of financial transaction information from the merchant-facing point-of-sale interface.

In some embodiments, the common internal format is a common intake transaction ticket format for use in transaction tickets 310. In some embodiments, the system further includes a first translation module on a mobile computing device, such as a user interface 322 implemented on a system remote from electronic commerce management module 320, for receiving from a customer facing application including the customer-facing interface on the mobile computing device the first item of financial transaction information, and translating to a common intake transaction ticket format the first item of financial transaction information. In some embodiments, the system further includes a second translation module on a merchant-facing point of sale device for receiving from a merchant facing application including the merchant-facing point-of-sale interface on a merchant point of sale device the second item of financial transaction information, and translating to the common intake transaction ticket format the second item of financial transaction information.

In some embodiments, the one or more receiving modules, such as transaction intake module 324, include a single stack application program interface residing on one of the one or more servers that host or include electronic commerce management module 320. In some embodiments, a server communicates remotely with the mobile computing device over a wireless network. In some embodiments, the server communicates remotely with the merchant-facing point of sale, device over a second network. In some embodiments, the receiving the first item of financial transaction information from the customer-facing interface further includes receiving in the common intake transaction ticket format at the single stack application interface from the mobile computing device the first item of financial transaction information from the customer-facing interface. In some embodiments, the receiving the second item of financial transaction information from the merchant-facing point-of-sale interface further includes receiving in the common intake transaction ticket format at the single stack application interface the second item of financial transaction information from the merchant-facing point-of-sale interface.

In some embodiments, the transaction execution module, such as financial execution module 334, is further configured for receiving on the one or more servers a transaction authorization confirmation from the first external financial party, and the point of sale server is further configured for transmitting to the customer-facing interface an indication of the transaction authorization confirmation. In some embodiments, the payment processing module, such as financial execution module. 334, includes a payment processing gateway for communicating with servers of external financial processors using encrypted links over a network.

In some embodiments, the system for providing payment processing services from a plurality of disparate payment processors to a plurality of disparate transaction intake platforms further includes a business intelligence analytics module 328 for providing business intelligence based at least in part on the first item of financial transaction information. In some embodiments, such business intelligence includes risk, assessment for use in deciding whether to authorize or deny authorization for a transaction.

In some embodiments, the system for providing payment processing services from a plurality of disparate payment processors to a plurality of disparate transaction intake platforms further includes an inventory coordination module 326 for providing transaction fulfillment information based at least in part on the first item of financial transaction information. In some embodiments, the inventory coordination module 326 enables the integrated electronic commerce module 320 to monitor consolidated stock levels and determine when to re-order, without relying on additional systems or manual reporting, thereby enabling merchants to provide a consistent, seamless experience for consumers across all channels, including offering returns through any channel no matter where the purchase originated.

In some embodiments, the financial execution module 334 supports reconciling accounts for every channel, such that merchants may consolidate accounts with payment processors and accounting systems, without manual posting of entries.

Some embodiments of electronic commerce management module 320 support a merchant that operates a physical store, operates an online store, and accepts payments on a mobile device, or any combination of those channels. Some embodiments of electronic commerce management module 320 present a single merchant account to reduce reconciliation and accounting headaches and to provide one version of the data through consolidated reports across all channels and touchpoints. Some embodiments of electronic commerce management module 320 can also handle the issues of managing inventory across mobile and e-commerce touchpoints, as well as in the store, providing a single view of the merchandise that's available to sell, and helping businesses balance between inventory and demand.

Some embodiments of electronic commerce management module 320 support a cloud-based point-of-sale, mobile and eCommerce framework that integrates payments with inventory management.

Some embodiments of electronic commerce management module 320 real-time, in-app inventory tracking, management and replenishment directly from a mobile application. Some embodiments of electronic commerce management module 320 provide import and export capabilities that allow merchants to easily transfer and integrate inventory data into other systems. Some embodiments of electronic commerce management module 320 provide Integration with third party eCommerce platforms—sales and inventory data by location provides merchants more valuable insights into their business. Some embodiments of electronic commerce management module 320 provide the ability to set replenishment thresholds and alerts and transfer inventory between locations and channels. Some embodiments of electronic commerce management module 320 adjust inventory for sales and returns in real-time and can also work with a merchant's existing inventory platform, by allowing merchants to integrate in to some embodiments of electronic commerce management module 320 using application program interfaces.

Some embodiments of electronic commerce management module 320 can also solve the problems of the friction points mentioned above by eliminating disparate payment processors and processing rates, further simplifying reconciliation across all of a merchant's selling channels. In moving to a single payments provider under some embodiments, merchants can also take advantage of volume pricing, and get the best possible rates for each channel.

Some embodiments of electronic commerce management module 320 provide business insights, such merchants can leverage data to optimize sales, for example such as how much floor space to allocate to specific products, what items and locations provide the most revenue and profit and what products to feature. Merchants also have the ability to store customer history, past purchases and other customer-specific data to help them become more customer-centric. These systems open the door to integrated loyalty programs and other customer relationship management tools to help merchants know who their best customers are and how to best reach them how, when and where the customer wants to shop.

Some embodiments of electronic commerce management module 320 also allow developers to integrate payments, inventory and business insights into their platforms through the only single stack of application program interfaces for card present and card not present transactions.

In some embodiments, the synchronization server module 336 implements a synchronization server protocol that synchronizes data between a server, such as one of the one or more servers that host or include electronic commerce management module 320, and clients, such as ordering customer client 110 or merchant client 120 of FIG. 1, providing objects from database 102 of FIG. 1 from storage medium 340 that the clients have not received or that have been updated since client receipt.

In some embodiments, data synchronization from synchronization server module 336 allows clients to execute transactions or parts of transactions offline without querying one of the one or more servers that host or include electronic commerce management module 320, instead using local copies of objects from database 102 of FIG. 1. In some embodiments, database objects stored in storage medium 340 include serial numbers, and based on the serial number, and the fact that clients store a serial number (called an update ID) for their most recent transaction update, clients may send to one of the one or more servers that host or include electronic commerce management module 320 a database-wide pointer indicating the client's last received object (inserted or updated) to request from synchronization server module 336. In some embodiments, serial numbers for objects stored in storage medium 340 are assigned at object creation and new serial numbers are assigned at object update.

In some embodiments, synchronization server module receives a serial number and a list of query objects or object types of interest to the client and replies in the background of transaction flow with an update of all data (both new and updated) with serial numbers assigned after the pointer. In some embodiments, this update allows for off-peak updates of the database outside of time-critical traffic flow. The client then assimilates the reply objects into a local (sometimes partial) mirror copy of the database, as well as saving the pointer of the last updated object for use in the next query. When the client is updating certain objects for its own transaction, synchronization server module 336 also provides the updated state of the objects created or updated by the client and sends the update ID and modified and new objects resulting from the transaction, as well as any that may have been modified by another client.

Some embodiments include a system (such as electronic commerce management module 320) for providing inventory management services from a plurality of disparate inventory resources for transactions received from a plurality of disparate transaction intake platforms. In some embodiments, one or more computers configured to implement an electronic commerce management module 320 executes instructions on one or more processors for a platform-agnostic transaction-related communication system. In some embodiments, the transaction-related communication system includes one or more receiving modules, such as transaction intake module 324, configured for receiving a first item of inventory transaction information, such as transaction tickets 310 from a customer-facing interface, for example, in some embodiments, through a user interface 322 and receiving a second item of inventory transaction information from, such as transaction tickets 310 a merchant-facing point-of-sale interface. In some embodiments, the transaction-related communication system includes an inventory coordination module 326 configured for rendering in a common internal format the first item of inventory transaction information, for example, as unified format transactions 360 from the customer-facing interface, and rendering in the common internal format the second item of inventory transaction information, for example, as unified format transactions 360 from the merchant-facing point-of-sale interface. In some embodiments, the transaction-related communication system includes an inventory coordination module 326 configured for transmitting the second item of inventory transaction information, for example, as unified inventory data 330 or transaction execution orders for inventory transaction execution by the second inventory resource, and transmitting the first item of inventory transaction information for inventory transaction execution by a first inventory resource.

In some embodiments, the transaction-related communication system includes a synchronization server module 336 configured for providing background updates of transactions including in some embodiments unified inventory data 330 and/or unified format transactions 360 to the customer facing interface and the merchant-facing point of sale interface. In some embodiments, the receiving the first item of inventory transaction information (for example, as user input 312) from the customer-facing interface further includes receiving in the common intake transaction ticket format as transaction tickets 310 over the network from a mobile computing device an order for an item as the first item of inventory transaction information from the customer-facing interface (e.g., user interface 322). In some embodiments, the receiving the second item of inventory transaction information from the merchant-facing point-ofsale interface further includes receiving over the network in the common intake transaction ticket format (for example, as a transaction ticket 310) a return of the item as the second item of inventory transaction information from the merchant-facing point-of-sale interface. In some embodiments, the inventory coordination module 326 is further configured for updating a unified inventory database in storage medium 340 to reflect fulfillment of the order for the item, and the inventory coordination module is further configured for updating a unified inventory database to reflect fulfillment of the return of the item.

In some embodiments, the receiving the first item of inventory transaction information (for example, as a transaction ticket 310) from the customer-facing interface further includes receiving in the common intake transaction ticket format over the network from a mobile computing device an order for an item as the first item of inventory transaction information from the customer-facing interface (e.g., user interface 322). In some embodiments, the receiving the second item of inventory transaction information (for example, as a transaction ticket 310) from the merchant-facing point-of-sale interface further includes receiving over the network in the common intake transaction ticket format a return of the item as the second item of inventory transaction information from the merchant-facing point-of-sale interface. In some embodiments, the inventory coordination module 326 is further configured for querying a unified inventory database, for example, in storage medium 340, to ascertain whether fulfillment of the order for the item is possible, and the inventory coordination module 326 is further configured for updating a unified inventory database to reflect fulfillment of the return of the item.

In some embodiments, the common internal format is a common intake transaction ticket format for use in unified format transactions 360 and/or unified inventory data 330, and the one or more receiving modules, such as transaction intake module 324, include a single stack application program interface residing on one of the one or more servers that house electronic commerce management module 320.

In some embodiments, the receiving the first item of inventory transaction information (for example, as a transaction ticket 310) from the customer-facing interface, for example, user interface 322, further includes receiving in the common intake transaction ticket format (for example, as a transaction ticket 310) over the network from a mobile computing device an order for an item as the first item of inventory transaction information from the customer-facing interface. In some embodiments, the receiving the second item of inventory transaction information (for example, as a transaction ticket 310) from the merchant-facing point-of-sale interface further includes receiving over the network in the common intake transaction ticket format a return of the item as the second item of inventory transaction information from the merchant-facing point-of-sale interface. In some embodiments, the inventory coordination module 326 is further configured for updating a unified inventory database (for example, by sending unified inventory data 330 to storage medium 340) to reflect fulfillment of the order for the item from an inventory warehouse resource. In some embodiments, the inventory coordination module is further configured for updating a unified inventory database (for example, by sending unified inventory data 330 to storage medium 340) to reflect fulfillment of the return of the item by updating an in-stock inventory count for a brick-and-mortar retail location housing the merchant-facing point-of-sale interface.

In some embodiments, the system further includes a business intelligence analytics module 328 configured for providing business intelligence based at least in part on the inventory transaction information.

Figure 4:
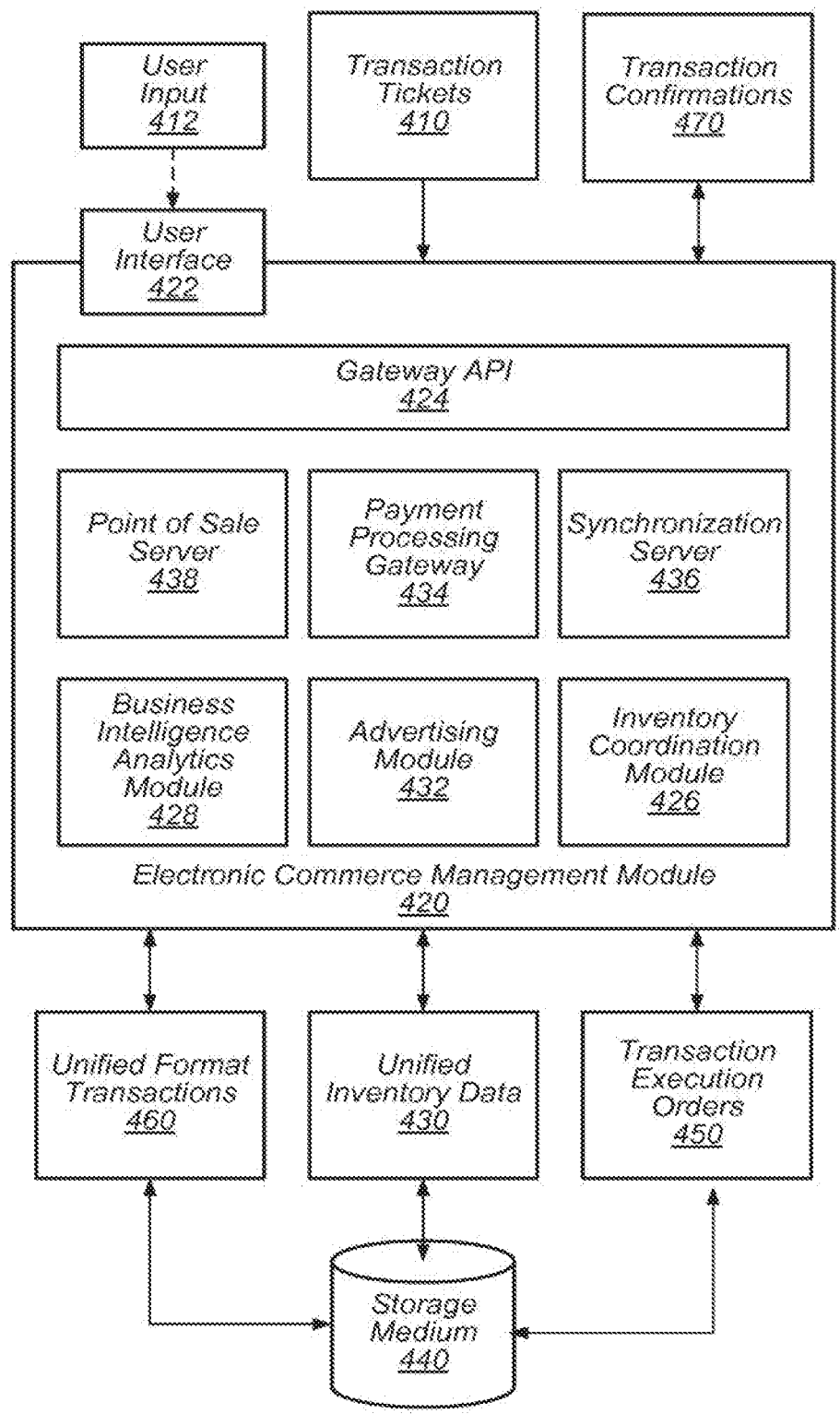
FIG. 4 illustrates a module that may implement unified inventory and financial transaction management, according to some embodiments.

FIG. 4 illustrates a module that may implement unified inventory and financial transaction management, according to some embodiments. An electronic commerce management module 420 receives, as input transaction confirmations 470, transaction tickets 410 and user input 412 (for example, in some embodiments, through a user interface 422) and stores transaction execution orders 450, unified inventory data 430, and unified format transactions 460 in a storage medium 440. Electronic commerce management module 420 is one embodiment of integrated electronic commerce module 204 of FIG. 2, which is discussed above.

In some embodiments, electronic commerce management module 420 includes a transaction intake module such as a gateway application program interface 424, an inventory coordination module 426, a synchronization server module 436, a financial execution module such as a payment processing gateway 434, a business intelligence analytics module 428, and an advertising module 432.

In some embodiments, electronic commerce management module 420 implements or supports a system for providing payment processing services from a plurality of disparate payment processors to a plurality of disparate transaction intake platforms. In some embodiments, electronic commerce management module 420 includes one or more computers configured to implement by executing instructions on one or more processors a platform-agnostic transaction-related communication system. In some embodiments, electronic commerce management module 420 includes software for execution on one or more computers configured to implement by executing instructions on one or more processors a platform-agnostic transaction-related communication system. In some embodiments, the transaction-related communication system includes one or more receiving modules, such as gateway application program interface 424, for receiving a first item of financial transaction information from a customer-facing interface, such as a user interface 422, which may be implemented on electronic commerce management module 420 or in a separate system, and receiving a second item of financial transaction information from a merchant-facing point-of-sale interface.

In some embodiments, the transaction-related communication system includes a point of sale server 438, for example as a complement of payment processing gateway 434, for rendering in a common internal format (for example, for storage on storage medium 440 as unified format transactions 460) the first item of financial transaction information from the customer-facing interface of user interface 422, and rendering in the common internal format (for example, for storage on storage medium 440 as unified format transactions 460) the second item of financial transaction information from the merchant-facing point-of-sale interface. In some embodiments, the transaction-related communication system includes a payment processing module, for example as a component of payment processing gateway 434, for rendering in a second format (for example, as transaction execution orders 450) the first item of financial transaction information for payment processing by a first external financial party, and rendering in a third format (for example, as transaction execution orders 450) the first item of financial transaction information for payment processing by a second external financial party.

In some embodiments, the transaction-related communication system includes a transaction execution module, for example as a component of payment processing gateway 434, for transmitting in the second format the first item of financial transaction information for payment processing by the first external financial party, and transmitting in the third format the second item of financial transaction information for payment processing by the second external financial party. In some embodiments, the transaction execution module supports reconciling accounts for every channel, such that merchants may consolidate accounts with payment processors and accounting systems, without manual posting of entries.

In some embodiments, the system uses electronic commerce management module 420 for providing payment processing services from a plurality of disparate payment processors to a plurality of disparate transaction intake platforms. In some embodiments, the common internal format is a common intake transaction ticket format, which may be used in unified format transactions 460. In some embodiments, the one or more receiving modules, such as gateway application program interface 424, include a single stack application program interface residing on one of the one or more servers that host or include electronic commerce management module 420. In some embodiments, the receiving the first item of financial transaction information, such as transaction tickets 410, from a customer-facing interface further includes receiving in the common intake transaction ticket format over the network from a mobile computing device the first item of financial transaction information from the customer-facing interface, such as a user interface 422 implemented on a system remote from electronic commerce management module 420. In some embodiments, the receiving the second item of financial transaction information, such as transaction tickets 410, from the merchant-facing point-of-sale interface further includes receiving over the network in the common intake transaction ticket format the second item of financial transaction information from the merchant-facing point-of-sale interface.

In some embodiments, the common internal format is a common intake transaction ticket format for use in transaction tickets 410. In some embodiments, the system further includes a first translation module on a mobile computing device, such as a user interface 422 implemented on a system remote from electronic commerce management module 420, for receiving from a customer facing application including the customer-facing interface on the mobile computing device the first item of financial transaction information, and translating to a common intake transaction ticket format the first item of financial transaction information. In some embodiments, the system further includes a second translation module on a merchant-facing point of sale device for receiving from a merchant facing application including the merchant-facing point-of-sale interface on a merchant point of sale device the second item of financial transaction information, and translating to the common intake transaction ticket format the second item of financial transaction information.

In some embodiments, the one or more receiving modules, such as gateway application program interface 424, include a single stack application program interface residing on one of the one or more servers that host or include electronic commerce management module 420. In some embodiments, a server communicates remotely with the mobile computing device over a wireless network. In some embodiments, the server communicates remotely with the merchant-facing point of sale device over a second network. In some embodiments, the receiving the first item of financial transaction information from the customer-facing interface further includes receiving in the common intake transaction ticket format at the single stack application interface from the mobile computing device the first item of financial transaction information from the customer-facing interface. In some embodiments, the receiving the second item of financial transaction information from the merchant-facing point-of-sale interface further includes receiving in the common intake transaction ticket format at the single stack application interface the second item of financial transaction information from the merchant-facing point-of-sale interface.

In some embodiments, the transaction execution module, such as payment processing gateway 434, is further configured for receiving on the one or more servers a transaction authorization confirmation from the first external financial party, and the point of sale server is further configured for transmitting to the customer-facing interface an indication of the transaction authorization confirmation. In some embodiments, the payment processing module, such as payment processing gateway 434, includes a payment processing gateway for communicating with servers of external financial processors using encrypted links over a network.

In some embodiments, the inventory coordination module 426 enables the integrated electronic commerce module 420 to monitor consolidated stock levels and determine when to re-order, without relying on additional systems or manual reporting, thereby enabling merchants to provide a consistent, seamless experience for consumers across all channels, including offering returns through any channel no matter where the purchase originated.

Some embodiments of electronic commerce management module 420 support a merchant that operates a physical store, operates an online store, and accepts payments on a mobile device, or any combination of those channels. Some embodiments of electronic commerce management module 420 present a single merchant account to reduce reconciliation and accounting headaches and to provide one version of the data through consolidated reports across all channels and touchpoints. Some embodiments of electronic commerce management module 420 can also handle the issues of managing inventory across mobile and e-commerce touchpoints, as well as in the store, providing a single view of the merchandise that's available to sell, and helping businesses balance between inventory and demand.

Some embodiments of electronic commerce management module 420 support a cloud-based point-of-sale, mobile and eCommerce framework that integrates payments with inventory management.

Some embodiments of electronic commerce management module 420 real-time, in-app inventory tracking, management and replenishment directly from a mobile application. Some embodiments of electronic commerce management module 420 provide import and export capabilities that allow merchants to easily transfer and integrate inventory data into other systems. Some embodiments of electronic commerce management module 420 provide Integration with third party eCommerce platforms—sales and inventory data by location provides merchants more valuable insights into their business. Some embodiments of electronic commerce management module 420 provide the ability to set replenishment thresholds and alerts and transfer inventory between locations and channels. Some embodiments of electronic commerce management module 420 adjust inventory for sales and returns in real-time and can also work with a merchant's existing inventory platform, by allowing merchants to integrate in to some embodiments of electronic commerce management module 420 using application program interfaces.

Some embodiments of electronic commerce management module 420 can also solve the problems of the friction points mentioned above by eliminating disparate payment processors and processing rates, further simplifying reconciliation across all of a merchant's selling channels. In moving to a single payments provider under some embodiments, merchants can also take advantage of volume pricing, and get the best possible rates for each channel.

Some embodiments of electronic commerce management module 420 provide business insights, such merchants can leverage data to optimize sales, for example such as how much floor space to allocate to specific products, what items and locations provide the most revenue and profit and what products to feature. Merchants also have the ability to store customer history, past purchases and other customer-specific data to help them become more customer-centric. These systems open the door to integrated loyalty programs and other customer relationship management tools to help merchants know who their best customers are and how to best reach them how, when and where the customer wants to shop.

Some embodiments of electronic commerce management module 420 also allow developers to integrate payments, inventory and business insights into their platforms through the only single stack of application program interfaces for card present and card not present transactions.

Some embodiments include a system (such as electronic commerce management module 420) for providing inventory management services from a plurality of disparate inventory resources for transactions received from a plurality of disparate transaction intake platforms. In some embodiments, one or more computers configured to implement an electronic commerce management module 420 executes instructions on one or more processors for a platform-agnostic transaction-related communication system. In some embodiments, the transaction-related communication system includes one or more receiving modules, such as gateway application programming interface 424, configured for receiving a first item of inventory transaction information, such as transaction tickets 410 from a customer-facing interface, for example, in some embodiments, through a user interface 422 and receiving a second item of inventory transaction information from, such as transaction tickets 410 a merchant-facing point-of-sale interface. In some embodiments, the transaction-related communication system includes an inventory coordination module 426 configured for rendering in a common internal format the first item of inventory transaction information, for example, as unified format transactions 460 from the customer-facing interface, and rendering in the common internal format the second item of inventory transaction information, for example, as unified format transactions 460 from the merchant-facing point-of-sale interface. In some embodiments, the transaction-related communication system includes an inventory coordination module 426 configured for transmitting the second item of inventory transaction information, for example, as unified inventory data 430 or transaction execution orders for inventory transaction execution by the second inventory resource, and transmitting the first item of inventory transaction information for inventory transaction execution by a first inventory resource.

In some embodiments, the transaction-related communication system includes a synchronization server module 436 configured for providing background updates of transactions including in some embodiments unified inventory data 430 and/or unified format transactions 460 to the customer facing interface and the merchant-facing point of sale interface. In some embodiments, the receiving the first item of inventory transaction information (for example, as user input 412) from the customer-facing interface further includes receiving in the common intake transaction ticket format as transaction tickets 410 over the network from a mobile computing device an order for an item as the first item of inventory transaction information from the customer-facing interface (e.g., user interface 422). In some embodiments, the receiving the second item of inventory transaction information from the merchant-facing point-of-sale interface further includes receiving over the network in the common intake transaction ticket format (for example, as a transaction ticket 410) a return of the item as the second item of inventory transaction information from the merchant-facing point-of-sale interface. In some embodiments, the inventory coordination module 426 is further configured for updating a unified inventory database in storage medium 440 to reflect fulfillment of the order for the item, and the inventory coordination module is further configured for updating a unified inventory database to reflect fulfillment of the return of the item.

In some embodiments, the receiving the first item of inventory transaction information (for example, as a transaction ticket 410) from the customer-facing interface further includes receiving in the common intake transaction ticket format over the network from a mobile computing device an order for an item as the first item of inventory transaction information from the customer-facing interface (e.g., user interface 322). In some embodiments, the receiving the second item of inventory transaction information (for example, as a transaction ticket 410), from the merchant-facing point-of-sale interface further includes receiving over the network in the common intake transaction ticket format a return of the item as the second item of inventory transaction information from the merchant-facing point-of-sale interface. In some embodiments, the inventory coordination module 426 is further configured for querying a unified inventory database, for example, in storage medium 440, to ascertain whether fulfillment of the order for the item is possible, and the inventory coordination module 426 is further configured for updating a unified inventory database to reflect fulfillment of the return of the item.

In some embodiments, the common internal format is a common intake transaction ticket format for use in unified format transactions 460 and/or unified inventory data 430, and the one or more receiving modules, such as gateway application programming interface 424, include a single stack application program interface residing on one of the one or more servers that house electronic commerce management module 320.

In some embodiments, the receiving the first item of inventory transaction information (for example, as a transaction ticket 410) from the customer-facing interface, for example, user interface 422, further includes receiving in the common intake transaction ticket format (for example, as a transaction ticket 410) over the network from a mobile computing device an order for an item as the first item of inventory transaction information from the customer-facing interface. In some embodiments, the receiving the second item of inventory transaction information (for example, as a transaction ticket 410) from the merchant-facing point-of-sale interface further includes receiving over the network in the common intake transaction ticket format a return of the item as the second item of inventory transaction information from the merchant-facing point-of-sale interface. In some embodiments, the inventory coordination module 426 is further configured for updating a unified inventory database (for example, by sending unified inventory data 430 to storage medium 440) to reflect fulfillment of the order for the item from an inventory warehouse resource. In some embodiments, the inventory coordination module is further configured for updating a unified inventory database (for example, by sending unified inventory data 430 to storage medium 440) to reflect fulfillment of the return of the item by updating an in-stock inventory count for a brick-and-mortar retail location housing the merchant-facing point-of-sale interface.

In some embodiments, the system further includes a business intelligence analytics module 428 configured for providing business intelligence based at least in part on the inventory transaction information.

Figure 5:
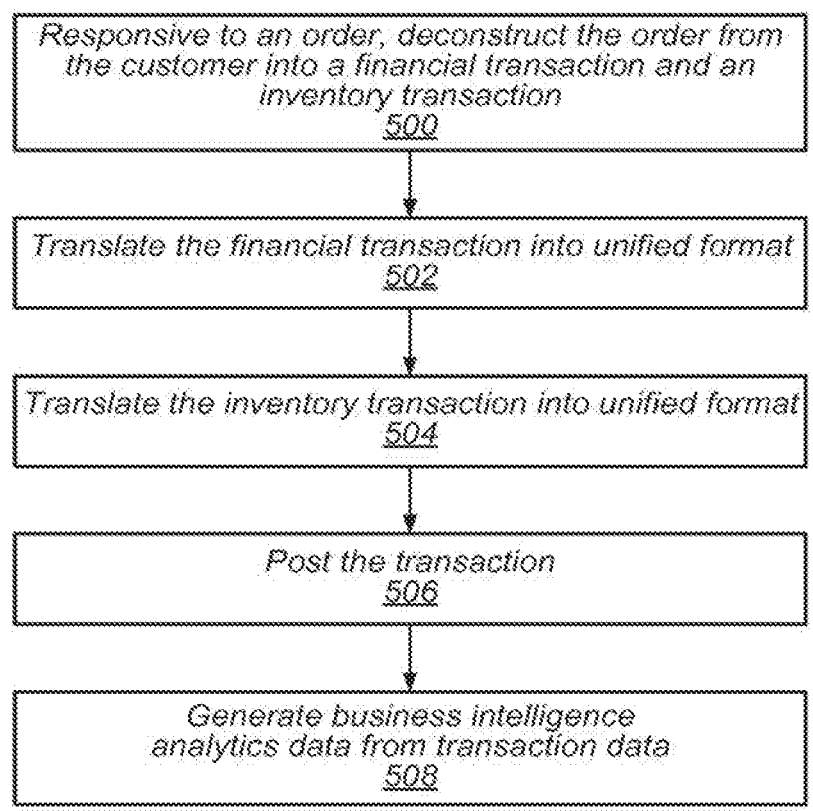
FIG. 5 is a flowchart of a process for unified inventory and financial transaction management, according to some embodiments.

FIG. 5 is a flowchart of a process for unified inventory and financial transaction management, according to some embodiments. Responsive to an order from a customer, the order from the customer is deconstructed into a financial transaction and an inventory transaction (block 500). The financial transaction is translated into a unified format (block 502). An inventory transaction is translated into the unified format (block 504). The transaction is posted (block 506). Business intelligence analytics data is generated from the transaction data (block 508).

Figure 6:
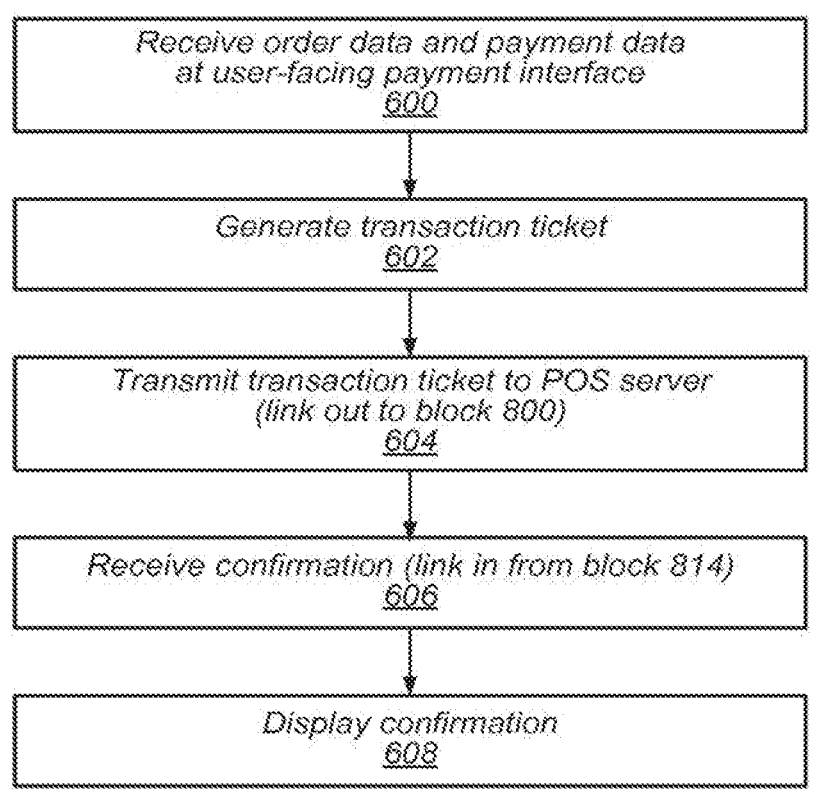
FIG. 6 is a flowchart of a process for unified inventory and financial transaction management, according to some embodiments.

FIG. 6 is a flowchart of a process for unified inventory and financial transaction management, according to some embodiments. Order data and payment data are received at user-facing payment interface (block 600). A transaction ticket is generated (block 602). The transaction ticket is transmitted to a point of sale server for processing (block 604). Confirmation is received (block 606). Confirmation is displayed (block 608).

Figure 7:
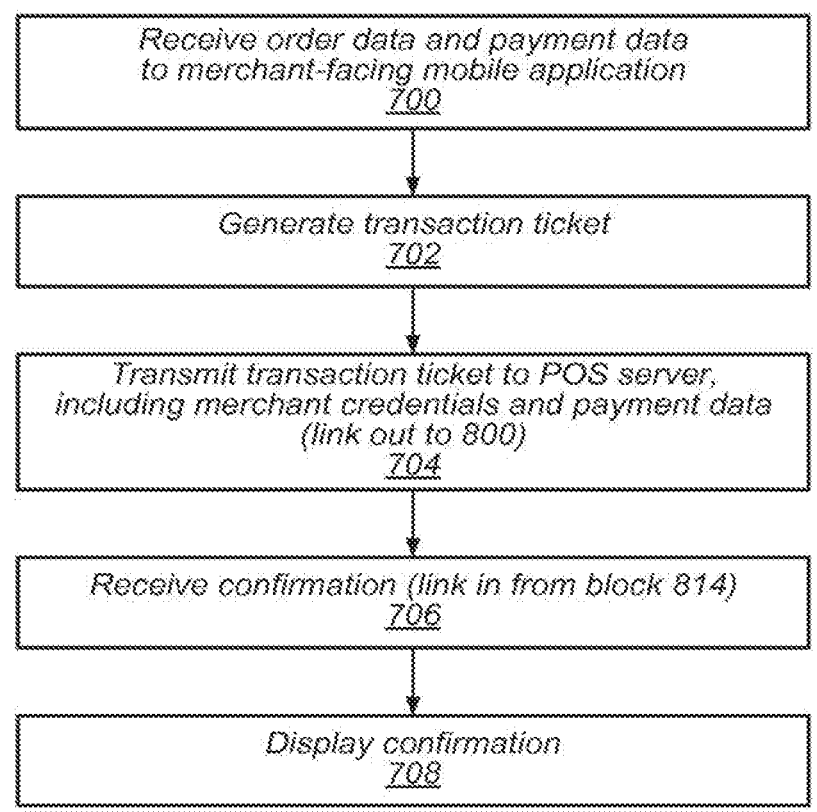
FIG. 7 is a flowchart of a process for unified inventory and financial transaction management, according to some embodiments.

FIG. 7 is a flowchart of a process for unified inventory and financial transaction management, according to some embodiments. Order data and payment data are received to a merchant-facing mobile application (block 700). A transaction ticket is generated (block 702). The transaction ticket is transmitted to a point of sale server for processing (block 704). Confirmation is received (block 706). Confirmation is displayed (block 708).

Figure 8:
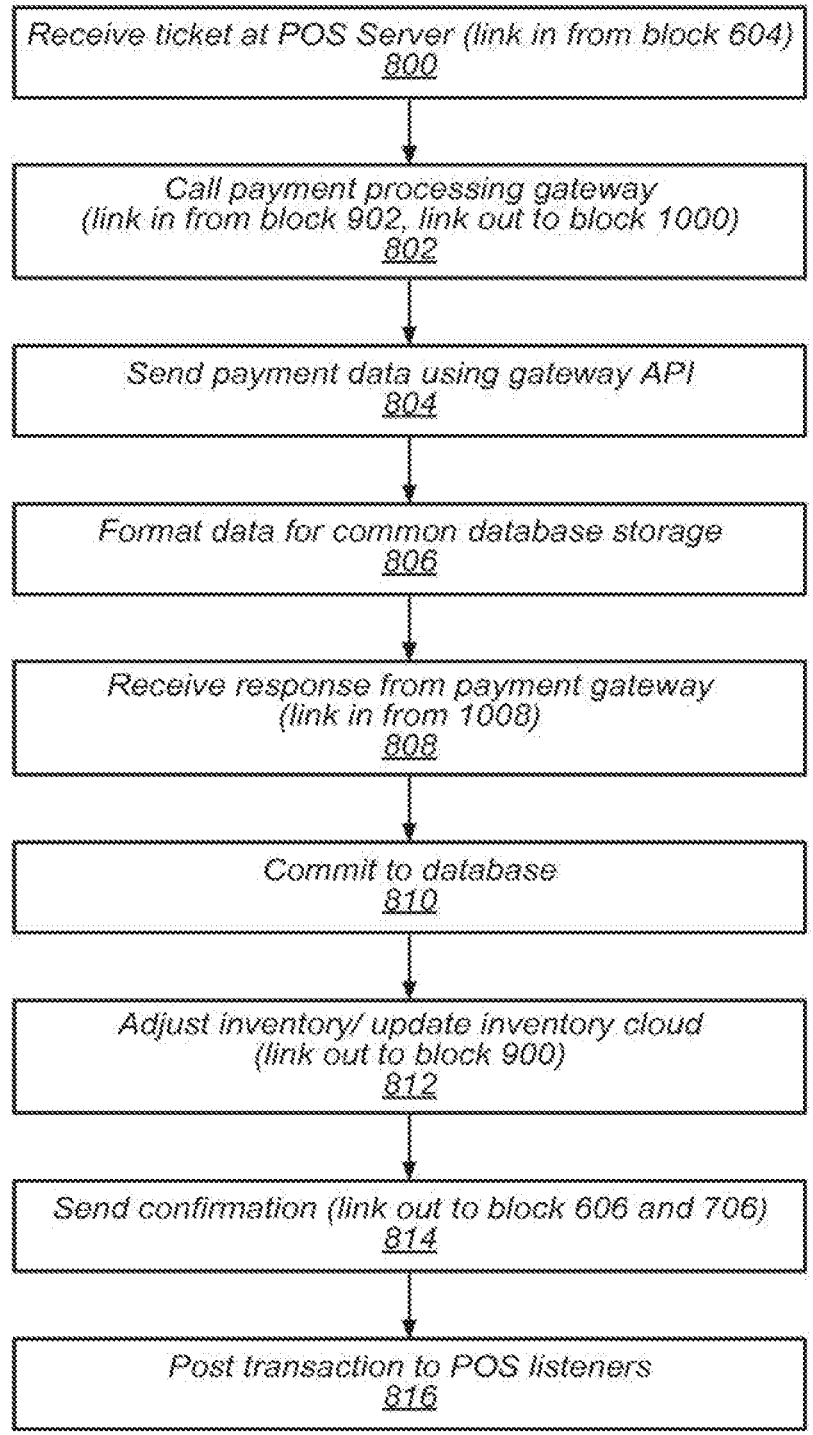
FIG. 8 is a flowchart of a process for unified inventory and financial transaction management, according to some embodiments.

FIG. 8 is a flowchart of a process for unified inventory and financial transaction management, according to some embodiments. A ticket is received at a point of sale server (block 800). A payment processing gateway is called (block 802). Payment data is sent to the payment gateway using the gateway application programming interface (block 804). Data is formatted for common database storage (block 806). Response is received from the payment gateway (block 808). Data is committed to the database (block 810). Inventory is adjusted and the inventory cloud is updated (block 812). Confirmation is sent (block 814). The transaction is posted to point of sale listeners (block 816).

Figure 9:
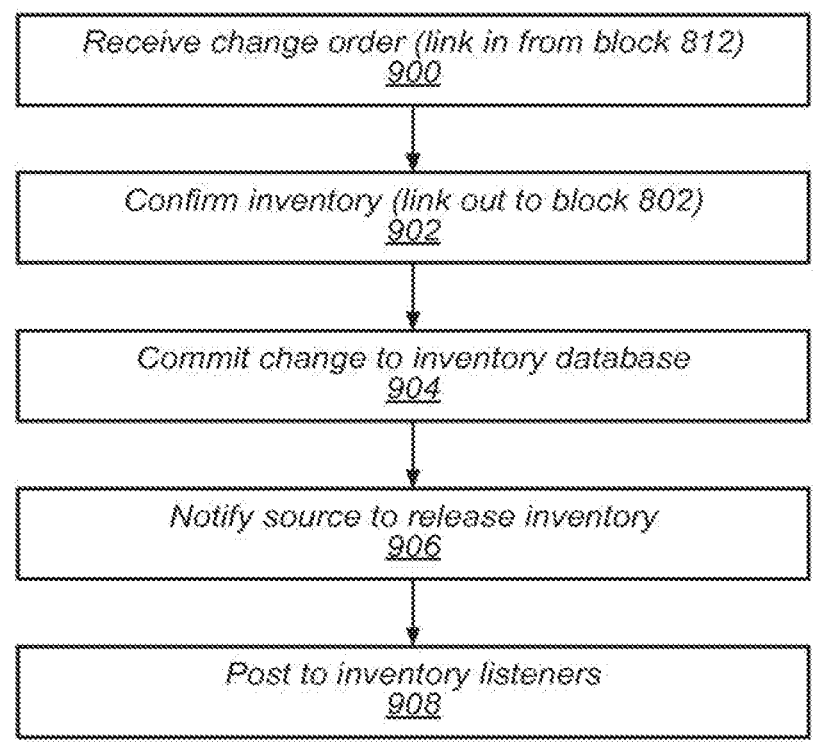
FIG. 9 is a flowchart of a process for unified inventory and financial transaction management, according to some embodiments.

FIG. 9 is a flowchart of a process for unified inventory and financial transaction management, according to some embodiments. A change order is received (block 900). Inventory is confirmed (block 902). The change is committed to the inventory database (block 904). A source is notified to release inventory (block 906). An update is posted to inventory listeners (block 908).

Figure 10A:
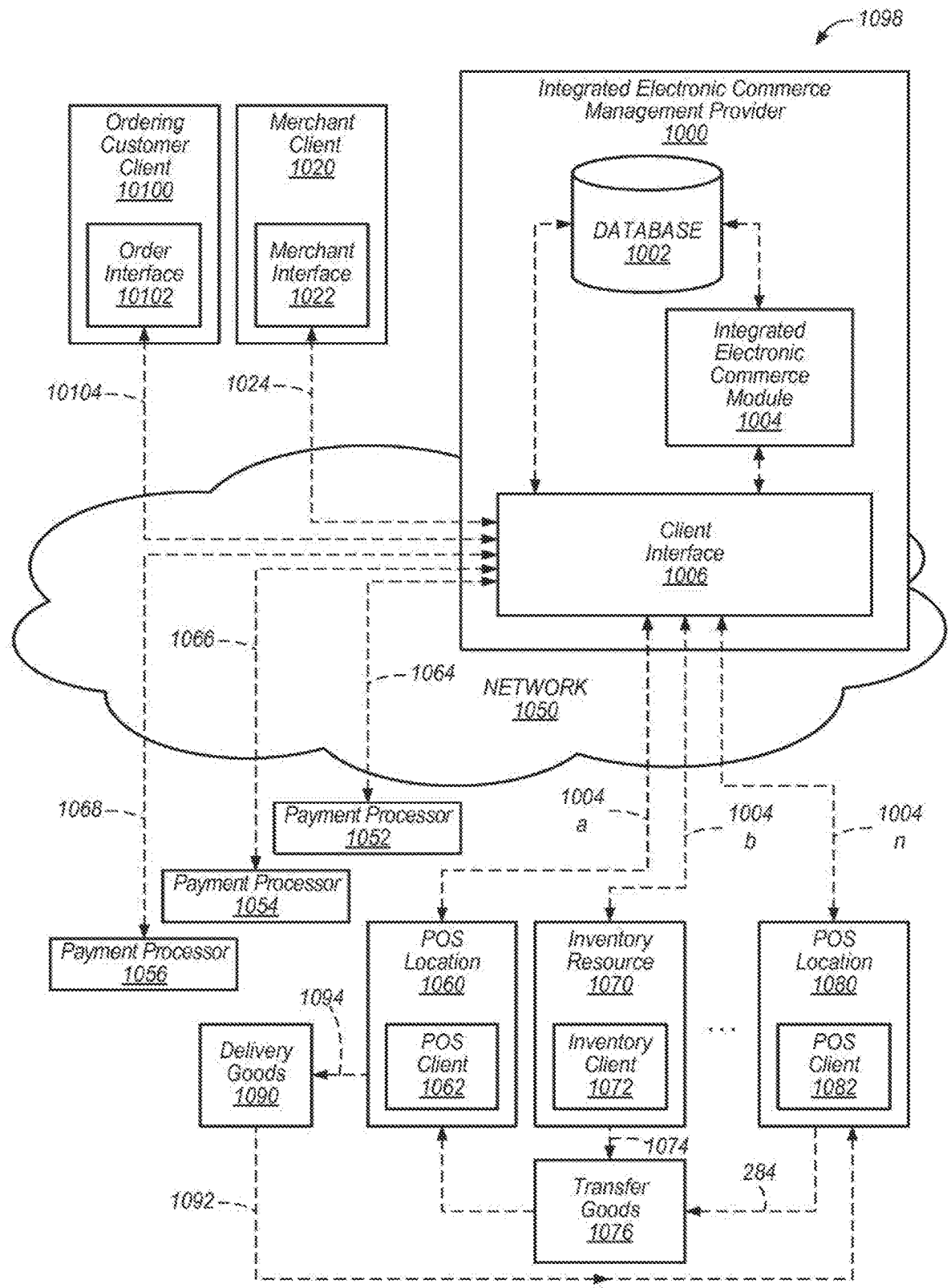
FIG. 10A illustrates a distributed system that may implement unified inventory and financial transaction management, according to some embodiments.

FIG. 10A illustrates a distributed system that may implement unified inventory and financial transaction management, according to some embodiments. An integrated electronic commerce management provider 1000 manages a system 1098 for providing payment processing services from a plurality of disparate payment processors 1052-1056 to a plurality of disparate transaction intake platforms 10100 and 1020. Integrated electronic commerce management provider 1000 includes, in some embodiments, a database 1002 storing, electronic commerce inventory and transaction records in a common internal format. Integrated electronic commerce management provider 1000 includes, in some embodiments, an integrated wireless commerce module 1004 for implementing platform-agnostic transaction-related communication across a client interface 1006. An ordering customer client 10100, a merchant client 1020, payment processors 1052-1056, a point of sale location 1060, an inventory resource 1070, and another point of sale location 1080 communicate across network 1050 with integrated wireless commerce module 1004 to implement platform-agnostic transaction-related communication using client interface 1006.

On ordering customer client 10100, a customer-facing order interface 10102 transmits and receives transaction information (in some embodiments either or both financial and inventory) as communications 10104 with client interface 1006 over network 1050. On merchant client 1020, a merchant interface 1022 transmits and receives transaction information (in some embodiments either or both financial and inventory) as communications 1024 with client interface 1006 over network 1050. Payment processors 1052-1056 transmit and receive transaction communications 1064-1068 with client interface 1006 over network 1050.

In some embodiments, inventory transactions can be reported by or ordered by transaction communication 1004a-1004n over network 1050 to point of sale client 1062, inventory client 1072, and point of sale client 1082. In some embodiments, inventory transactions involve the delivery 1094 or return 1092 of delivery goods 1090. Likewise, inventory transactions involve the transfer 1084 from a first point of sale location 1080 to a second point of sale location 1060 or the transfer 1074 from an inventory resource 1070 to a point of sale location 1060.

In some embodiments, the system 1098 includes one or more computers, such as will be discussed below with respect to FIG. 410, configured to implement by executing instructions on one or more processors a platform-agnostic transaction-related communication system. In some embodiments, the transaction-related communication system includes one or more receiving modules, which can, in some example embodiments, be located in ordering customer client 10100, merchant client 1020, or integrated wireless commerce module 1004, for receiving a first item of financial transaction information from a customer-facing interface (for example, in some embodiments order interface 10102), and receiving a second item of financial transaction information from a merchant-facing point-of-sale interface (for example, in some embodiments merchant interface 1022). As one of skill in the art will readily comprehend in light of having read the present disclosure, any function described as having been performed by a module or interface of the present disclosure can be performed by another interface or module of the present disclosure without departing from the scope and intent of the present disclosure.

In some embodiments, the transaction-related communication system includes a point of sale server (for example, in some embodiments located in ordering customer client 10100) for rendering in a common internal format the first item of financial transaction information from the customer-facing interface (for example, in some embodiments order interface 10102), and rendering in the common internal format the second item of financial transaction information from the merchant-facing point-of-sale interface (for example, in some embodiments merchant interface 1022). In some embodiments, the transaction-related communication system includes a payment processing module (for example, in some embodiments, contained within integrated wireless commerce module 1004), for rendering in a second format the first item of financial transaction information for payment processing by a first external financial party (for example, in some embodiments payment processor 1052), and rendering in a third format the first item of financial transaction information for payment processing by a second external financial party (for example, in some embodiments payment processor 1054).

In some embodiments, the transaction-related communication system includes a transaction execution module (for example, in some embodiments, contained within integrated wireless commerce module 1004), for transmitting in the second format the first item of financial transaction information for payment processing by the first external financial party (for example, in some embodiments payment processor 1052), and transmitting in the third format the second item of financial transaction information for payment processing by the second external financial party (for example, in some embodiments payment processor 1054).

In some embodiments, the system provides payment processing services from a plurality of disparate payment processors (for example, in some embodiments, payment processors 1054-1056) to a plurality of disparate transaction intake platforms (for example, in some embodiments ordering customer client 10100 and merchant client 1020). In some embodiments, the common internal format is a common intake transaction ticket format. In some embodiments, the one or more receiving modules include a single stack application program interface residing on one of the one or more servers (for example, in some embodiments as a part of client interface 1006). In some embodiments, the receiving the first item of financial transaction information from the customer-facing interface (for example, in some embodiments order interface 10102) further includes receiving in the common intake transaction ticket format over the network from a mobile computing device (for example, in some embodiments ordering client 10100) the first item of financial transaction information from the customer-facing interface (for example, in some embodiments order interface 10102). In some embodiments, the receiving the second item of financial transaction information from the merchant-facing point-of-sale interface (for example, in some embodiments merchant interface 1022) further includes receiving over the network in the common intake transaction ticket format the second item of financial transaction information from the merchant-facing point-of-sale interface (for example, in some embodiments merchant client 1020).

In some embodiments, the common internal format is a common intake transaction ticket format. In some embodiments, the system further includes a first translation module on a mobile computing device (for example, in some embodiments ordering customer client 1020) for receiving from a customer facing application including the customer-facing interface (for example, in some embodiments order interface 10102) on the mobile computing device the first item of financial transaction information, and translating to a common intake transaction ticket format the first item of financial transaction information. In some embodiments, the system further includes a second translation module on a merchant-facing point of sale device (for example, in some embodiments merchant client 1020) for receiving from a merchant facing application (for example, in some embodiments merchant interface 1022) including the merchant-facing point-of-sale interface on a merchant point of sale device the second item of financial transaction information, and translating to the common intake transaction ticket format the second item of financial transaction information.

In some embodiments, the one or more receiving modules include a single stack application program interface residing on one of the one or more servers (for example, in some embodiments in client interface 10102). In some embodiments, the server (for example, in some embodiments integrated wireless commerce module 1004) communicates (for example, in some embodiments sending and receiving communications 10104) remotely with the mobile computing device (for example, in some embodiments customer ordering client 10100) over a wireless network (for example, in some embodiments network 1050). In some embodiments, the server (for example, in some embodiments integrated wireless commerce module 1004) communicates remotely with the merchant-facing point of sale device over a second network. In some embodiments, the receiving the first item of financial transaction information from the customer-facing interface (for example, in some embodiments in order interface 10102) further includes receiving in the common intake transaction ticket format at the single stack application interface (for example, in some embodiments in client interface 1006) from the mobile computing device the first item of financial transaction information from the customer-facing interface (for example, in some embodiments in ordering interface 10102). In some embodiments, the receiving the second item of financial transaction information from the merchant-facing point-of-sale interface further includes receiving in the common intake transaction ticket format at the single stack application interface (for example, in some embodiments in client interface 1006) the second item of financial transaction information from the merchant-facing point-of-sale interface (for example, in some embodiments merchant interface 1022).

In some embodiments, the transaction execution module (for example, in some embodiments in integrated wireless commerce module 1004) is further configured for receiving on the one or more servers a transaction authorization confirmation from the first external financial party, and the point of sale server (for example, in some embodiments in integrated wireless commerce module 1004) is further configured for transmitting to the customer-facing interface (for example, in some embodiments order interface 10102) an indication of the transaction authorization confirmation. In some embodiments, the payment processing module includes a payment processing gateway (for example, in some embodiments in client interface 1006) for communicating with servers of external financial processors (for example, in some embodiments payment processors 1052-1056) using encrypted links over a network 1050.

In some embodiments, the system for providing payment processing services from a plurality of disparate payment processors (for example, in some embodiments payment processors 1052-1056) to a plurality of disparate transaction intake platforms further includes a business intelligence analytics module (for example, in some embodiments in integrated wireless commerce module 1004) for providing business intelligence based at least in part on the first item of financial transaction information.

In some embodiments, the system for providing payment processing services from a plurality of disparate payment processors (for example, in some embodiments payment processors 1052-1056) to a plurality of disparate transaction intake platforms (for example, in some embodiments merchant client 1020 and ordering customer client 10100) further includes an inventory coordination module (for example, in some embodiments in integrated wireless commerce module 1004) for providing transaction fulfillment information based at least in part on the first item of financial transaction information.

In some embodiments, the inventory coordination module enables the integrated wireless commerce module 1004 to monitor consolidated stock levels and determine when to re-order, without relying on additional systems or manual reporting, thereby enabling merchants to provide a consistent, seamless experience for consumers across all channels, including offering returns through any channel no matter where the purchase originated. Some embodiments of integrated wireless commerce module 1004 support a merchant that operates a physical store, operates an online store, accepts payments on a mobile device, or any combination of those-channels. Some embodiments of integrated wireless commerce module 1004 present a single merchant account to reduce reconciliation and accounting headaches and to provide one version of the data through consolidated reports across all channels and touchpoints. Some embodiments of integrated wireless commerce module 1004 can also handle the issues of managing inventory across mobile and e-commerce touchpoints, as well as in the store, providing a single view of the merchandise that's available to sell, and helping businesses balance between inventory and demand.

Some embodiments of integrated wireless commerce module 1004 support a cloud-based point-of-sale, mobile and eCommerce framework that integrates payments with inventory management.

Some embodiments of integrated wireless commerce module 1004 real-time, in-app inventory tracking, management and replenishment directly from a mobile application. Some embodiments of integrated wireless commerce module 1004 provide import and export capabilities that allow merchants to easily transfer and integrate inventory data into other systems. Some embodiments of integrated wireless commerce module 1004 provide Integration with third party eCommerce platforms—sales and inventory data by location provides merchants more valuable insights into their business. Some embodiments of integrated wireless commerce module 1004 provide the ability to set replenishment thresholds and alerts and transfer inventory between locations and channels. Some embodiments of integrated wireless commerce module 1004 adjust inventory for sales and returns in real-time and can also work with a merchant's existing inventory platform, by allowing merchants to integrate in to some embodiments of integrated wireless commerce module 1004 using application program interfaces.

Some embodiments of integrated wireless commerce module 1004 can also solve the problems of the friction points mentioned above by eliminating disparate payment processors and processing rates, further simplifying reconciliation across all of a merchant's selling channels. In moving to a single payments provider under some embodiments, merchants can also take advantage of volume pricing, and get the best possible rates for each channel.

Some embodiments of integrated wireless commerce module 1004 provide business insights, such merchants can leverage data to optimize sales, for example such as how much floor space to allocate to specific products, what items and locations provide the most revenue and profit and what products to feature. Merchants also have the ability to store customer history, past purchases and other customer-specific data to help them become more customer-centric. These systems open the door to integrated loyalty programs and other customer relationship management tools to help merchants know who their best customers are and how to best reach them how, when and where the customer wants to shop.

Some embodiments of integrated wireless commerce module 1004 also allow developers to integrate payments, inventory and business insights into their platforms through the only single stack of application program interfaces for card present and card not present transactions.

Some embodiments of integrated wireless commerce module 1004 also include a system for providing inventory management services from a plurality of disparate inventory resources (for example, in some embodiments point of sale location 1060, inventory resource 1070 and point of sale location 1080) for transactions received from a plurality of disparate transaction intake platforms (for example, in some embodiments ordering customer client 10100 and merchant client 1020). In some embodiments, one or more computers executes instructions on one or more processors for a platform-agnostic transaction-related communication system. In some embodiments, the transaction-related communication system includes one or more receiving modules, which can, in some example embodiments, be located in ordering customer client 10100, merchant client 1020, or integrated wireless commerce module 1004, point of sale client 1062, inventory client 1072, or point of sale location 1082, configured for receiving a first item of inventory transaction information from a customer-facing interface, and receiving a second item of inventory transaction information from a merchant-facing point-of-sale interface.

In some embodiments, the transaction-related communication system includes an inventory coordination module (for example, in some embodiments, contained within integrated wireless commerce module 1004), configured for rendering in a common internal format the first item of inventory transaction information from the customer-facing interface (for example, in some embodiments order interface 10102), and rendering in the common internal format the second item of inventory transaction information from the merchant-facing point-of-sale interface (for example, in some embodiments, merchant interface 1022). In some embodiments, the transaction-related communication system includes an inventory coordination module configured for transmitting the second item of inventory transaction information for inventory transaction execution by the second inventory resource (for example, in some embodiments, a warehouse such as inventory resource 1070), and transmitting the first item of inventory transaction information for inventory transaction execution by a first inventory resource (for example, in some embodiments, point of sale location 1060).

In some embodiments, the transaction-related communication system includes a synchronization server module (for example, in some embodiments, contained within integrated wireless commerce module 1004) configured for providing background updates of transactions to the customer facing interface and the merchant-facing point of sale interface (for example, in some embodiments ordering customer client 10100 and merchant client 1020). In some embodiments, the receiving the first item of inventory transaction information from the customer-facing interface further includes receiving in the common intake transaction ticket format over the network from a mobile computing device an order for an item as the first item of inventory transaction information from the customer-facing interface (for example, in some embodiments ordering customer client 10100). In some embodiments, the receiving the second item of inventory transaction information from the merchant-facing point-of-sale interface further includes receiving over the network in the common intake transaction ticket format a return of the item as the second item of inventory transaction information from the merchant-facing point-of-sale interface (for example, in some embodiments merchant client 1020). In some embodiments, the inventory coordination module is further configured for updating a unified inventory database (for example, in some embodiments database 1002) to reflect fulfillment of the order for the item, and the inventory coordination module is further configured for updating a unified inventory database (for example, in some embodiments database 1002) to reflect fulfillment of the return of the item.

In some embodiments, the receiving the first item of inventory transaction information from the customer-facing interface (for example, in some embodiments, ordering customer client 10100) further includes receiving in the common intake transaction ticket format over the network from a mobile computing device an order for an item as the first item of inventory transaction information from the customer-facing interface (for example, in some embodiments order interface 10102). In some embodiments, the receiving the second item of inventory transaction information from the merchant-facing point-of-sale interface (for example, in some embodiments merchant client 1020) further includes receiving over the network in the common intake transaction ticket format a return of the item as the second item of inventory transaction information from the merchant-facing point-of-sale interface (for example, in some embodiments merchant interface 1022). In some embodiments, the inventory coordination module is further configured for querying a unified inventory database (for example, in some embodiments database 1002) to ascertain whether fulfillment of the order for the item is possible, and the inventory coordination module is further configured for updating a unified inventory database (for example, in some embodiments database 1002) to reflect fulfillment of the return of the item.

In some embodiments, the common internal format is a common intake transaction ticket format, and the one or more receiving modules include a single stack application program interface residing on one of the one or more servers.

In some embodiments, the receiving the first item of inventory transaction information from the customer-facing interface further includes receiving in the common intake transaction ticket format over the network from a mobile computing device (for example, in some embodiments ordering customer client 10100) an order for an item as the first item of inventory transaction information from the customer-facing interface (for example, in some embodiments order interface 10102). In some embodiments, the receiving the second item of inventory transaction information from the merchant-facing point-of-sale interface (for example, in some embodiments merchant client 1020) further includes receiving over the network in the common intake transaction ticket format a return of the item as the second item of inventory transaction information from the merchant-facing point-of-sale interface. (for example, in some embodiments merchant interface 1022). In some embodiments, the inventory coordination module is further configured for updating a unified inventory database (for example, in some embodiments database 1002) to reflect fulfillment of the order for the item from an inventory warehouse resource. In some embodiments, the inventory coordination module is further configured for updating a unified inventory database (for example, in some embodiments database 1002) to reflect fulfillment of the return of the item by updating an in-stock inventory count for a brick-and-mortar retail location (for example, in some embodiments point of sale location 1080) housing the merchant-facing point-of-sale interface (for example, in some embodiments point of sale client 1082).

Figure 10B:
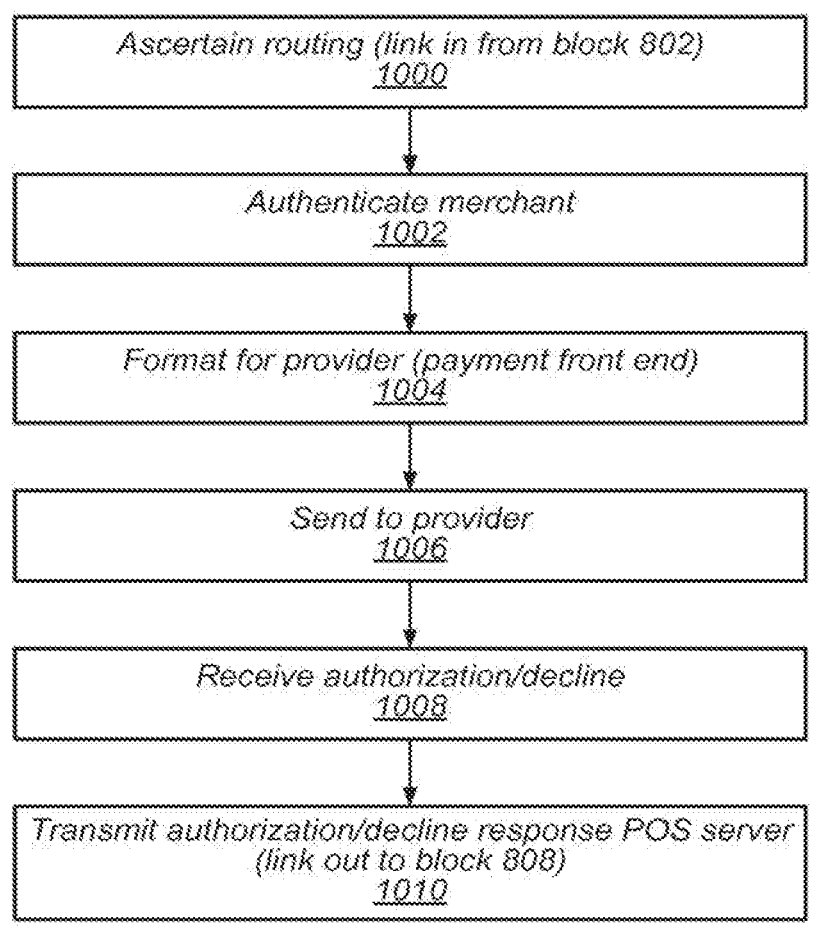
FIG. 10B is a flowchart of a process for unified inventory and financial transaction management, according to some embodiments.

In some embodiments, the system further includes a business intelligence analytics module (for example, in some embodiments, contained within integrated wireless commerce module 104) configured for providing business intelligence based at least in part on the inventory transaction information. FIG. 10B is a flowchart of a process for unified inventory and financial transaction management, according to some embodiments. Routing is ascertained (block 1000). A merchant is authenticated (block 1002). Formatting of the transaction for a provider (payment front end) is performed (block 1004). The transaction is sent to a provider (block 1006). An authorization or decline is received (block 1008). The authorization or decline response is transmitted to the point-of-sale server (block 1010).

Figure 11:
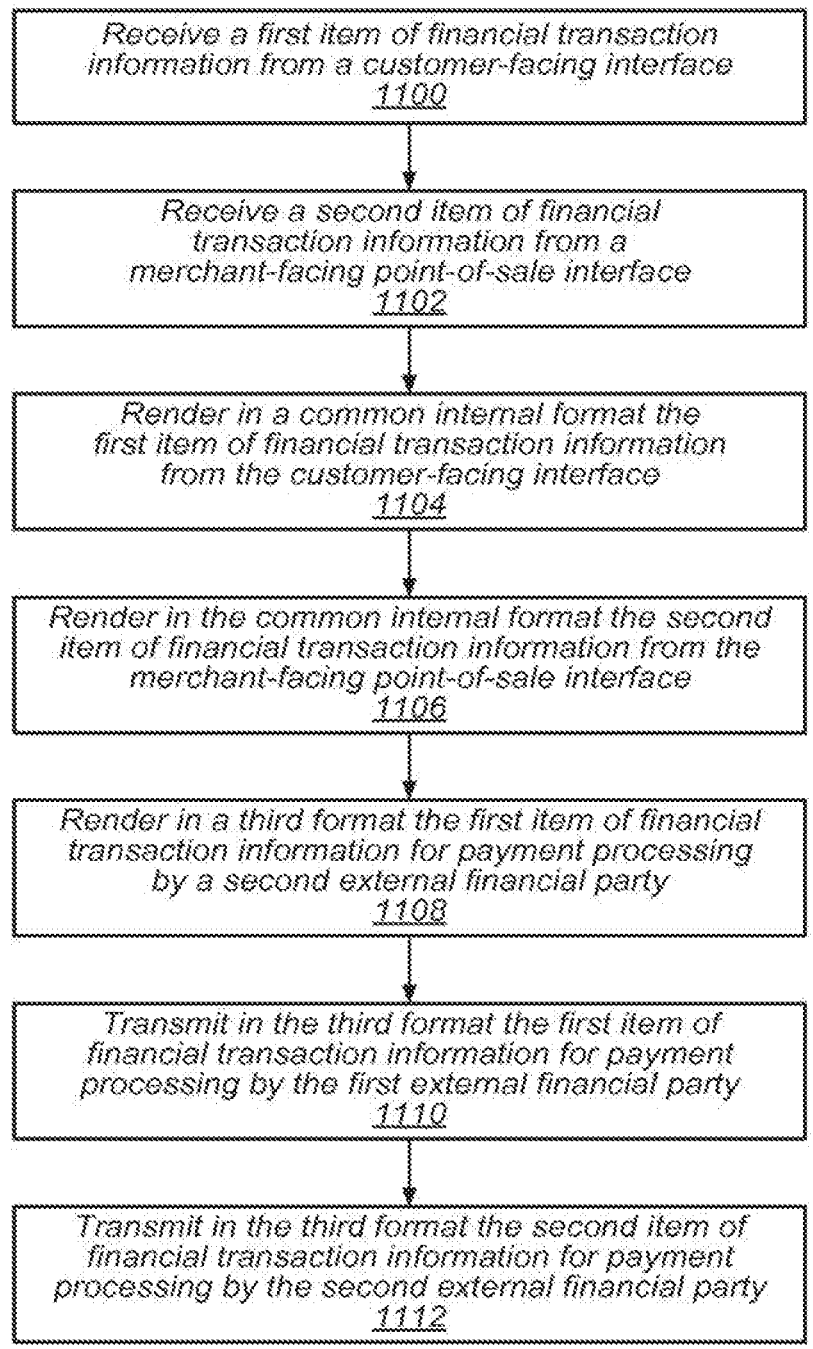
FIG. 11 is a flowchart of a process for unified inventory and financial transaction management, according to some embodiments.

FIG. 11 is a flowchart of a process for unified inventory and financial transaction management, according to some embodiments. A first item of financial transaction information is received from a customer-facing interface (block 1100). A second item of financial transaction information is received from a merchant-facing point-of-sale interface (block 1102). The first item of financial transaction information from the customer-facing interface is rendered in a common internal format (block 1104). The second item of financial transaction information from the merchant-facing point-of-sale interface is rendered in the common internal format (block 1106). A first item of financial transaction information for payment processing by a second external financial party is rendered in a third format (block 1108). The first item of financial transaction information is transmitted in the third format for payment processing by the first external financial party (block 1110). The second item of financial transaction information is transmitted in the third format for payment processing by the second external financial party (block 1112).

Figure 12:
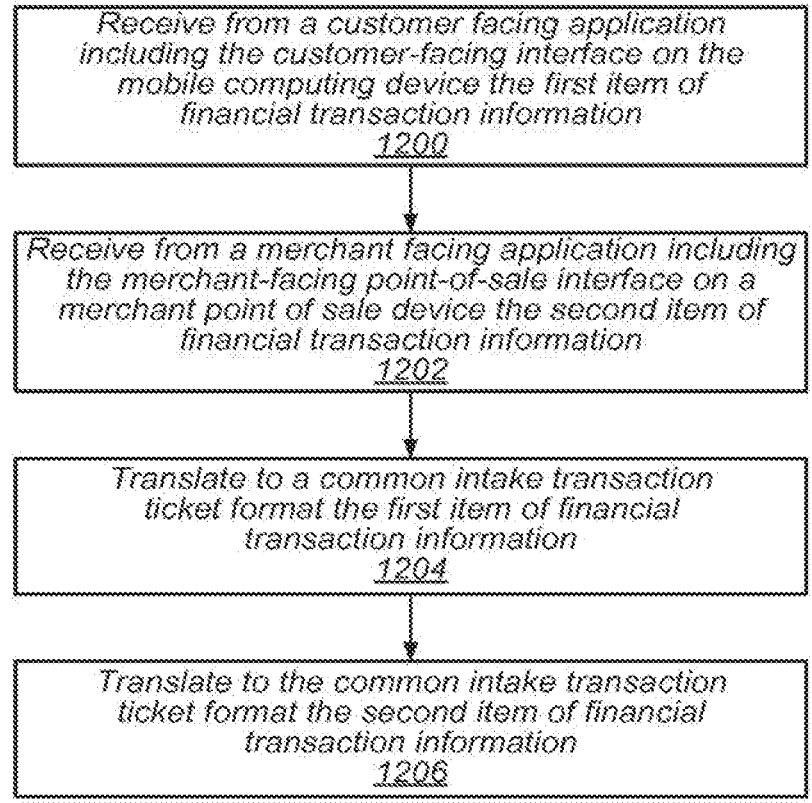
FIG. 12 is a flowchart of a process for unified inventory and financial transaction management, according to some embodiments.

FIG. 12 is a flowchart of a process for unified inventory and financial transaction management, according to some embodiments. A first item of financial transaction information is received from a customer facing application including a customer-facing interface on the mobile computing device (block 1200). A second item of financial transaction information is received from a merchant facing application including the merchant-facing point-of-sale interface on a merchant point of sale device (block 1202). The first item of financial transaction information is translated to a common intake transaction ticket format (block 1204). The second item of financial transaction information is translated to the common intake transaction ticket format (block 1206).

Figure 13:
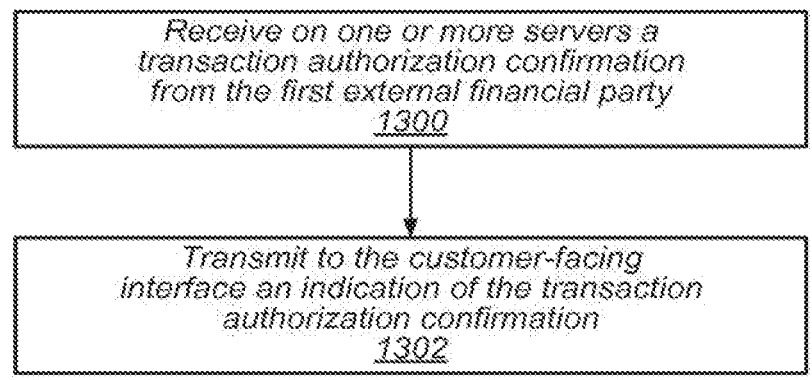
FIG. 13 is a flowchart of a process for unified inventory and financial transaction management, according to some embodiments.

FIG. 13 is a flowchart of a process for unified inventory and financial transaction management, according to some embodiments. A transaction authorization confirmation from the first external financial party is received on one or more servers (block 1300). An indication of the transaction authorization confirmation is transmitted to the customer-facing interface (block 1302).

Figure 14:
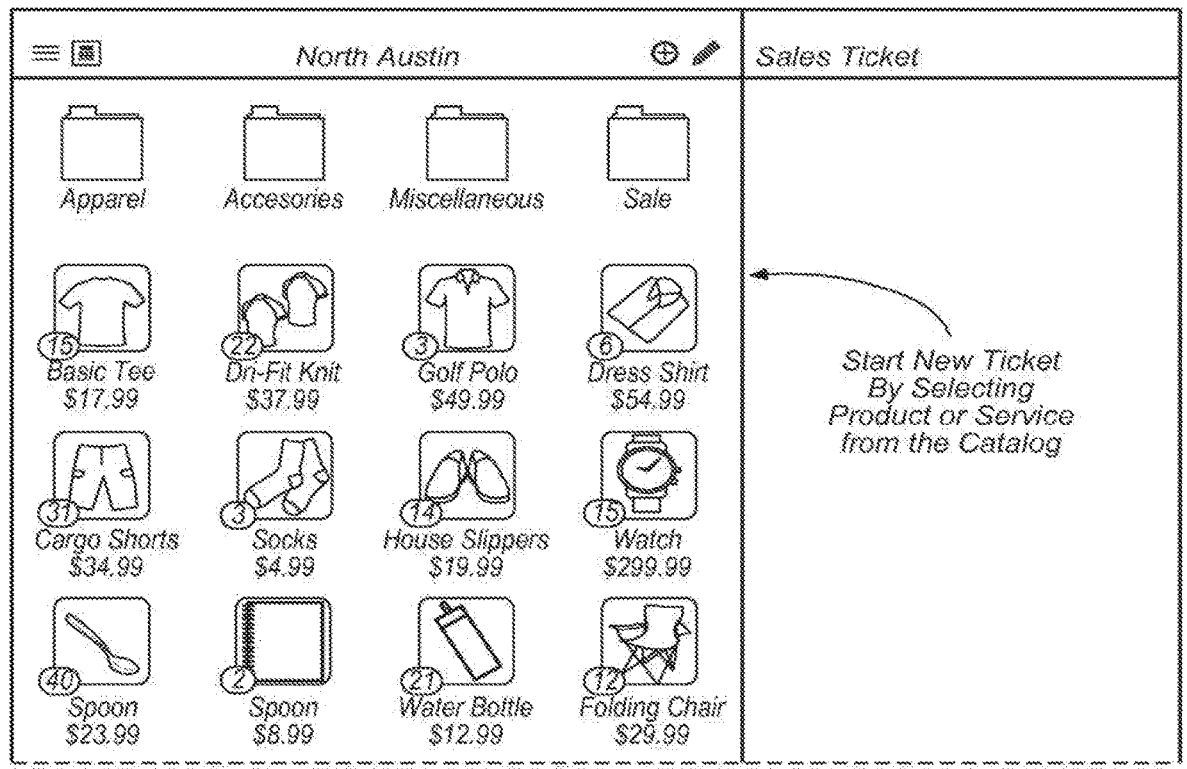
FIG. 14 is a user interface for creating a sales ticket for unified inventory and financial transaction management, according to some embodiments.

FIG. 14 is a user interface for creating a sales ticket for unified inventory and financial transaction management, according to some embodiments.

Figure 15:
FIG. 15 is a user interface for creating a sales ticket for unified inventory and financial transaction management, according to some embodiments.

FIG. 15 is a user interface for creating a sales ticket for unified inventory and financial transaction management, according to some embodiments.

Figure 16:
FIG. 16 is a user interface for creating a sales ticket for unified inventory and financial transaction management, according to some embodiments.

FIG. 16 is a user interface for creating a sales ticket for unified inventory and financial transaction management, according to some embodiments.

Figure 17:
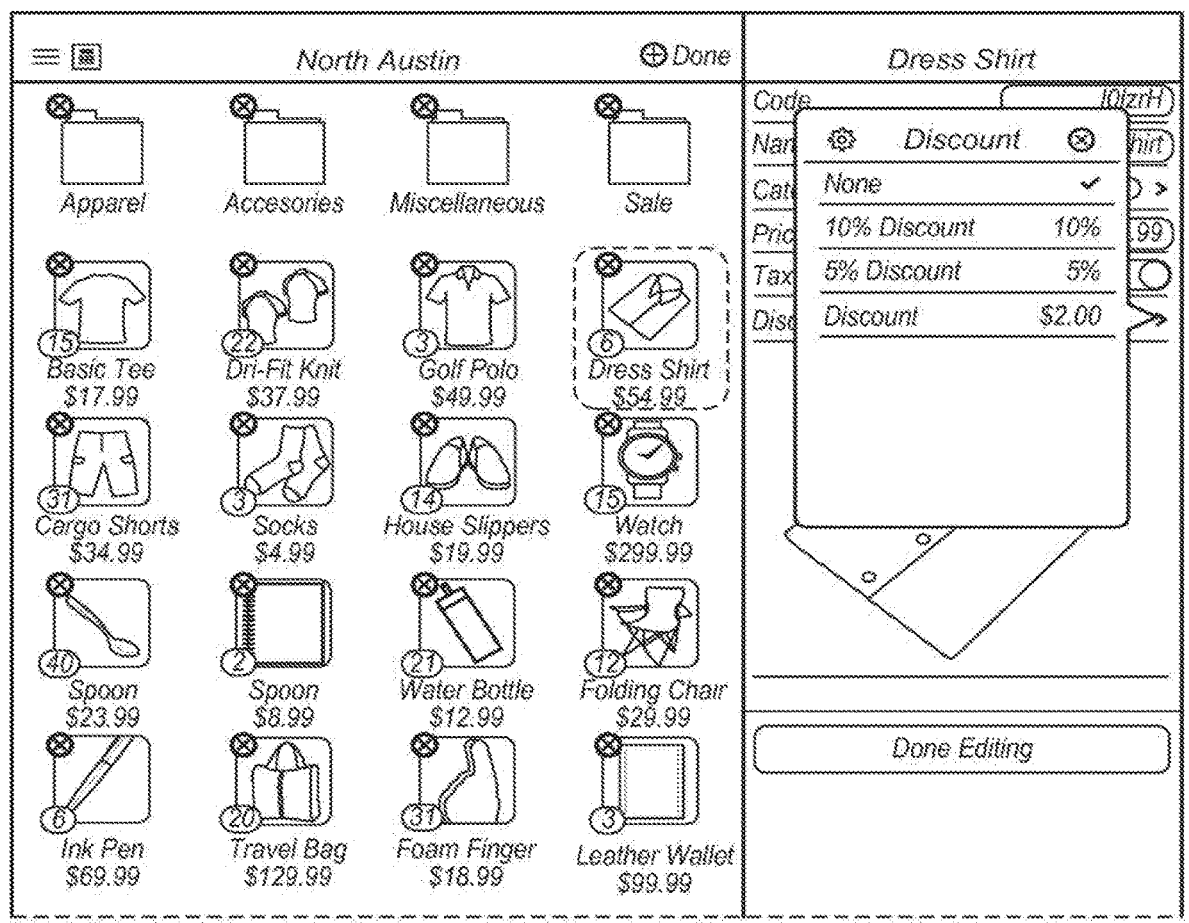
FIG. 17 is a user interface for creating a sales ticket for unified inventory and financial transaction management, according to some embodiments.

FIG. 17 is a user interface for creating a sales ticket for unified inventory and financial transaction management, according to some embodiments.

Figure 18:
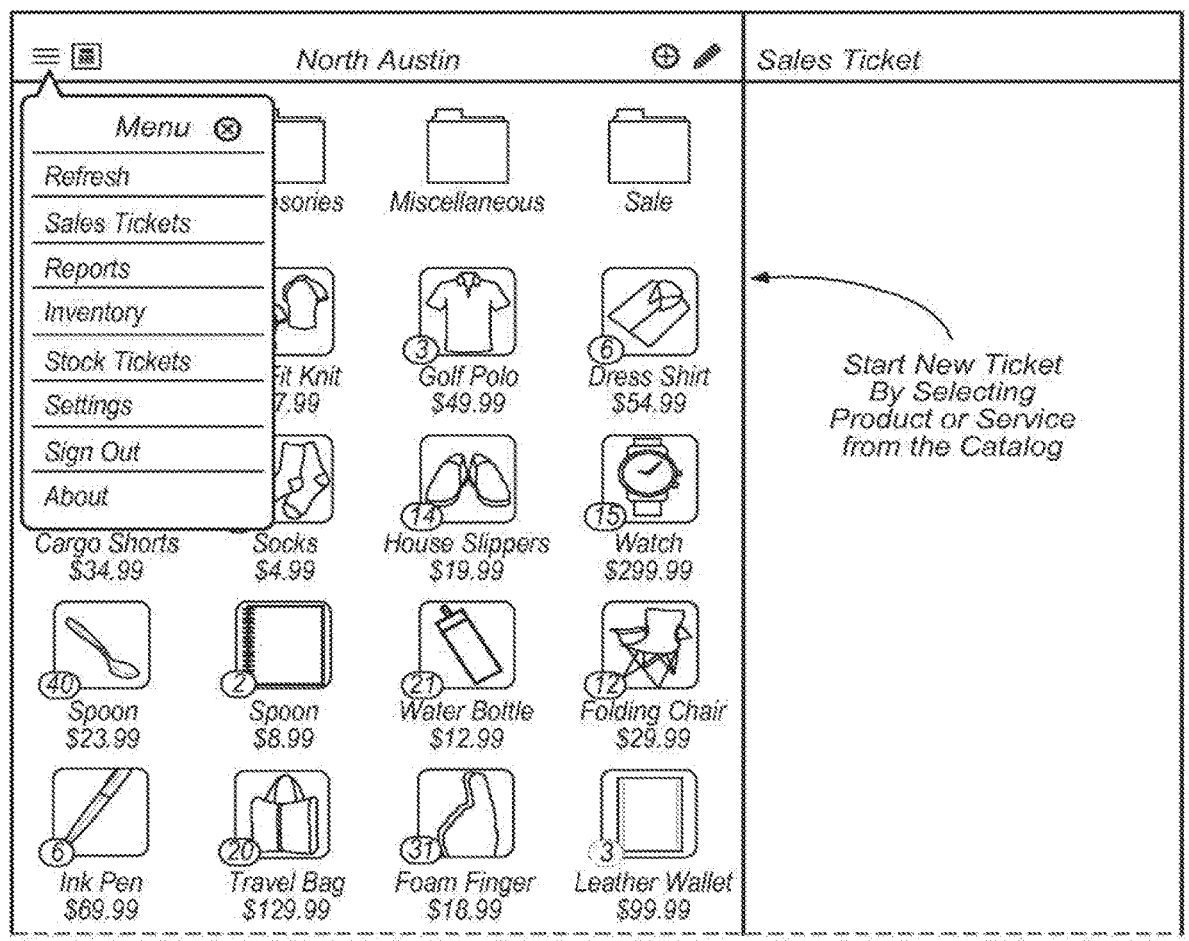
FIG. 18 is a user interface for creating a sales ticket for unified inventory and financial transaction management, according to some embodiments.

FIG. 18 is a user interface for creating a sales ticket for unified inventory and financial transaction management, according to some embodiments.

FIG. 19 is a user interface for selecting for review a sales ticket for unified inventory and financial transaction management, according to some embodiments.

Figure 20:
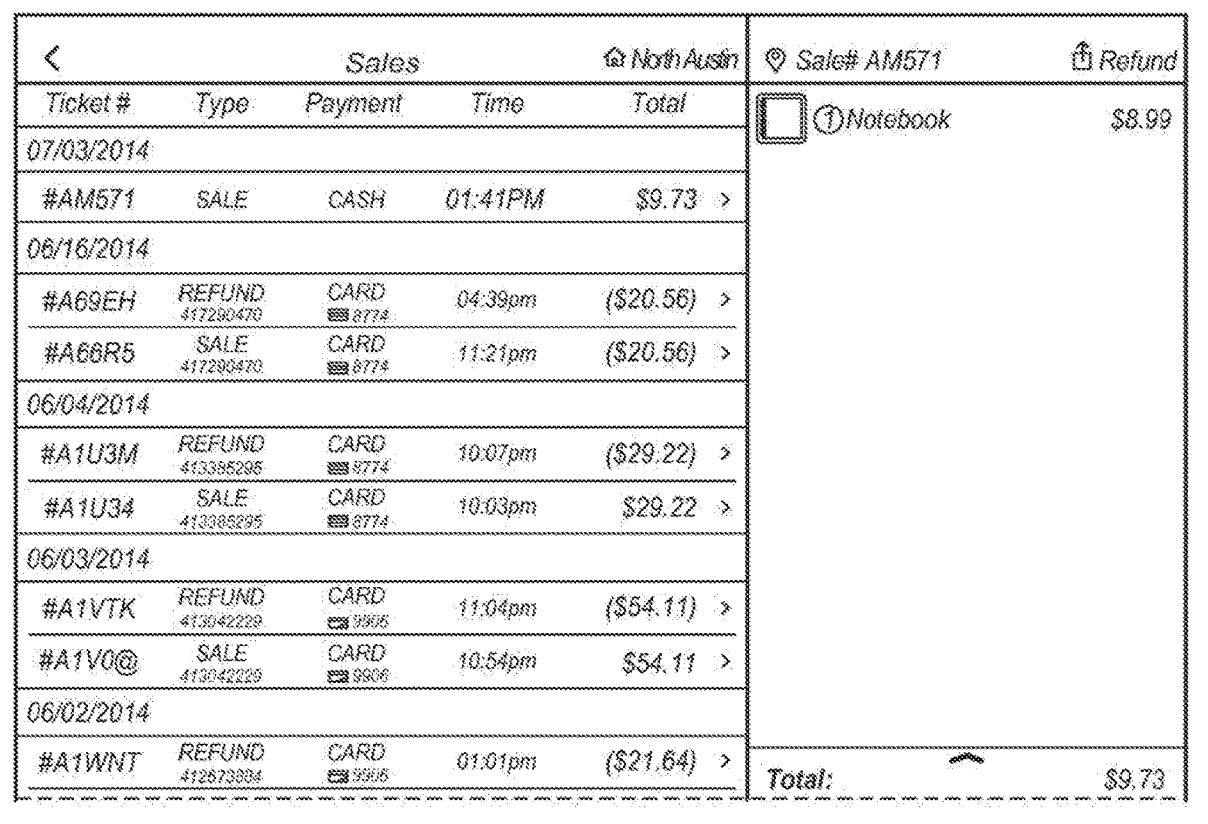

FIG. 20 is a user interface for reviewing a sales ticket for unified inventory and financial transaction management, according to some embodiments.

Figure 21:
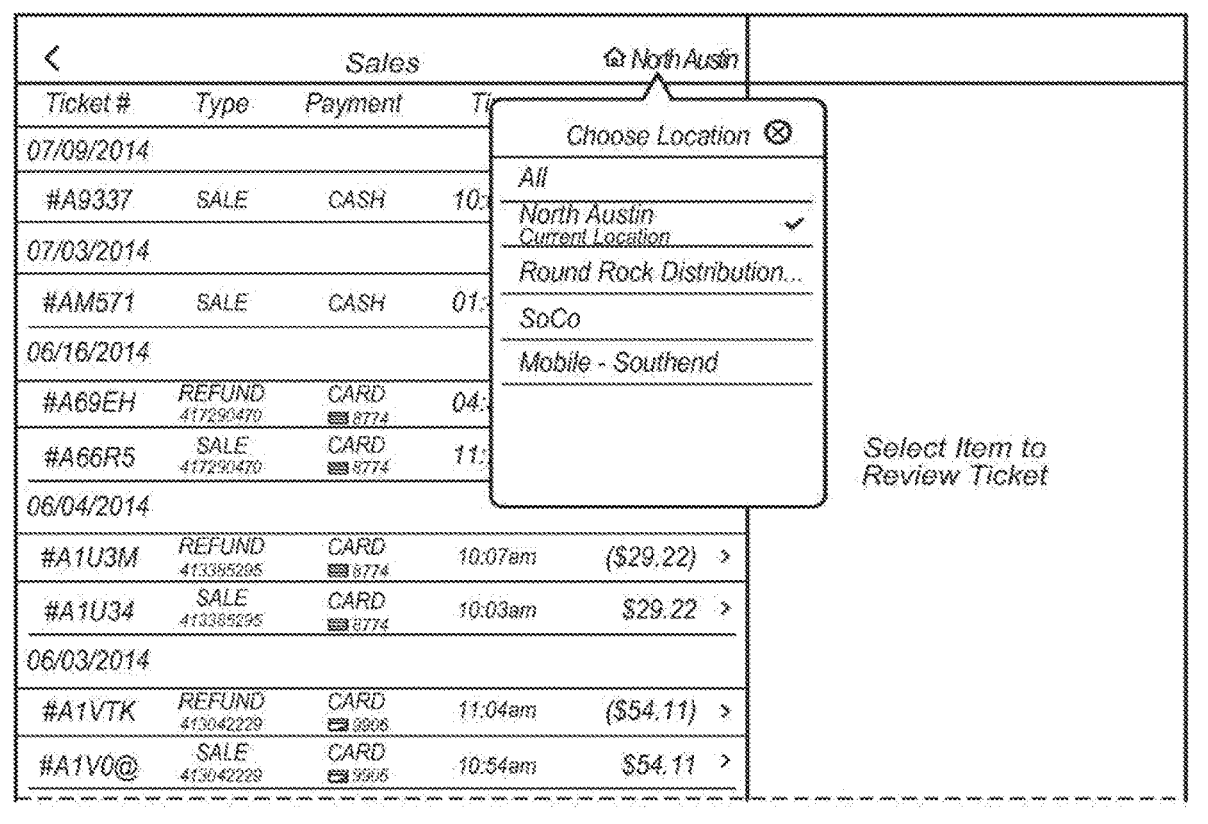

FIG. 21 is a user interface for selecting for review an item in a sales ticket for unified inventory and financial transaction management, according to some embodiments.

Figure 22:
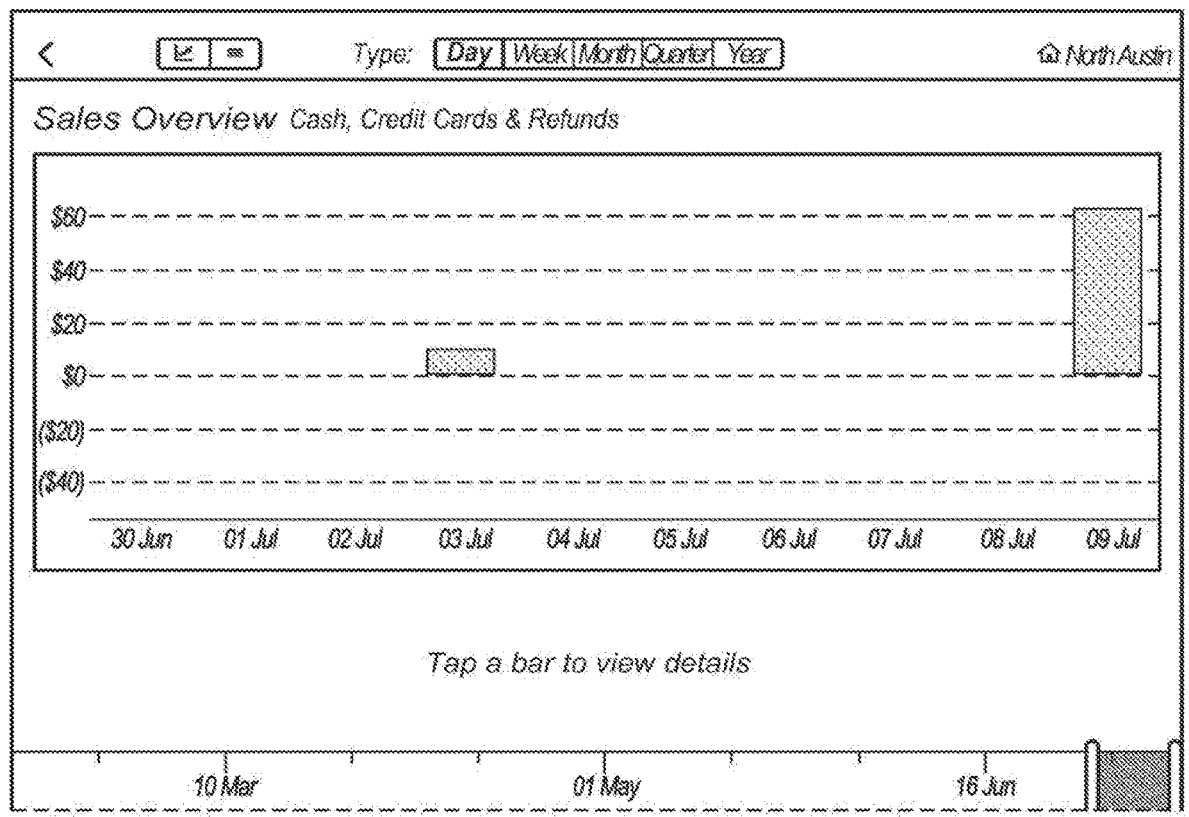
FIG. 22 is a user interface, for reviewing an overview of transactions in a system for unified inventory and financial transaction management, according to some embodiments.

FIG. 22 is a user interface for reviewing an overview of transactions in a system for unified inventory and financial transaction management, according to some embodiments.

Figure 23:
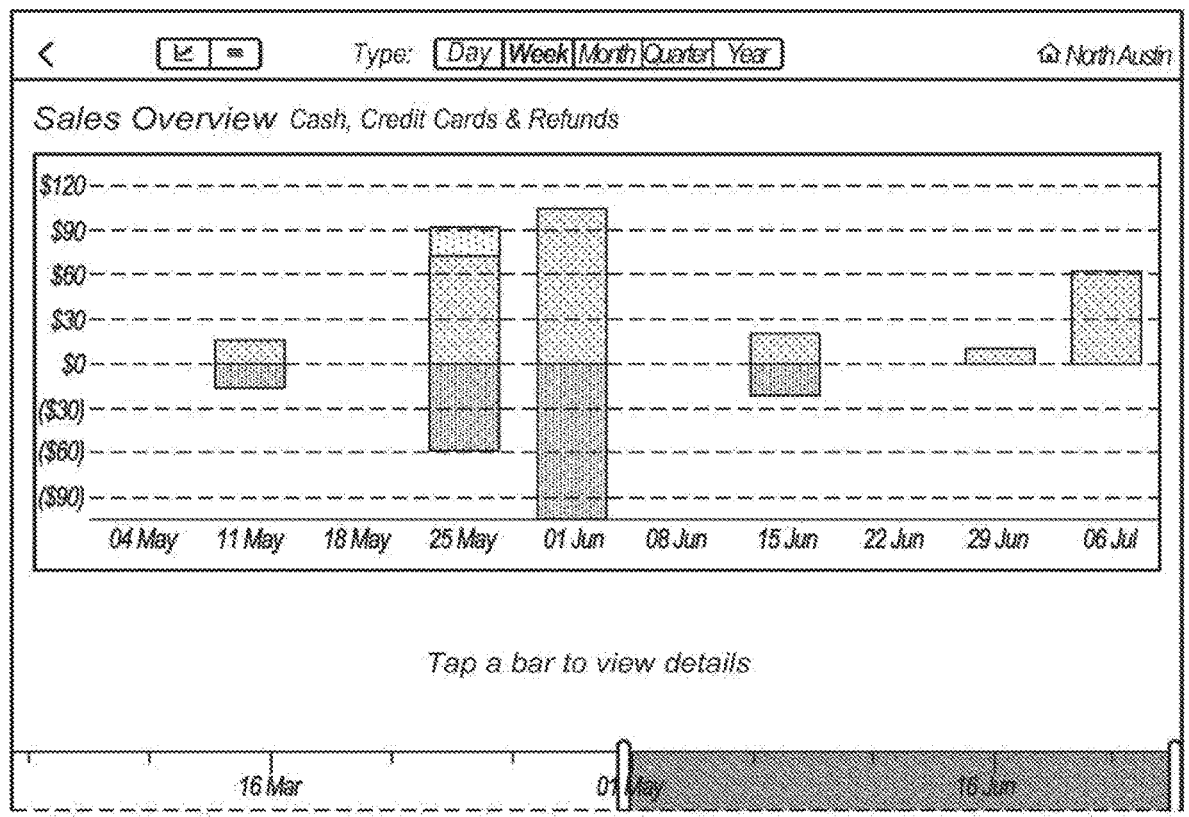
FIG. 23 is a user interface for reviewing an overview of transactions in a system for unified inventory and financial transaction management, according to some embodiments.

FIG. 23 is a user interface for reviewing an overview of transactions in a system for unified inventory and financial transaction management, according to some embodiments.

Figure 24:
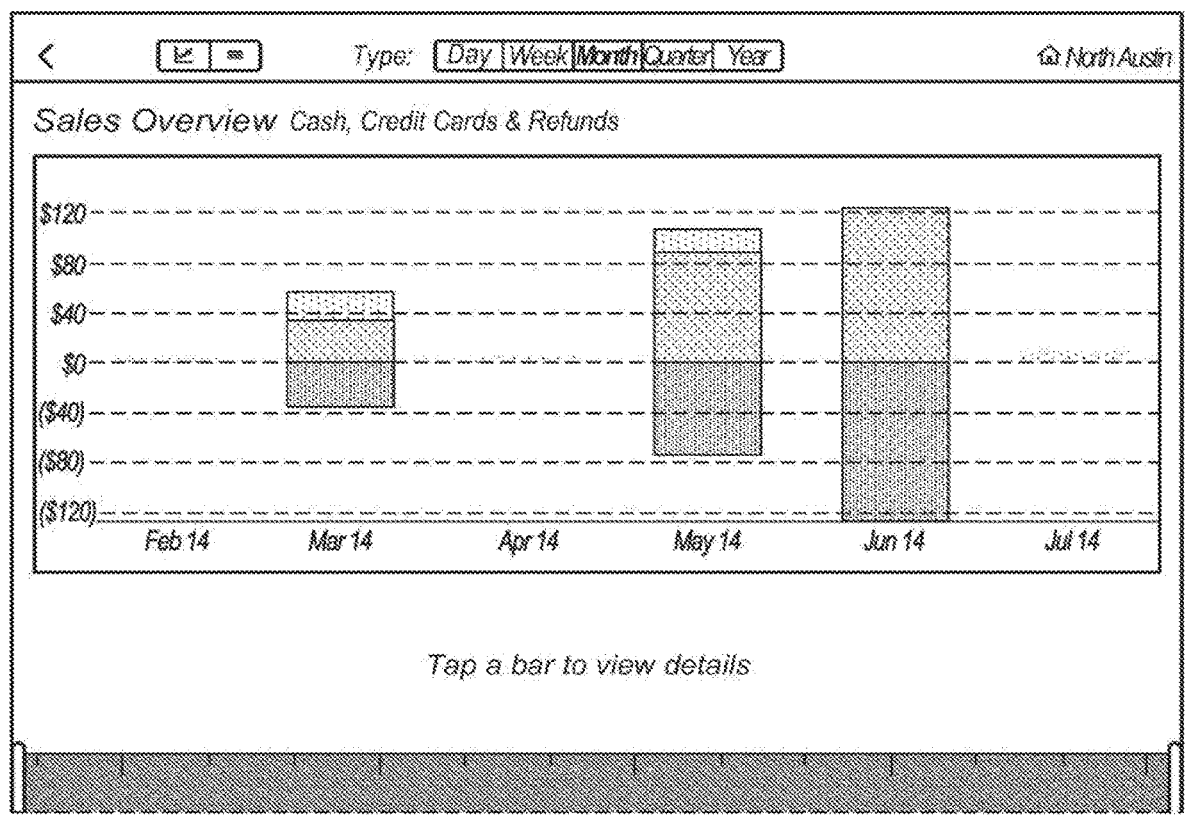
FIG. 24 is a user interface for reviewing an overview of transactions in a system for unified inventory and financial transaction management, according to some embodiments.

FIG. 24 is a user interface for reviewing an overview of transactions in a system for unified inventory and financial transaction management, according to some embodiments.

Figure 25:
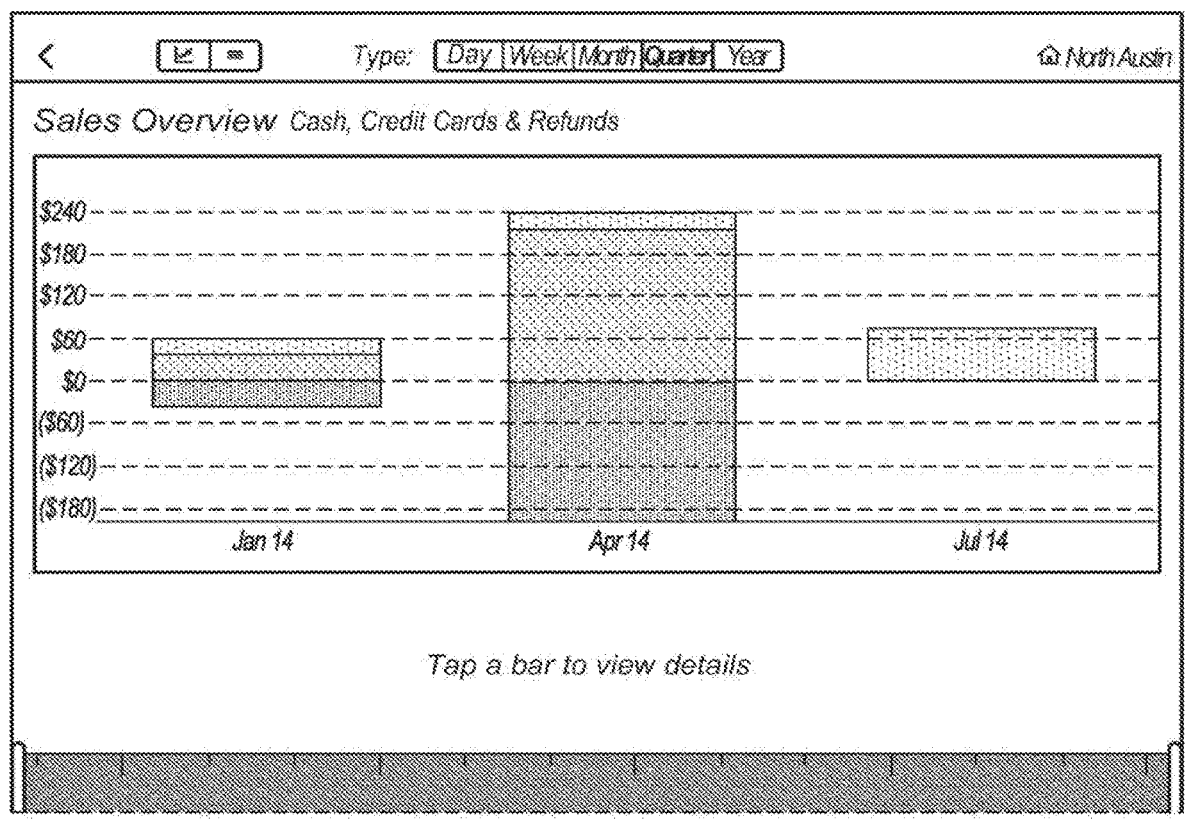
FIG. 25 is a user interface for reviewing an overview of transactions in a system for unified inventory and financial transaction management, according to some embodiments.

FIG. 25 is a user interface for reviewing an overview of transactions in a system for unified inventory and financial transaction management, according to some embodiments.

Figure 26:
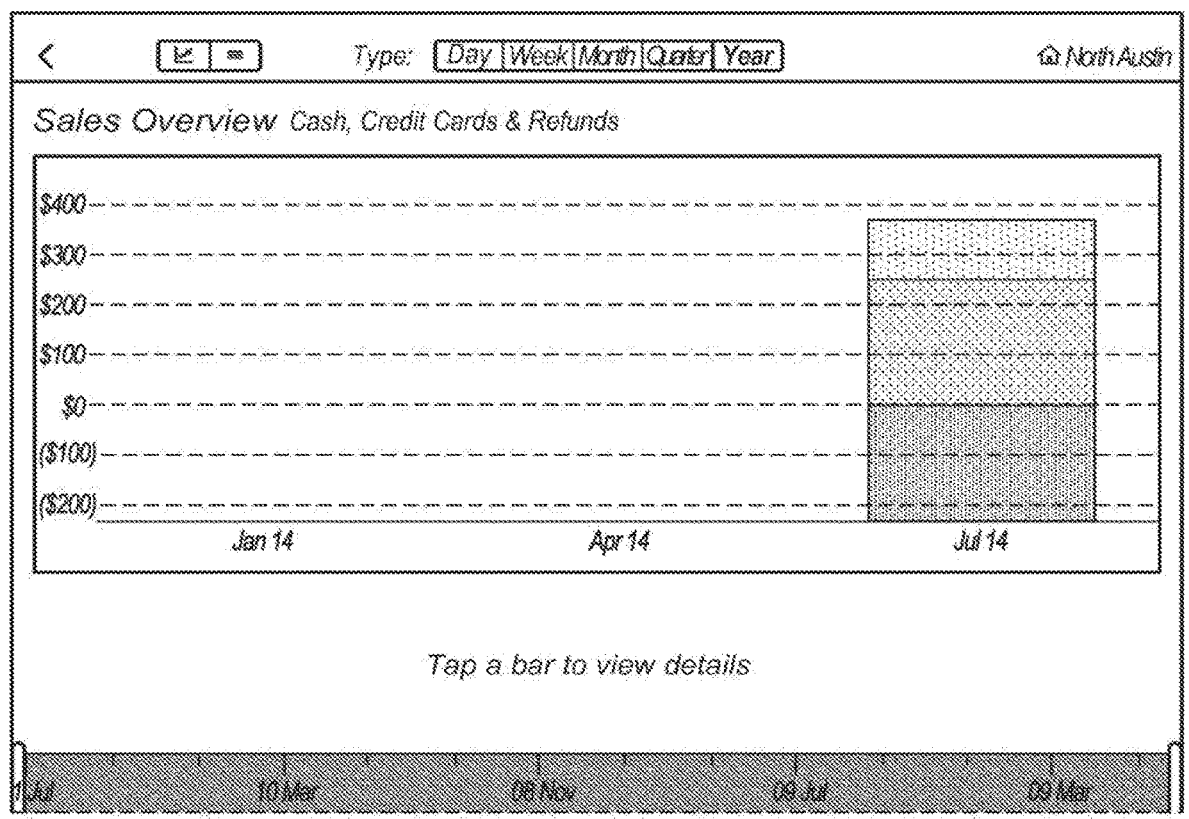
FIG. 26 is a user interface for reviewing an overview of transactions in a system for unified inventory and financial transaction management, according to some embodiments.

FIG. 26 is a user interface for reviewing an overview of transactions in a system for unified inventory and financial transaction management, according to some embodiments.

Figure 27:
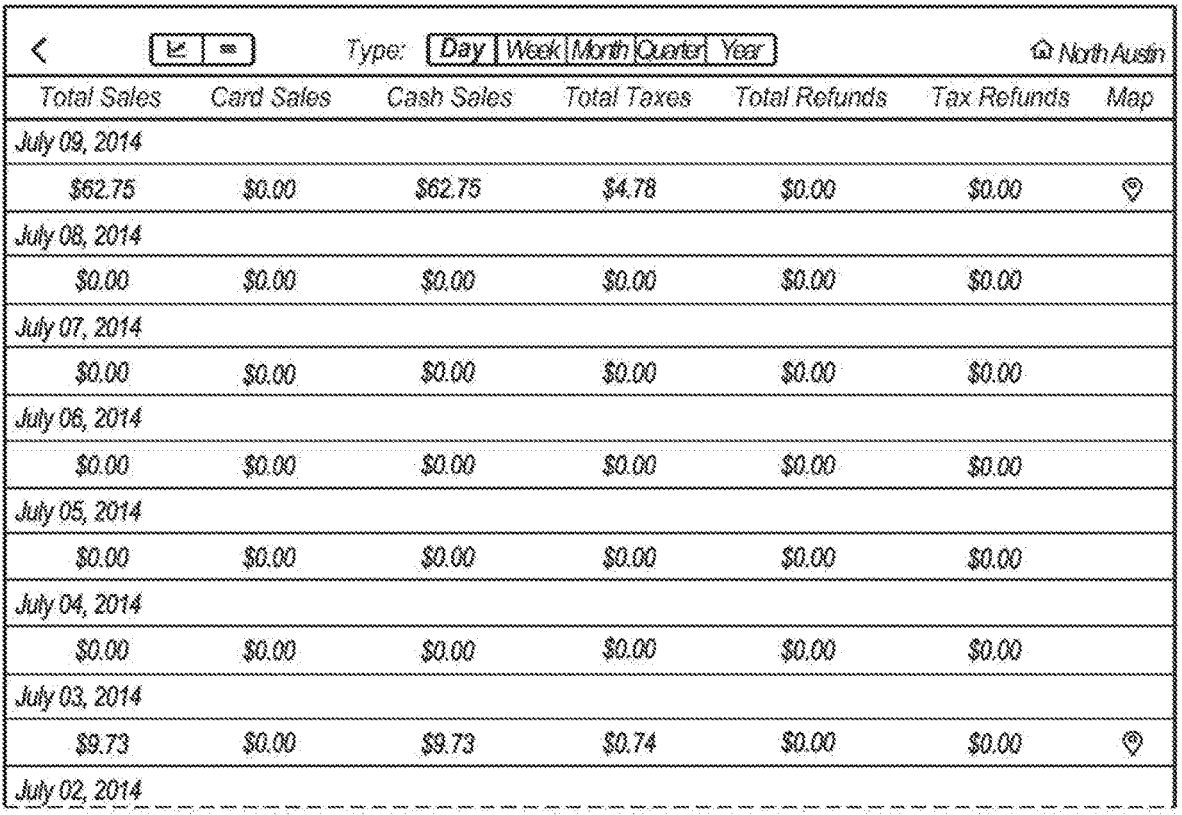
FIG. 27 is a user interface for reviewing an overview of transactions in a system for unified inventory and financial transaction management, according to some embodiments.

FIG. 27 is a user interface for reviewing an overview of transactions in a system for unified inventory and financial transaction management, according to some embodiments.

FIG. 28 is a user interface for reviewing an overview of transactions in a system for unified inventory and financial transaction management, according to some embodiments.

FIG. 29 is a user interface for reviewing an overview of transactions in a system for unified inventory and financial transaction management, according to some embodiments.

FIG. 30 is a user interface for reviewing an overview of transactions in a system for unified inventory and financial transaction management, according to some embodiments.

FIG. 31 is a user interface for reviewing an overview of transactions in a system for unified inventory and financial transaction management, according to some embodiments.

FIG. 32 is a user interface for reviewing an overview of inventory in a system for unified inventory and financial transaction management, according to some embodiments.

Figure 33:
FIG. 33 is a user interface for reviewing an overview of transactions in a system for unified inventory and financial transaction management, according to some embodiments.

FIG. 33 is a user interface for reviewing an overview of transactions in a system for unified inventory and financial transaction management, according to some embodiments.

Figure 34:
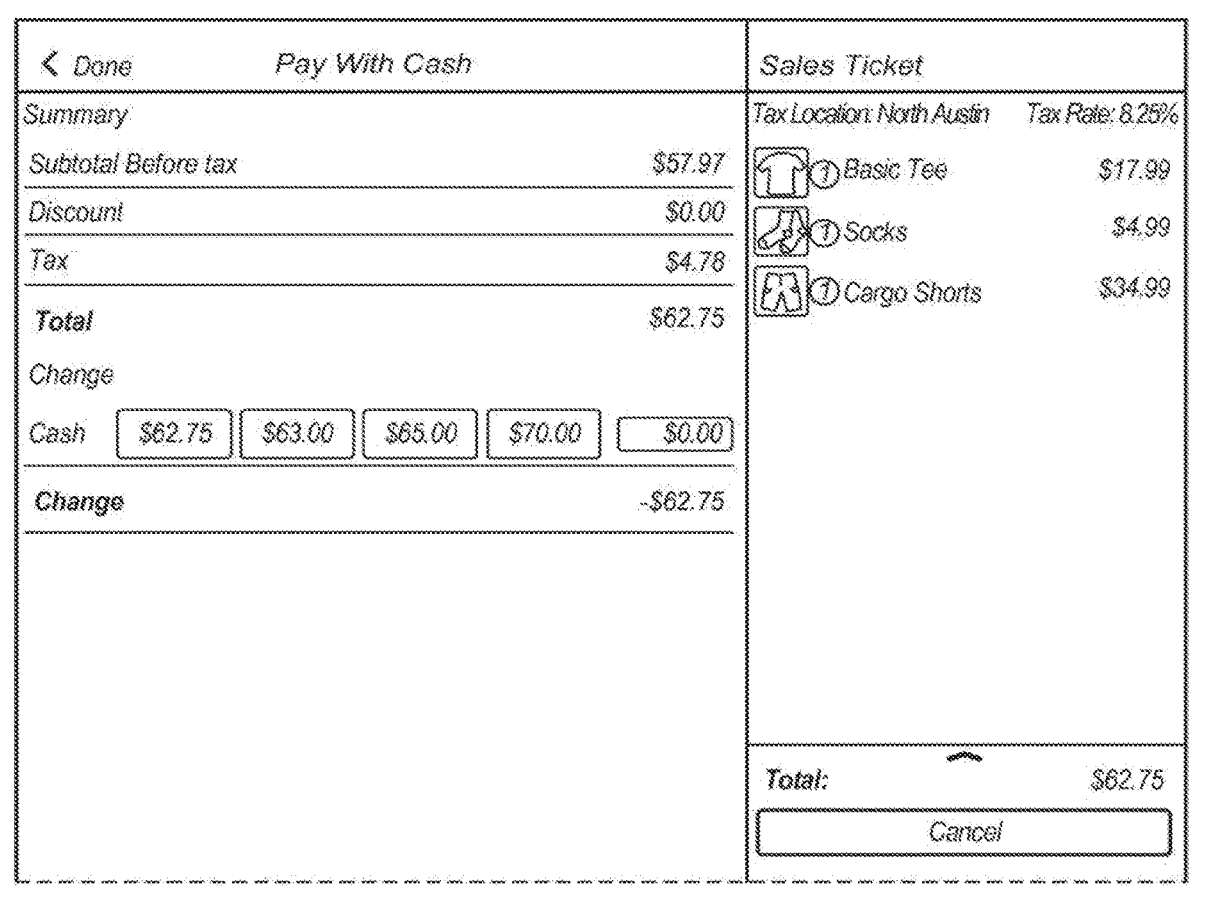

FIG. 34 is a user interface for recording a transaction in a system for unified inventory and financial transaction management, according to some embodiments.

Figure 35:
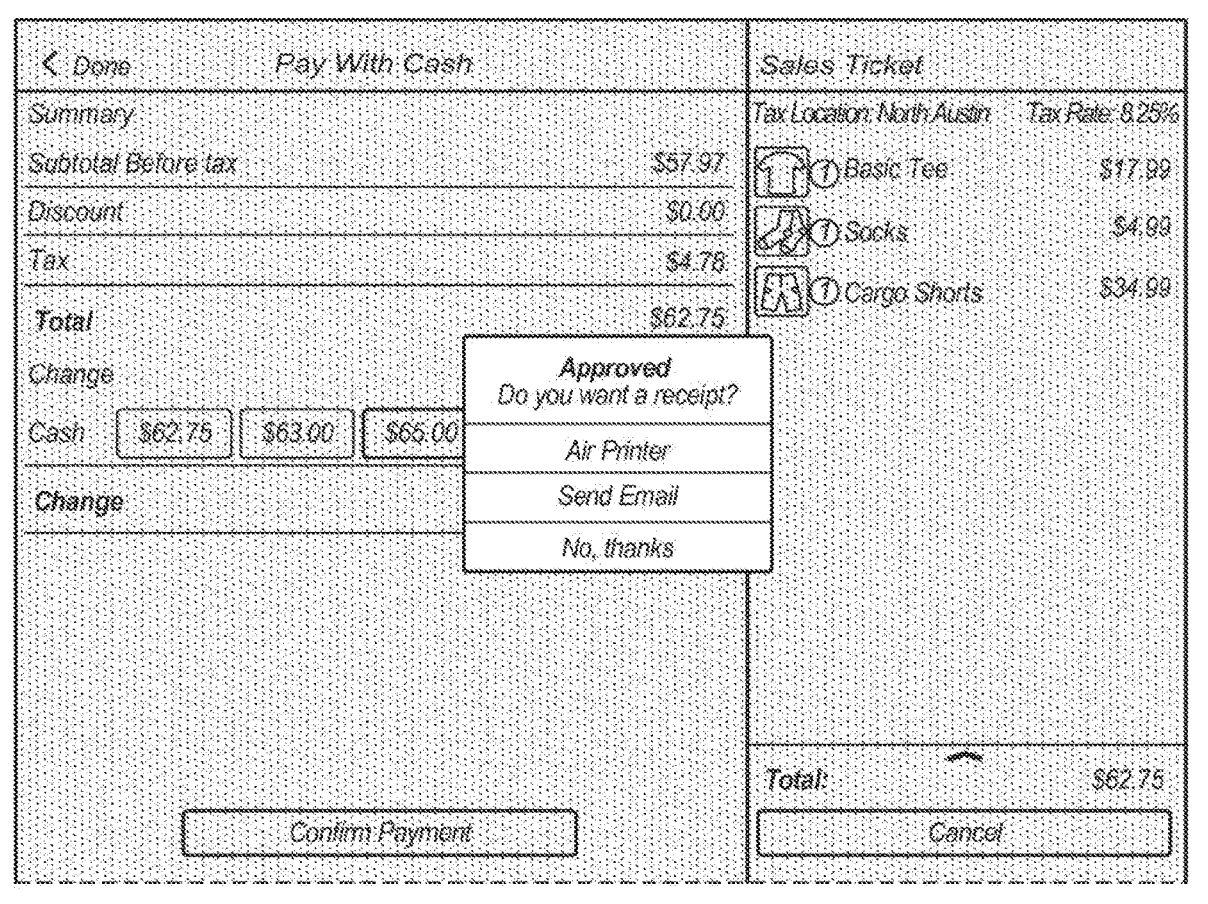

FIG. 35 is a user interface for reporting a transaction in a system for unified inventory and financial transaction management, according to some embodiments.

Figure 36:
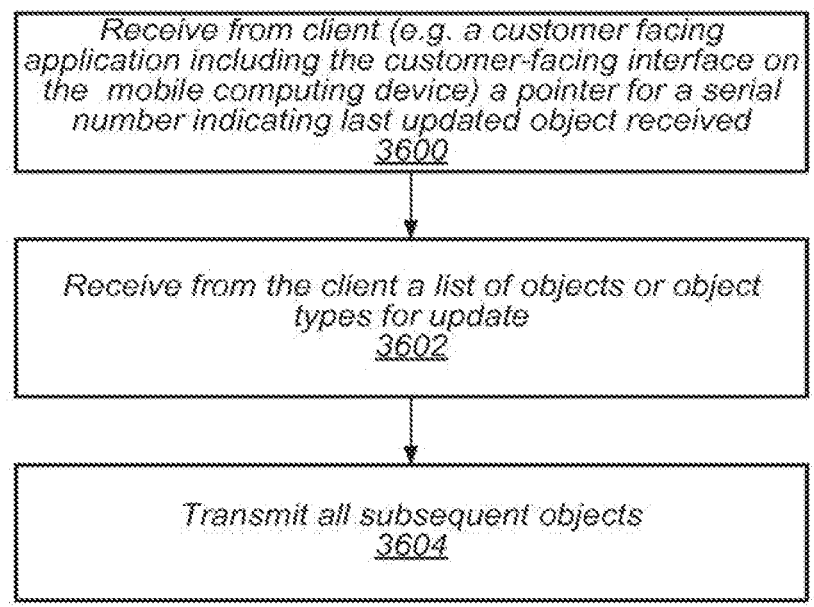
FIG. 36 is a flowchart of a synchronization method for unified inventory and financial transaction management, according to some embodiments.

FIG. 36 is a flowchart of a synchronization method for unified inventory and financial transaction management, according to some embodiments. A pointer for as serial number indicating a last updated object received is received from the client (block 3600). A list of objects or object types for update is received (block 3602). Subsequent objects are transmitted (block 3604).

Figure 37:
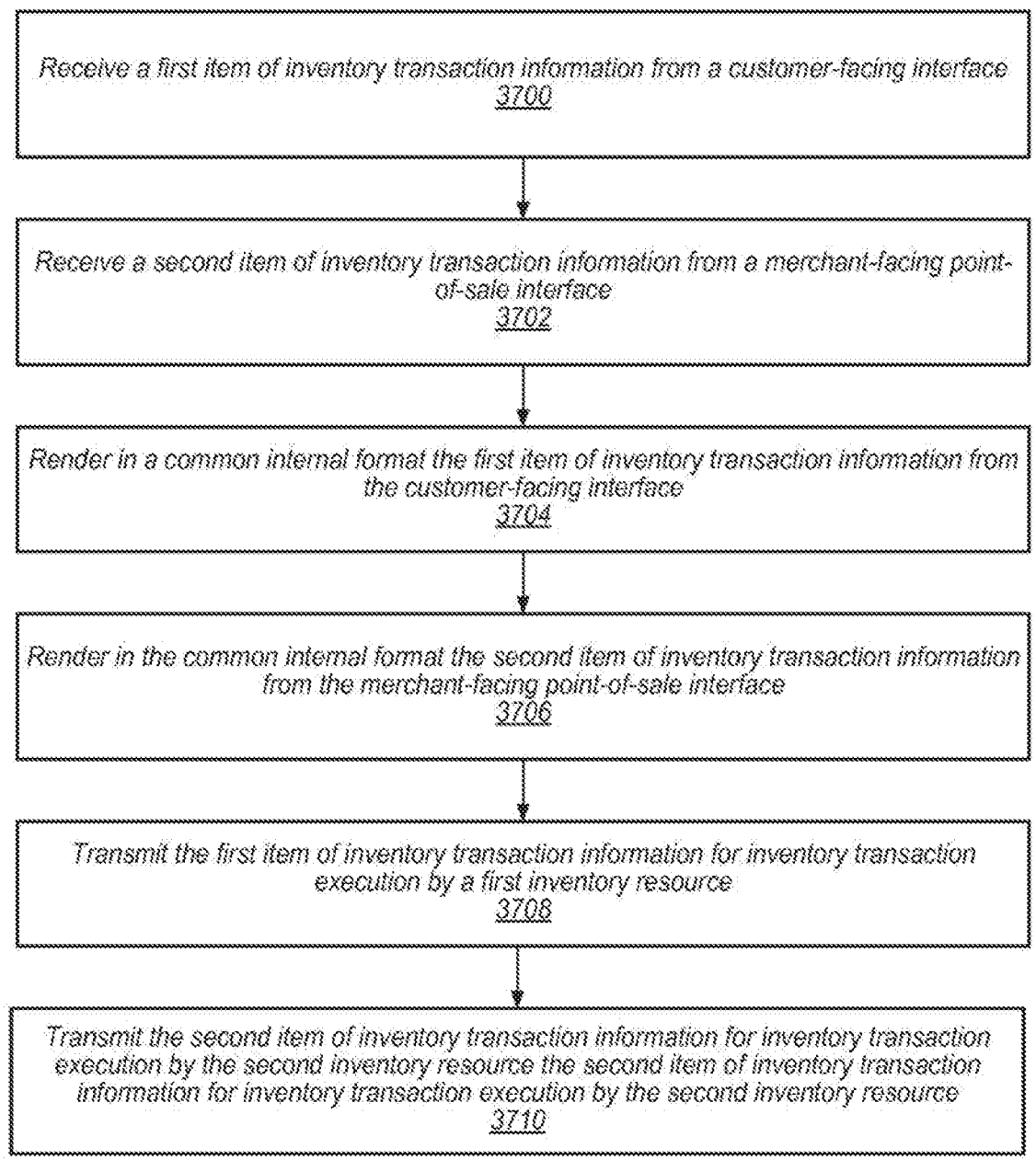
FIG. 37 is a flowchart of a method for unified inventory transaction management, according to some embodiments.

FIG. 37 is a flowchart of a method for unified inventory transaction management, according, to some embodiments. A first item of inventory transaction information is received from a customer-facing interface (block 3700). A second item of inventory transaction information is received from a merchant-facing point-of-sale interface (block 3702). The first item of inventory transaction information from the customer-facing interface is rendered in a common internal format (block 3704). The second item of inventory transaction information from the customer-facing interface is rendered in the common internal format (block 3706). The first item of inventory transaction information is transmitted for inventory transaction execution by a first inventory resource (block 3708). The second item of inventory transaction information is transmitted for inventory transaction execution by the second inventory resource (block 3710).

Figure 38:
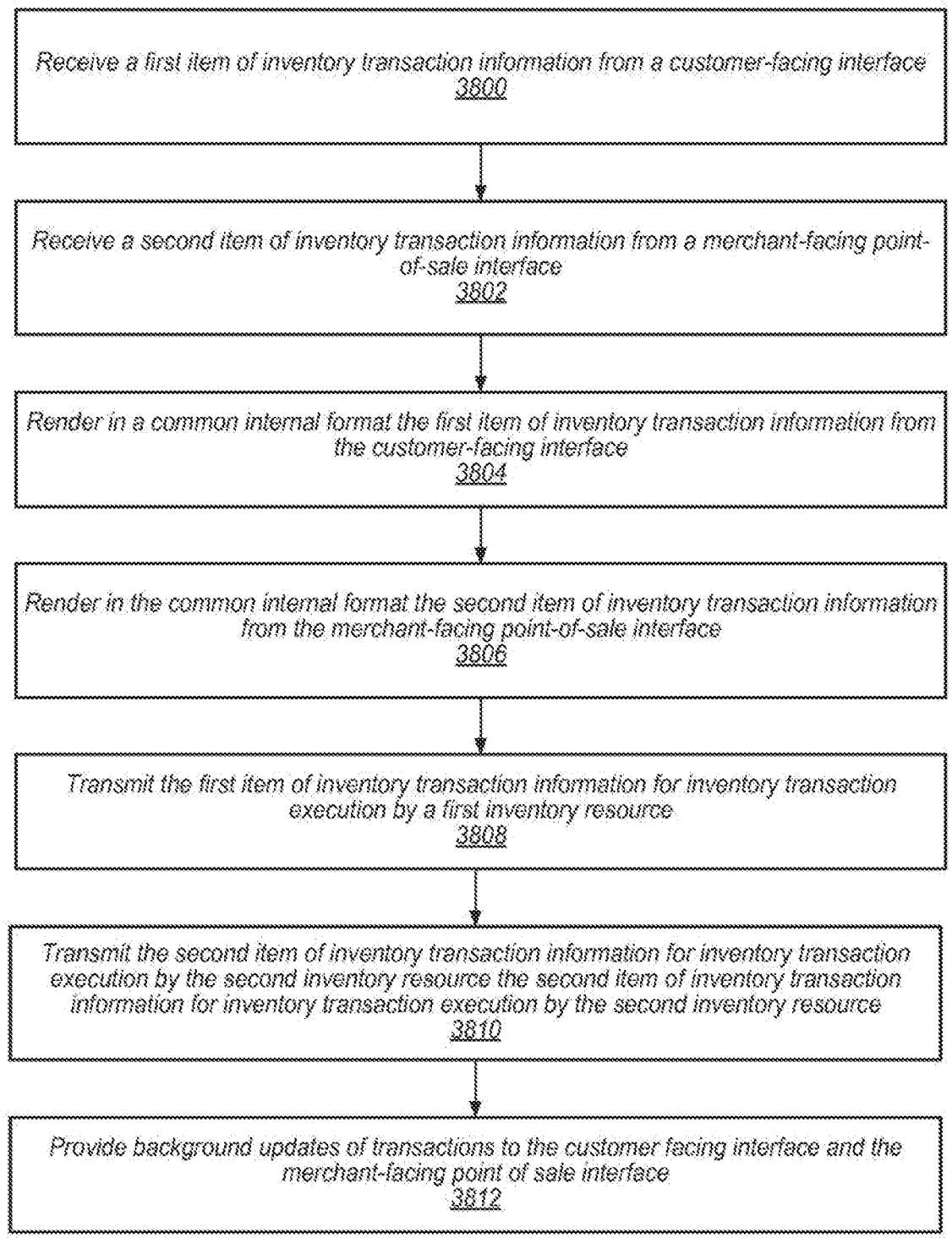
FIG. 38 is a flowchart of a method for unified inventory transaction management, according to some embodiments.

FIG. 38 is a flowchart of a method for unified inventory transaction management, according to some embodiments. A first item of inventory transaction information is received from a customer-facing interface (block 3800). A second item of inventory transaction information is received from a merchant-facing point-of-sale interface (block 3802). The first item of inventory transaction information from the customer-facing interface is rendered in a common internal format (block 3804). The second item of inventory transaction information from the customer-facing interface is rendered in the common internal format (block 3806). The first item of inventory transaction information is transmitted for inventory transaction execution by a first inventory resource (block 3808). The second item of inventory transaction information is transmitted for inventory transaction execution by the second inventory resource (block 3810). Background updates of transactions are provided to the customer facing interface and the merchant-facing point of sale interface (block 3812).

Figure 39:
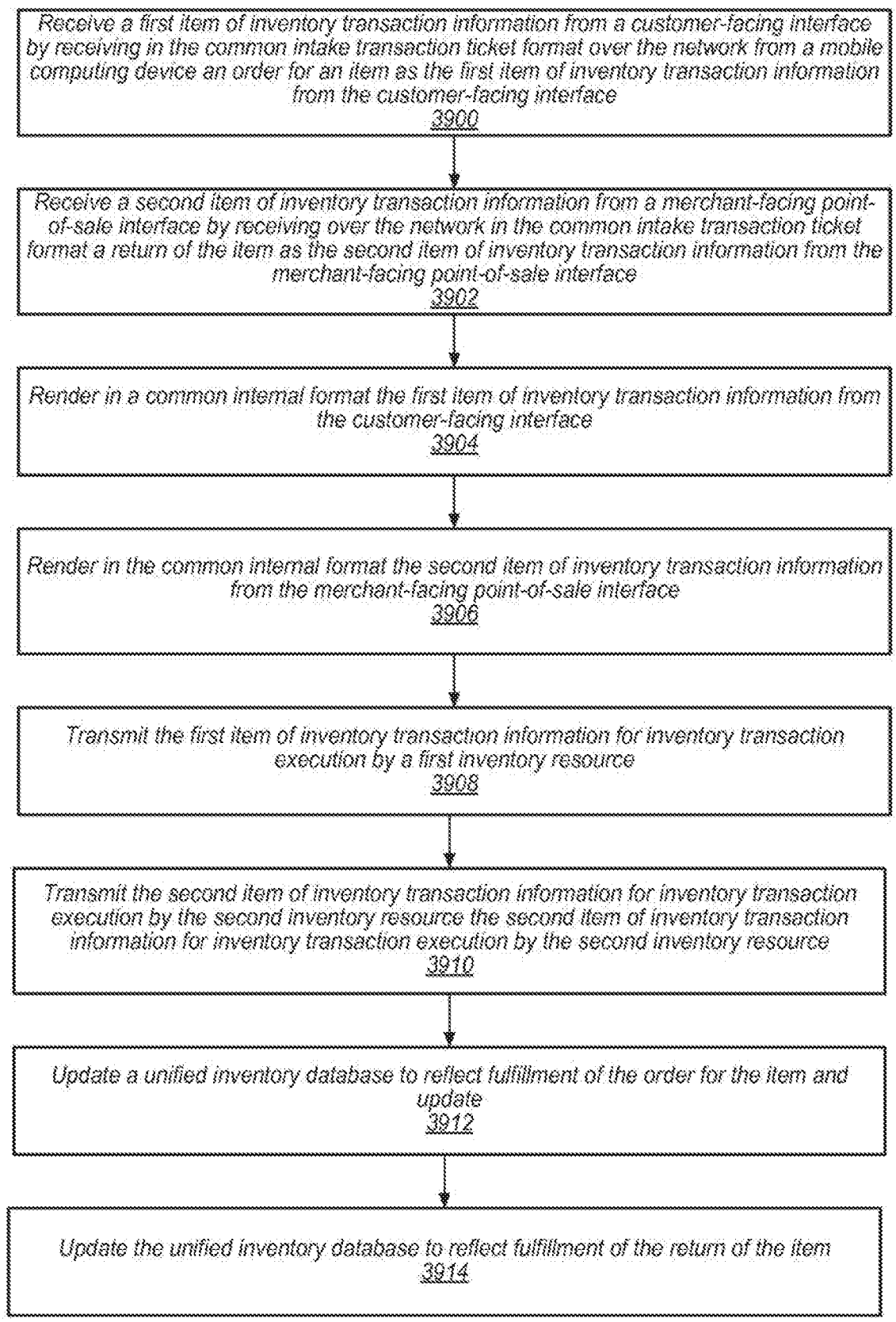
FIG. 39 is a flowchart of a method for unified inventory transaction management, according to some embodiments.

FIG. 39 is a flowchart of a method for unified inventory transaction management, according to some embodiments. A first item of inventory transaction information is received from a customer-facing interface by receiving in the common intake transaction ticket format over the network from a mobile computing device an order for an item as the first item of inventory transaction information from the customer-facing interface (block 3900). A second item of inventory transaction information is received from a merchant-facing point-of-sale interface by receiving over the network in the common intake transaction ticket format a return of the item as the second item of inventory transaction information from the merchant-facing point-of-sale interface (block 3902). The first item of inventory transaction information from the customer-facing interface is rendered in a common internal format (block 3904). The second item of inventory transaction information from the customer-facing interface is rendered in the common internal format (block 3906). The first item of inventory transaction information is transmitted for inventory transaction execution by a first inventory resource (block 3908). The second item of inventory transaction information is transmitted for inventory transaction execution by the second inventory resource (block 3910). A unified inventory database is updated to reflect fulfillment of the order for the item and update (block 3912). The unified inventory database is updated to reflect fulfillment of the return of the item (block 3914.)

Figure 40:
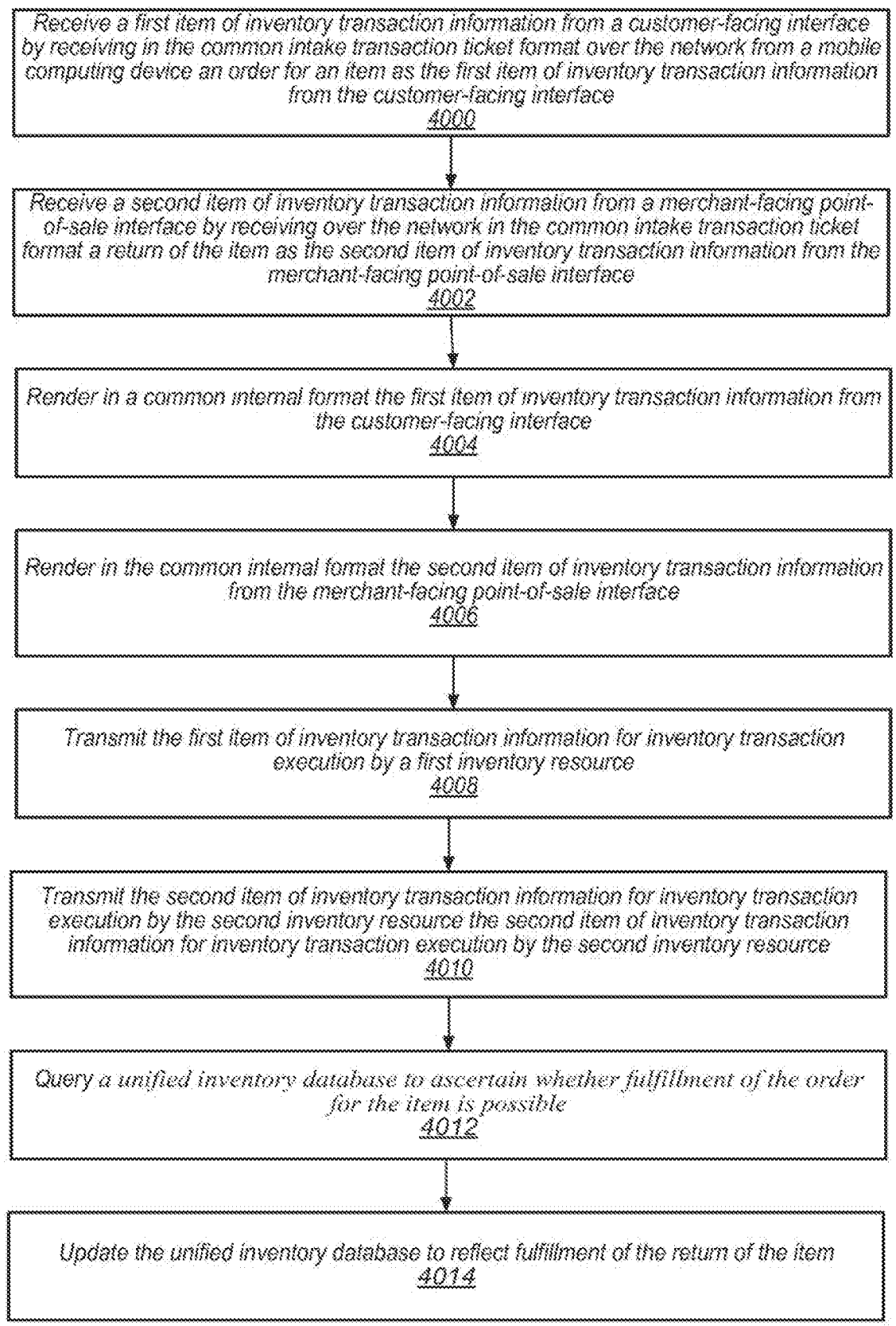
FIG. 40 is a flowchart of a method for unified inventory transaction management, according to some embodiments.

FIG. 40 is a flowchart of a method for unified inventory transaction management, according to some embodiments. A first item of inventory transaction information is received from a customer-facing interface by receiving in the common intake transaction ticket format over the network from a mobile computing device an order for an item as the first item of inventory transaction information from the customer-facing interface (block 3900). A second item of inventory transaction information is received from a merchant-facing point-of-sale interface by receiving over the network in the common intake transaction ticket format a return of the item as the second item of inventory transaction information from the merchant-facing point-of-sale interface (block 3902). The first item of inventory transaction information from the customer-facing interface is rendered in a common internal format (block 3904). The second item of inventory transaction information from the customer-facing interface is rendered in the common internal format (block 3906). The first item of inventory transaction information is transmitted for inventory transaction execution by a first inventory resource (block 3908). The second item of inventory transaction information is transmitted for inventory transaction execution by the second inventory resource (block 3910). A unified inventory database is queried to ascertain whether the order for the item is possible (block 3912). The unified inventory database is updated to reflect fulfillment of the return of the item (block 3914.)

Example System

Figure 41:
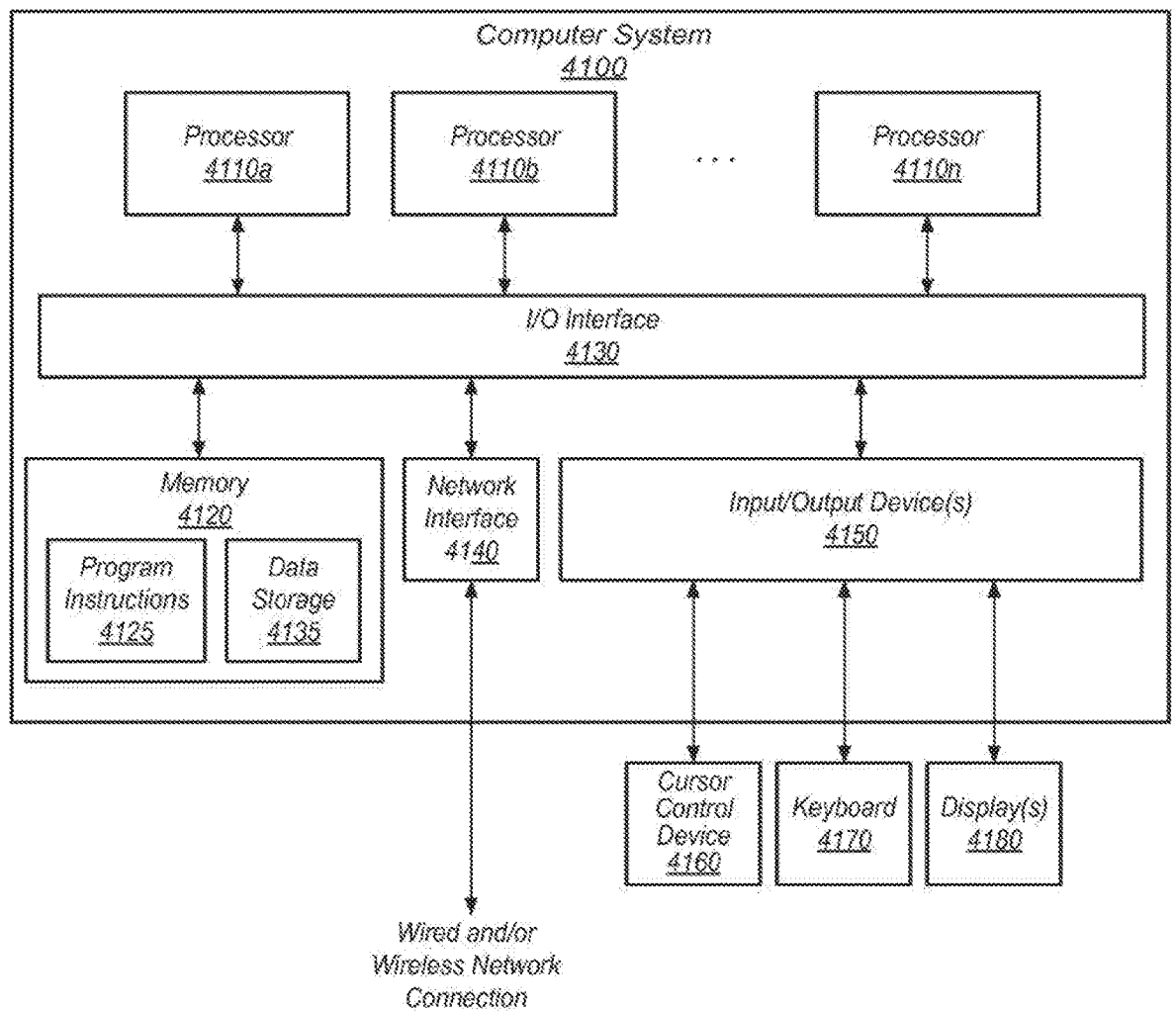
FIG. 41 illustrates an example computer system that may be used in embodiments.

Embodiments of an electronic commerce management module and/or of the production resources management techniques as described herein may be executed on one or more computer systems, which may interact with various other devices. One such computer system is illustrated by FIG. 41. In different embodiments, computer system 4100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 4100, includes one or more processors 4110 coupled to a system memory 4120 via an input/output (I/O) interface 4130. Computer system 4100 further includes a network interface 4140 coupled to I/O interface 4130, and one or more input/output devices 4150, such as cursor control device 4160, keyboard 4170, and display(s) 4180. In some embodiments, it is contemplated that embodiments may be implemented using a single instance of computer system 4100, while in other embodiments multiple, such systems, or multiple nodes making up computer system 4100, may be configured to host different portions or instances of embodiments. For example, in one embodiment some elements may be implemented via one or more nodes of computer system 4100 that are distinct from those nodes implementing other elements.

In various embodiments, computer system 4100 may be a uniprocessor system including one processor 4110, or a multiprocessor system including several processors 4110 (e.g., two, four, eight, or another suitable number). Processors 4110 may be any suitable processor capable of executing instructions. For example, in various embodiments, processors 4110 may be general-purpose or embedded processors implementing any of a variety of instruction set architectures (ISAs), such as the x86, PowerPC, SPARC, or MIPS ISAs, or any other suitable ISA. In multiprocessor systems, each of processors 4110 may commonly, but not necessarily, implement the same ISA.

In some embodiments, at least one processor 4110 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 4120 may be configured to store program instructions and/or data accessible by processor 4110. In various embodiments, system memory 4120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of an electronic commerce management module are shown stored within system memory 4120 as program instructions 4125 and data storage 4135, respectively. In other embodiments, program instructions and/or data may be received, sent or stored upon different types of computer-accessible media or on similar media separate from system memory 4120 or computer system 4100. Generally speaking, a computer-accessible medium may include storage media or memory media such as magnetic or optical media, e.g., disk or CD/DVD-ROM coupled to computer system 4100 via I/O interface 4130. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 4140.

In one embodiment, I/O interface 4130 may be configured to coordinate I/O traffic between processor 4110, system memory 4120, and any peripheral devices in the device, including network interface 4140 or other peripheral interfaces, such as input/output devices 4150. In some embodiments, I/O interface 4130 may perform any necessary protocol, timing or other data transformations to convert data signals from one component (e.g., system memory 41:20) into a format suitable for use by another component (e.g., processor 4110). In some embodiments, I/O interface 4130 may include support for devices attached through various types of peripheral buses, such as a variant of the Peripheral Component Interconnect (PCI) bus standard or the Universal Serial Bus (USB) standard, for example. In some embodiments, the function of I/O interface 4130 may be split into two or more separate components, such as a north bridge and a south bridge, for example. In addition, in some embodiments some or all of the functionality of I/O interface 4130, such as an interface to system memory 4120, may be incorporated directly into processor 4110.

Network interface 4140 may be configured to allow data to be exchanged between computer system 4100 and other devices attached to a network, such as other computer systems, or between nodes of computer system 4100. In various embodiments, network interface 4140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 4150 may, in some embodiments, include one or more display terminals, keyboards, keypads, touchpads, scanning devices, voice or optical recognition devices, or any other devices suitable for entering or retrieving data by one or more computer system 4100. Multiple input/output devices 4150 may be present in computer system 4100 or may be distributed on various nodes of computer system 4100. In some embodiments, similar input/output devices may be separate from computer system 4100 and may interact with one or more nodes of computer system 4100 through a wired or wireless connection, such as over network interface 4140.

As shown in FIG. 41, memory 4120 may include program instructions 4125, configured to implement embodiments of an electronic commerce management module as described herein, and data storage 4135, including various data accessible by program instructions 4125. In one embodiment, program instructions 4125 may include software elements of embodiments of an electronic commerce management module as illustrated in the above Figures. Data storage 4135 may include data that may be used in embodiments. In other embodiments, other or different software elements and data may be included.

Those skilled in the art will appreciate that computer system 4100 is merely illustrative and is not intended to limit the scope of an electronic commerce management module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 4100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 4100 may be transmitted to computer system 4100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system for providing a wireless data communication interface, the system comprising:
   one or more computers configured to implement, by executing instructions on one or more processors, a platform-agnostic wireless data communication system, wherein the wireless data system includes:
   one or more receiving modules operating in a customer-facing client application or a merchant-facing client application, the one or more receiving modules for
   receiving, over a wireless data communication channel, a tokenized first item of financial transaction information from a customer mobile device, and
   receiving a second item of financial transaction information from a point-of-sale interface operating in the merchant-facing client application connected to the customer mobile device through the wireless data communication channel,
   a point of sale server operating in an electronic commerce management provider, the point of sale server for
   rendering, in a common internal format, the first item of financial transaction information, and
   rendering, in the common internal format, the second item of financial transaction information from the point-of-sale interface, a payment processing module operating in the electronic commerce management provider, the payment processing module for
  rendering, in a second format, the first item of financial transaction information for payment processing by a first external financial party, and
  rendering, in a third format, the second item of financial transaction information for payment processing by a second external financial party, and
a transaction execution module for
  transmitting, in the second format, the first item of financial transaction information for payment processing by the first external financial party, wherein the second format includes the financial transaction information using an account identifier associated with the tokenized first item in a registry stored in a secured account data vault, and
  transmitting, in the third format, the second item of financial transaction information for payment processing by the second external financial party,
wherein the one or more receiving modules comprise a single stack application interface residing on the one or more computers.

2. The system of claim 1 for providing a wireless data communication interface, further comprising:
an authentication module for
  recognizing a customer mobile device located in an area defined within a geofence;
  identifying a customer associated with the customer mobile device based at least in part on a presence of an application executing on the customer mobile device; and
  issuing a session token to the application on the customer mobile device.

3. The system of claim 1 for providing a wireless data communication interface, wherein:
the transmitting, in the second format, the first item of financial transaction information further includes transmitting, in the second format, the first item of financial transaction information without transmitting the financial transaction information using the account identifier associated with the tokenized first item in the registry stored in the secured account data vault to the point-of-sale interface.

4. The system of claim 1 for providing a wireless data communication interface, wherein:
the receiving, over a wireless data communication channel, a tokenized first item of financial transaction information from a customer mobile device further includes receiving, over a Bluetooth low energy radio communication channel, a tokenized first item of financial transaction information from a customer mobile device; and
the receiving a second item of financial transaction information from a point-of-sale interface connected to the mobile device through the wireless data communication channel further includes receiving over a broadband wireless network a second item of financial transaction information from a point-of-sale interface connected to the mobile device through the wireless data communication channel.

5. The system of claim 1 for providing a wireless data communication interface, wherein:
the one or more receiving modules include a single stack application program interface residing on one of the one or more servers.

6. The system of claim 1 for providing a wireless data communication interface, wherein:
the transaction execution module is further configured for receiving, on the one or more servers, a transaction authorization confirmation from the first external financial party, and
the point of sale server is further configured for transmitting, to the customer mobile device, an indication of the transaction authorization confirmation.

7. The system of claim 1 for providing a wireless data communication interface, wherein the payment processing module includes a payment processing gateway for communicating with servers of external financial processors using encrypted links over a network.

8. A method for providing a wireless data communication interface, the method comprising:
receiving, over a wireless data communication channel by one or more receiving modules operating in a customer-facing client application or a merchant-facing client application, a tokenized first item of financial transaction information from a customer mobile device;
receiving, by the one or more receiving modules, a second item of financial transaction information from a point-of-sale interface operating in the merchant-facing client application connected to the mobile device through the wireless data communication channel;
rendering, in a common internal format, by a point of sale server operating in an electronic commerce management provider, the first item of financial transaction information;
rendering, in the common internal format, by the point of sale server, the second item of financial transaction information from the point-of-sale interface;
rendering, in a second format, by a payment processing module operating in the electronic commerce management provider, the first item of financial transaction information for payment processing by a first external financial party;
rendering, in a third format, by the payment processing module, the second item of financial transaction information for payment processing by a second external financial party;
transmitting, in the second format, the first item of financial transaction information for payment processing by the first external financial party, wherein the second format includes the financial transaction information using an account identifier associated with the tokenized first item in a registry stored in a secured account data vault; and
transmitting, in the third format, the second item of financial transaction information for payment processing by the second external financial party,
wherein the one or more receiving modules comprise a single stack application interface residing on the one or more computers.

9. The method of claim 8 for providing a wireless data communication interface, further comprising:
recognizing a customer mobile device located in an area defined within a geofence;
identifying a customer associated with the customer mobile device based at least in part on a presence of an application executing on the customer mobile device; and
issuing a session token to the application on the customer mobile device.

10. The method of claim 8 for providing a wireless data communication interface, wherein:
the transmitting, in the second format, the first item of financial transaction information further includes transmitting, in the second format, the first item of financial transaction information without transmitting the financial transaction information using the account identifier associated with the tokenized first item in the registry stored in the secured account data vault to the point-of-sale interface.

11. The method of claim 8 for providing a wireless data communication interface, wherein
the receiving, over a wireless data communication channel, a tokenized first item of financial transaction information from a customer mobile device further includes receiving, over a Bluetooth low energy radio communication channel, a tokenized first item of financial transaction information from a customer mobile device; and
the receiving a second item of financial transaction information from a point-of-sale interface connected to the mobile device through the wireless data communication channel further includes receiving over a broadband wireless network a second item of financial transaction information from a point-of-sale interface connected to the mobile device through the wireless data communication channel.

12. The method of claim 8 for providing a wireless data communication interface, further comprising:
receiving a transaction authorization confirmation from the first external financial party, and
transmitting to the customer mobile device an indication of the transaction authorization confirmation.

13. The method of claim 8 for providing a wireless data communication interface, wherein the transmitting to the first external financial party and the second external financial party is by way of a processing gateway using encrypted links over a network.

14. A non-transitory computer-readable storage medium storing program instructions that, when executed by a computing system, causes the computing system to perform a method for providing a wireless data communication interface, the method including:
receiving, over a wireless data communication channel by one or more receiving modules operating in a customer-facing client application or a merchant-facing client application, a tokenized first item of financial transaction information from a customer mobile device;
receiving, by the one or more receiving modules, a second item of financial transaction information from a point-of-sale interface connected to the mobile device through the wireless data communication channel;
rendering, in a common internal format, by a point of sale server operating in an electronic commerce management provider, the first item of financial transaction information;
rendering, in the common internal format, by the point of sale server, the second item of financial transaction information from the point-of-sale interface;
rendering, in a second format, by a payment processing module operating in the electronic commerce management provider, the first item of financial transaction information for payment processing by a first external financial party;
rendering, in a third format, by the payment processing module, the second item of financial transaction information for payment processing by a second external financial party;
transmitting, in the second format, the first item of financial transaction information for payment processing by the first external financial party, wherein the second format includes the financial transaction information using an account identifier associated with the tokenized first item in a registry stored in a secured account data vault; and
transmitting, in the third format, the second item of financial transaction information for payment processing by the second external financial party,
wherein the one or more receiving modules comprise a single stack application interface residing on the one or more computers.

15. The non-transitory computer-readable storage medium of claim 14, the method further including:
recognizing a customer mobile device located in an area defined within a geofence;
identifying a customer associated with the customer mobile device based at least in part on a presence of an application executing on the customer mobile device; and
issuing a session token to the application on the customer mobile device.

16. The non-transitory computer-readable storage medium of claim 14, wherein:
the transmitting, in the second format, the first item of financial transaction information further includes transmitting, in the second format, the first item of financial transaction without transmitting the financial transaction information using the account identifier associated with the tokenized first item in the registry stored in the secured account data vault to the point-of-sale interface.

17. The non-transitory computer-readable storage medium of claim 14, wherein:
the receiving, over a wireless data communication channel, a tokenized first item of financial transaction information from a customer mobile device further includes receiving, over a Bluetooth low energy radio communication channel, a tokenized first item of financial transaction information from a customer mobile device; and
the receiving a second item of financial transaction information from a point-of-sale interface connected to the mobile device through the wireless data communication channel further includes receiving over a broadband wireless network a second item of financial transaction information from a point-of-sale interface connected to the mobile device through the wireless data communication channel.

18. The non-transitory computer-readable storage medium of claim 14, the method further including:
receiving a transaction authorization confirmation from the first external financial party; and
transmitting to the customer mobile device an indication of the transaction authorization confirmation.

\* \* \* \* \*